US012676821B2

(12) United States Patent
Li

(10) Patent No.: US 12,676,821 B2
(45) Date of Patent: Jul. 7, 2026

(54) COMMUNICATION METHOD AND COMMUNICATION APPARATUS

(71) Applicant: Huawei Technologies Co., Ltd., Shenzhen (CN)

(72) Inventor: Zhuoming Li, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 974 days.

(21) Appl. No.: 17/857,249

(22) Filed: Jul. 5, 2022

(65) Prior Publication Data

US 2022/0338100 A1 Oct. 20, 2022

Related U.S. Application Data

(63) Continuation of application No. PCT/CN2020/126787, filed on Nov. 5, 2020.

(30) Foreign Application Priority Data

Jan. 7, 2020 (CN) .......................... 202010014074.6

(51) Int. Cl.
| | |
|---|---|
| *H04L 47/2425* | (2022.01) |
| *H04L 47/70* | (2022.01) |
| *H04L 47/83* | (2022.01) |
| *H04W 48/06* | (2009.01) |
| *H04W 76/30* | (2018.01) |

(52) U.S. Cl.
CPC .......... *H04L 47/2433* (2013.01); *H04L 47/70* (2013.01); *H04L 47/83* (2022.05); *H04W 48/06* (2013.01); *H04W 76/30* (2018.02)

(58) Field of Classification Search
CPC ..... H04L 47/2433; H04L 47/70; H04L 47/83; H04L 47/245; H04L 47/2483; H04L 47/29; H04L 47/762; H04L 47/805; H04L 47/821; H04W 48/06; H04W 76/30; H04W 24/02; H04W 48/08; H04W 48/16
See application file for complete search history.

(56) References Cited

U.S. PATENT DOCUMENTS

| | | | | |
|---|---|---|---|---|
| 9,332,132 B1 * | 5/2016 | Milhizer | ............... | H04W 24/08 |
| 11,164,235 B2 * | 11/2021 | Krishnan | ........... | G06Q 30/0255 |

(Continued)

FOREIGN PATENT DOCUMENTS

| | | |
|---|---|---|
| CN | 107734708 A | 2/2018 |
| CN | 109257769 A | 1/2019 |

(Continued)

OTHER PUBLICATIONS

3GPP TS 23.501 V16.2.0, Sep. 2019, "3rd Generation Partnership Project; Technical Specification Group Services and System Aspects; System Architecture for the 5G System (5GS); Stage 2," 392 pages.

(Continued)

*Primary Examiner* — Kibrom T Hailu
(74) *Attorney, Agent, or Firm* — Conley Rose, P.C.

(57) ABSTRACT

A communication method includes that a first network device generates indication information based on service usage of a first network slice and a service usage threshold of the first network slice, and sends the indication information to a second network device. The second network device controls resource pre-emption based on the indication information.

20 Claims, 25 Drawing Sheets

(56) References Cited

U.S. PATENT DOCUMENTS

| | | | | |
|---|---|---|---|---|
| 2013/0054428 A1* | 2/2013 | Shaikh | .................. | G06Q 30/04 |
| | | | | 705/30 |
| 2017/0109807 A1* | 4/2017 | Krishnan | .......... | G06Q 30/0631 |
| 2018/0317273 A1* | 11/2018 | Kim | ...................... | H04W 76/22 |
| 2019/0075552 A1 | 3/2019 | Yu et al. | | |
| 2019/0174536 A1 | 6/2019 | Han et al. | | |
| 2020/0213897 A1* | 7/2020 | Qiao | ..................... | H04L 47/765 |
| 2021/0029579 A1* | 1/2021 | Tiwari | ................. | H04W 76/38 |
| 2021/0092634 A1 | 3/2021 | Kang | | |
| 2022/0224651 A1* | 7/2022 | Rost | ........................ | H04L 47/28 |

FOREIGN PATENT DOCUMENTS

| | | |
|---|---|---|
| CN | 109600798 A | 4/2019 |
| WO | 2019029704 A1 | 2/2019 |

OTHER PUBLICATIONS

3GPP TS 23.503 V16.2.0, Sep. 2019,"3rd Generation Partnership Project; Technical Specification Group Services and System Aspects; Policy and Charging Control Framework for the 5G System (5GS); Stage 2 (Release 16)," 104 pages.

3GPP TS 23.501 V16.3.0, Dec. 2019, "3rd Generation Partnership Project; Technical Specification Group Services and System Aspects; System architecture for the 5G System (5GS); Stage 2 (Release 16)," 417 pages.

3GPP TS 23.502 V16.3.0, Dec. 2019, "3rd Generation Partnership Project; Technical Specification Group Services and System Aspects; Procedures for the 5G System (5GS); Stage 2 (Release 16)," 558 pages.

3GPP TS 23.503 V16.3.0, Dec. 2019, "3rd Generation Partnership Project; Technical Specification Group Services and System Aspects; Policy and charging control framework for the 5G System (5GS); Stage 2 (Release 16)," 112 pages.

3GPP TS 28.541 V16.3.0, Dec. 2019, "3rd Generation Partnership Project; Technical Specification Group Services and System Aspects; Management and orchestration; 5G Network Resource Model (NRM); Stage 2 and stage 3 (Release 16)," 327 pages.

"Generic Network Slice Template," Version 2.0, GSM Association, Oct. 16, 2019, 61 pages.

Nokia et al., "Network slicing way forward," 3GPP TSG SA WG2#117, S2-165696, Oct. 17-21, 2016, 15 pages.

* cited by examiner

CONT.
FROM

FROM

FROM

FROM

S1208:
Session
management
policy

S1207:
Establishment
request
message

S1209:
Session
management
policy

S1210:
Session
management
policy

S1211: Control resource
pre-emption

S1212:
Feedback
message

S1213: Establish first service data

S1214: Release second service data

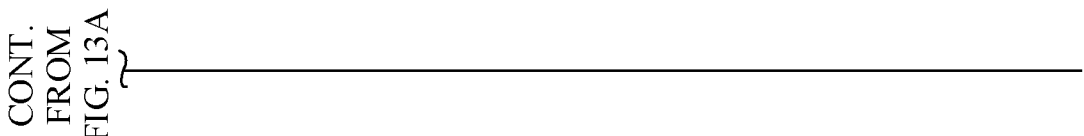

CONT.
FROM
FIG. 13A

CONT.
FROM
FIG. 13A

S1308:
Request a
session
management
policy

S1309:
Session
management
policy and
control
policy of the
first network
slice

CONT.
FROM
FIG. 13A

S1307:
Establishment
request
message

S1310:
Session
management
policy and
control
policy of the
first network
slice

CONT.
FROM
FIG. 13A

S1307: Establishment
request message

S1311:
Session
management
policy and
control
policy of the
first network
slice

S1312: Control resource
pre-emption

S1313:
Feedback
message

S1314: Establish first service data

S1315: Release second service data

FIG. 13B

COMMUNICATION METHOD AND COMMUNICATION APPARATUS

CROSS-REFERENCE TO RELATED APPLICATIONS

This is a continuation of International Patent Application No. PCT/CN2020/126787 filed on Nov. 5, 2020, which claims priority to Chinese Patent Application No. 202010014074.6 filed on Jan. 7, 2020. The disclosures of the aforementioned applications are hereby incorporated by reference in their entireties.

TECHNICAL FIELD

This disclosure relates to the communication field, and in particular, to a communication method and a communication apparatus in the communication field.

BACKGROUND

In a future communication technology, a network slice (NS) is used to provide different network resources for different service data. One network slice cannot provide unlimited network resources for one or more service types without limitation. Therefore, how to control usage of a service in the network slice is an urgent problem to be resolved.

SUMMARY

This disclosure provides a communication method and a communication apparatus, to control service data that is to access a network slice.

According to a first aspect, a communication method is provided, and includes that a first network device obtains service usage of a first network slice and a service usage threshold of the first network slice. The first network device generates indication information based on the service usage of the first network slice and the service usage threshold of the first network slice. The first network device sends the indication information to a second network device, where the indication information is used for controlling resource pre-emption at the second network device.

In the foregoing technical solution, the first network device may generate, based on the service usage of the first network slice and the service usage threshold of the first network slice, the indication information used by the second network device to control the resource pre-emption. In this way, the second network device can control, based on the indication information, usage of a service that is to access a network slice.

Optionally, the first network device is a policy control function (PCF) network element, and the second network device is a radio access network (RAN) device.

Optionally, the first network device may determine the service usage of the first network slice and the service usage threshold of the first network slice, or may obtain the service usage of the first network slice and the service usage threshold of the first network slice from another network device.

In some possible implementations, the service usage threshold of the first network slice includes an upper service usage limit of the first network slice. If the service usage of the first network slice is greater than or equal to the upper service usage limit of the first network slice, the indication information indicates the second network device to release, for first service data that is to access the first network slice, a resource for service data that has accessed the first network slice, the indication information indicates to forbid first service data that is to access the first network slice from pre-empting a resource for a data service that has accessed another network slice, or the indication information indicates that allowed service usage of the first network slice is greater than or equal to the upper service usage limit of the first network slice.

In some possible implementations, if the service usage of the first network slice is greater than or equal to the upper service usage limit of the first network slice, the indication information indicates that the service usage of the first network slice is greater than or equal to the upper service usage limit of the first network slice. Alternatively, the indication information indicates that, when a resource is insufficient, the second network device may release, for first service data that is to access the first network slice, a resource for service data that has accessed the first network slice or a resource for service data that has accessed another network slice, that is, not forbid the first service data that is to access the first network slice from pre-empting the resource for the data service that has accessed the other network slice.

In some possible implementations, the upper service usage limit of the first network slice is at least one of a maximum quantity of sessions allowed to access the first network slice, a maximum bandwidth of traffic allowed to access the first network slice, or a maximum session density allowed for the first network slice.

Further, when the service usage of the first network slice is a quantity of sessions that have accessed the first network slice, the upper service usage limit of the first network slice is the maximum quantity of sessions allowed to access the first network slice, when the service usage of the first network slice is a traffic bandwidth occupied by service data that has accessed the first network slice, the upper service usage limit of the first network slice is the maximum bandwidth of traffic allowed to access the first network slice, or when the service usage of the first network slice is a density of sessions that have accessed the first network slice, the upper service usage limit of the first network slice is the maximum session density allowed for the first network slice.

In some possible implementations, the service usage threshold of the first network slice includes a lower service usage limit of the first network slice. If the service usage of the first network slice is less than or equal to the lower service usage limit of the first network slice, the indication information indicates that a resource for any piece of service data that has accessed the first network slice is not pre-empted by any piece of service data that is to access a second network slice, or the indication information indicates that the service usage of the first network slice is less than or equal to the lower service usage limit of the first network slice.

In some possible implementations, if the service usage of the first network slice is greater than the lower service usage limit of the first network slice, the indication information indicates that a resource for service data that has accessed the first network slice may be pre-empted by service data that is to access a second network slice, or the indication information indicates that the service usage of the first network slice is greater than the lower service usage limit of the first network slice.

In some possible implementations, the lower service usage limit of the first network slice is at least one of a minimum quantity of sessions guaranteed to access the first network slice, a minimum bandwidth of traffic guaranteed to access the first network slice, or a minimum session density guaranteed for the first network slice.

Further, when the service usage of the first network slice is a quantity of sessions that have accessed the first network slice, the lower service usage limit of the first network slice is the minimum quantity of sessions guaranteed to access the first network slice, when the service usage of the first network slice is a traffic bandwidth occupied by service data that has accessed the first network slice, the lower service usage limit of the first network slice is the minimum bandwidth of traffic guaranteed to access the first network slice, or when the service usage of the first network slice is a density of sessions that have accessed the first network slice, the lower service usage limit of the first network slice is the minimum session density guaranteed for the first network slice.

In some possible implementations, the method further includes that if the service usage of the first network slice is less than or equal to the lower service usage limit of the first network slice, the first network device sets a pre-emption vulnerability parameter in an allocation and retention priority (ARP) parameter of first service data to "pre-empted unallowed", or the first network device sets a pre-emption vulnerability parameter in an ARP parameter of each piece of service data that has accessed the first network slice to "pre-empted unallowed".

In some possible implementations, the service usage threshold of the first network slice includes a lower service usage limit of the first network slice and an upper service usage limit of the first network slice.

In some possible implementations, if the service usage of the first network slice is less than or equal to the lower service usage limit of the first network slice, the indication information indicates that a resource for service data that has accessed the first network slice is not pre-empted by service data that is to access a second network slice, or the indication information indicates that the service usage of the first network slice is less than or equal to the lower service usage limit of the first network slice.

In some possible implementations, if the service usage of the first network slice is greater than the lower service usage limit of the first network slice and less than or equal to the upper service usage limit of the first network slice, the indication information indicates the second network device to release, for first service data that is to access the first network slice, a resource for service data that has accessed the first network slice or a resource for service data that has accessed another network slice, or the indication information indicates that the service usage of the first network slice is greater than the lower service usage limit of the first network slice and less than the upper service usage limit of the first network slice.

In some possible implementations, if the service usage of the first network slice is greater than or equal to the upper service usage limit of the first network slice, the indication information indicates a RAN to release, for first service data that is to access the first network slice, a resource for service data that has accessed the first network slice, the indication information indicates to forbid first service data that is to access the first network slice from pre-empting a resource for a data service that has accessed another network slice, or the indication information indicates that the service usage of the first network slice is greater than or equal to the upper service usage limit of the first network slice.

In some possible implementations, service data that is to access the first network slice or the service data that has accessed the first network slice is a quality of service (QoS) flow or a protocol data unit (PDU) session, or the service data that is to access the second network slice or service data that has accessed the second network slice is a QoS flow or a PDU session.

According to a second aspect, a communication method is provided, and includes that a second network device receives indication information from a first network device. The second network device releases, based on the indication information for first service data that is to access a first network slice, a resource for second service data that has accessed the first network slice, or the second network device forbids, based on the indication information, a resource for service data that has accessed a first network slice from being pre-empted by any piece of service data that is to access a second network slice.

In the foregoing technical solution, the second network device may determine, based on the indication information, whether to release, for the first service data that is to access the first network slice, the resource for the second service data that has accessed the first network slice or whether to release, for the first service data that is to access the first network slice, a resource for second service data in any network slice, so that the second network device determines a to-be-released resource for the first service data that is to access the first network slice, to better control a resource in the first network slice.

In some possible implementations, that the second network device releases, based on the indication information for first service data that is to access a first network slice, a resource for second service data that has accessed the first network slice includes that the following.

If the indication information indicates the second network device to release, for the first service data that is to access the first network slice, the resource for the service data that has accessed the first network slice, or the indication information indicates that service usage of the first network slice is greater than or equal to an upper service usage limit of the first network slice, the second network device releases, for the first service data that is to access the first network slice, the resource for the second service data that has accessed the first network slice.

In some possible implementations, that the second network device releases, for the first service data that is to access the first network slice, the resource for the second service data that has accessed the first network slice includes that the second network device determines, based on the indication information, to forbid pre-empting, for the first service data that is to access the first network slice, a resource for service data that has accessed a network slice other than the first network slice. The second network device determines, based on an authorized QoS parameter of the first service data and an authorized QoS parameter of the second service data, the second service data in the service data that has accessed the first network slice, where a priority level of the first service data is higher than a priority level of the second service data, a pre-emption capability parameter in an ARP parameter in the authorized QoS parameter of the first service data is set to "pre-empt allowed", and a pre-emption vulnerability parameter in an ARP parameter in the authorized QoS parameter of the second service data is set to "pre-empted allowed".

In some possible implementations, if a resource of the second network device is less than a preset value, the second network device determines, based on an authorized QoS parameter of the first service data and an authorized QoS parameter of the second service data, the second service data in the service data that has accessed the first network slice. Being less than the preset value indicates that an idle resource is less than a preset threshold or that an idle resource is less than a resource required for establishing the first service data.

In some possible implementations, the upper service usage limit of the first network slice is at least one of a maximum quantity of sessions allowed to access the first network slice, a maximum bandwidth of traffic allowed to access the first network slice, or a maximum session density allowed for the first network slice.

In some possible implementations, that the second network device forbids, based on the indication information, a resource for any piece of service data that has accessed the first network slice from being pre-empted by any piece of service data that is to access a second network slice includes the following.

If the indication information indicates, to the second network device, that the resource for the any piece of service data that has accessed the first network slice is not pre-empted by the any piece of service data that is to access the second network slice or that service usage of the first network slice is less than or equal to a lower service usage limit of the first network slice, the second network device forbids the resource for the any piece of service data that has accessed the first network slice from being pre-empted by second service data that is to access the second network slice.

In some possible implementations, the lower service usage limit of the first network slice is at least one of a minimum quantity of sessions guaranteed to access the first network slice, a minimum bandwidth of traffic guaranteed to access the first network slice, or a minimum session density guaranteed for the first network slice.

In some possible implementations, if the second network device forbids, based on the indication information, the resource for the any piece of service data that has accessed the first network slice from being pre-empted by the any piece of service data that is to access the second network slice, the method further includes the following.

The second network device sets a pre-emption vulnerability parameter in an ARP parameter of each piece of service data that has accessed the first network slice to "pre-empted unallowed".

In some possible implementations, if the indication information indicates a RAN to release, for the first service data that is to access the first network slice, the resource for the service data that has accessed the first network slice or a resource for service data that has accessed another network slice, or the indication information indicates that service usage of the first network slice is greater than a lower service usage limit of the first network slice and less than an upper service usage limit of the first network slice, the method further includes that the second network device releases, for the first service data that is to access the first network slice, the resource for the service data that has accessed the first network slice or the resource for the service data that has accessed the other network slice. In other words, the RAN may determine, based on the indication information, to allow the first service in the first network slice to pre-empt the resource for the service data that has accessed the other network slice and allow the resource for the service data that has accessed the first network slice to be pre-empted by service data that is to access the other network slice.

In some possible implementations, service data that is to access the first network slice or the service data that has accessed the first network slice is a QoS flow or a PDU session, or the service data that is to access the second network slice or service data that has accessed the second network slice is a QoS flow or a PDU session.

According to a third aspect, a communication method is provided, and includes that a first network device obtains service usage of a first network slice and a service usage threshold of the first network slice. The first network device determines, based on the service usage of the first network slice and the service usage threshold of the first network slice, whether to release a resource for second service data that has accessed the first network slice and accept a resource for first service data that is to access the first network slice.

In some possible implementations, the service usage threshold of the first network slice includes an upper service usage limit of the first network slice.

That the first network device determines, based on the service usage of the first network slice and the service usage threshold of the first network slice, whether to release a resource for second service data that has accessed the first network slice and accept a resource for first service data that is to access the first network slice includes the following.

If the service usage of the first network slice is greater than or equal to the upper service usage limit of the first network slice, the first network device determines to release the resource for the second service data that has accessed the first network slice and accept the first service data that is to access the first network slice, or if the service usage of the first network slice is less than the upper service usage limit of the first network slice, the first network device determines to accept the first service data that is to access the first network slice.

In some possible implementations, the upper service usage limit of the first network slice is at least one of a maximum quantity of sessions allowed to access the first network slice, a maximum bandwidth of traffic allowed to access the first network slice, or a maximum session density allowed for the first network slice.

In some possible implementations, the method further includes the following.

The first network device determines, based on a QoS parameter of the first service data and a QoS parameter of the second service data, to release the resource for the second service data that has accessed the first network slice and accept the first service data that is to access the first network slice.

In some possible implementations, that the first network device determines, based on a QoS parameter of the first service data and a QoS parameter of the second service data, to release the resource for the second service data that has accessed the first network slice and accept the first service data that is to access the first network slice includes the following.

When a priority level in the QoS parameter of the second service data is lower than a priority level in the QoS parameter of the first service data, and pre-emption vulnerability in the QoS parameter of the second service data is "pre-empt allowed", the first network device determines to release the resource for the second service data that has accessed the first network slice and accept the first service data that is to access the first network slice.

In some possible implementations, the method further includes that the first network device determines, based on at least one of data network names (DNNs), internal group identifiers, service data types, access network types, and terminal device locations of the first service data and the second service data, to release the resource for the second service data that has accessed the first network slice and accept the first service data that is to access the first network slice.

In some possible implementations, service data that is to access the first network slice or service data that has accessed the first network slice is a QoS flow or a PDU session.

According to a fourth aspect, a communication apparatus is provided. The apparatus is configured to perform the method in any possible implementation of the foregoing aspects. Further, the apparatus includes units configured to perform the method in any possible implementation of the foregoing aspects.

According to a fifth aspect, a communication apparatus is provided. The apparatus includes a processor. The processor is coupled to a memory, and may be configured to execute instructions in the memory, to implement the method in any one of the first aspect or the possible implementations of the first aspect, the method in any one of the second aspect or the possible implementations of the second aspect, or the method in any one of the third aspect or the possible implementations of the third aspect.

In a possible implementation, the apparatus further includes the memory. In a possible implementation, the apparatus further includes a communication interface, and the processor is coupled to the communication interface.

In an implementation, the apparatus is a first network device. When the apparatus is the first network device, the communication interface may be a transceiver or an input/output interface.

In another implementation, the apparatus is a chip disposed in a first network device. When the apparatus is the chip disposed in the first network device, the communication interface may be an input/output interface.

In an implementation, the apparatus is a second network device. When the apparatus is the second network device, the communication interface may be a transceiver or an input/output interface.

In another implementation, the apparatus is a chip disposed in a second network device. When the apparatus is the chip disposed in the second network device, the communication interface may be an input/output interface.

According to a sixth aspect, a processor is provided. The processor includes an input circuit, an output circuit, and a processing circuit. The processing circuit is configured to receive a signal through the input circuit, and transmit a signal through the output circuit, so that the processor performs the method in any possible implementation of the foregoing aspects.

In a specific implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. A specific implementation of the processor and various circuits is not limited in this disclosure.

According to a seventh aspect, an apparatus is provided. The apparatus includes a processor and a memory. The processor is configured to read instructions stored in the memory, and may receive a signal through a receiver, and transmit a signal through a transmitter, to perform the method in any possible implementation of the foregoing aspects.

In a possible implementation, there are one or more processors, and there are one or more memories.

In a possible implementation, the memory may be integrated with the processor, or the memory and the processor may be separately disposed.

In a specific implementation process, the memory may be a non-transitory memory, for example, a read-only memory (ROM). The memory and the processor may be integrated on a same chip, or may be disposed on different chips. A type of the memory and a manner of disposing the memory and the processor are not limited in this disclosure.

It should be understood that a related data exchange process such as sending of indication information may be a process of outputting the indication information from the processor, and receiving of capability information may be a process of receiving the capability information by the processor. Further, data output by the processor may be output to a transmitter, and input data received by the processor may be from a receiver. The transmitter and the receiver may be collectively referred to as a transceiver.

The apparatus may be a chip. The processor may be implemented by using hardware, or may be implemented by using software. When the processor is implemented by using the hardware, the processor may be a logic circuit, an integrated circuit, or the like, or when the processor is implemented by using the software, the processor may be a general-purpose processor, and is implemented by reading software code stored in the memory. The memory may be integrated into the processor, or may be located outside the processor and exist independently.

According to an eighth aspect, a computer program product is provided. The computer program product includes a computer program (which may also be referred to as code or instructions). When the computer program is run, a computer is enabled to perform the method in any possible implementation of the foregoing aspects.

According to a ninth aspect, a computer-readable storage medium is provided. The computer-readable storage medium stores a computer program (which may also be referred to as code or instructions). When the computer program is run on a computer, the computer is enabled to perform the method in any possible implementation of the foregoing aspects.

BRIEF DESCRIPTION OF DRAWINGS

FIG. 13A and FIG. 13B are schematic diagrams of a communication method according to an embodiment of this disclosure;

DESCRIPTION OF EMBODIMENTS

The following describes technical solutions in this disclosure with reference to accompanying drawings.

The technical solutions in embodiments of this disclosure may be applied to various communication system, for example, a Global System for Mobile Communications (GSM) system, a code-division multiple access (CDMA) system, a wideband CDMA (WCDMA) system, a General Packet Radio Service (GPRS), a Long-Term Evolution (LTE) system, an LTE frequency-division duplex (FDD) system, an LTE time-division duplex (TDD) system, a Universal Mobile Telecommunication System (UMTS), a Worldwide Interoperability for Microwave Access (WIMAX) communication system, a future 5th generation (5G) system, or a New Radio (NR) system.

Figure 1:
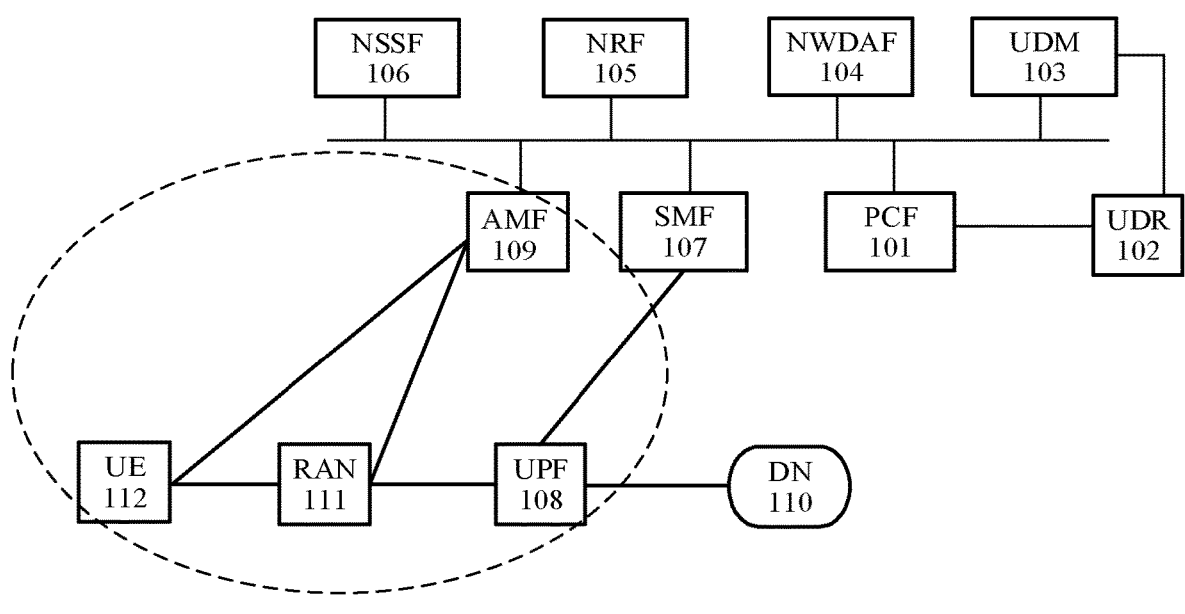
FIG. 1 is a schematic diagram of a system architecture according to an embodiment of this disclosure.

FIG. 1 is a schematic diagram of a system architecture used in an embodiment of this disclosure. As shown in FIG. 1, a system 100 includes at least one of a PCF 101, a unified data repository (UDR) 102, a unified data management (UDM) 103, a network data analytics function (NWDAF) 104, a network repository function (NRF) 105, a network slice selection function (NSSF) network element 106, a session management function (SMF) network element 107, a user plane function (UPF) network element 108, a core access and mobility management function (AMF) 109, a data network (DN) 110, a RAN 111, or a user equipment (UE) 112.

The PCF 101 has a user subscription data management function, a PCF, a charging PCF, a QoS control function, and the like.

The UDR 102 is responsible for storing structured data information, where the data information includes subscription information, policy information, and network data or service data defined in a standard format.

The UDM 103 is responsible for managing subscription information of the UE 112.

The NWDAF 104 may collect data from various network functions (NFs) such as the PCF 101, the SMF 107, the UPF 108, and the AMF 109, and perform analysis and prediction.

The NRF 105 is responsible for storing and selecting network functional entity information for another network element.

The NSSF 106 selects an appropriate network slice for service data of the UE 112.

The SMF 107 is responsible for UPF selection or reselection, Internet Protocol (IP) address allocation, session establishment, modification, and release, and QoS control.

The UPF 108 is mainly responsible for processing service data, for example, forwarding, charging, and lawful interception. The UPF 108 may also be referred to as a protocol data unit (PDU) session anchor (PSA).

The AMF 109 is mainly used for attachment, mobility management, and a tracking area update procedure of the UE 112 in a mobile network. The access management network element terminates a non-access stratum (NAS) message, completes registration management, connection management, reachability management, tracking area (TA) list allocation, mobility management, and the like, and transparently routes a session management (SM) message to the session management network element.

The DN 110 provides a data transmission service for the UE 112, and may be a public data network (PDN), for example, the internet.

The RAN 111 may be a device that communicates with the UE 112. The RAN 111 may also be referred to as an access network device or a RAN device. The RAN 111 may be a transmission reception point (TRP), may be an evolved NodeB (eNB or eNodeB) in an LTE system, may be a home base station (for example, a home evolved NodeB or a home NodeB (HNB)) or a base band unit (BBU), or may be a radio controller in a cloud RAN (CRAN) scenario. Alternatively, the RAN 111 may be a relay station, an access point, a vehicle-mounted device, a wearable device, a network device in a 5G network, a network device in a future evolved public land mobile network (PLMN), or the like, may be an AP in a wireless local area network (LAN) (WLAN), or may be a gNB in an NR system. Alternatively, the RAN 111 may be a metro base station, a micro base station, a picocell base station, a femto base station, or the like. This is not limited in this disclosure.

In a network structure, the RAN 111 may include a centralized unit (CU) node, a distributed unit (DU) node, a RAN device including the CU node and the DU node, or a device including a control plane CU node (CU-CP node), a user plane CU node (CU-UP node), and the DU node.

The RAN 111 provides a service for a cell. The UE 112 communicates with the cell by using a transmission resource (for example, a frequency domain resource or a spectrum resource) allocated by the RAN 111. The cell may belong to a macro base station (for example, a macro eNB or a macro gNB), or may belong to a base station corresponding to a small cell. The small cell herein may include a metro cell, a micro cell, a pico cell, a femto cell, and the like. These small cells have characteristics of small coverage and low transmit power, and are applicable to providing a high-rate data transmission service.

The UE 112 may also be referred to as a terminal device, a mobile station (MS), a mobile terminal (MT), an access terminal, a subscriber unit, a subscriber station, a remote station, a remote terminal, a mobile device, a user terminal, a terminal, a wireless communication device, a user agent, a user apparatus, or the like.

The UE 112 may be a device that provides a voice/data connectivity for a user, for example, a handheld device or a vehicle-mounted device that has a wireless connection function. Examples of some terminal devices include a mobile phone, a tablet computer, a laptop computer, a palmtop computer, a mobile Internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, a cellular phone, a cordless telephone set, a Session Initiation Protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal device in the 5G network, a terminal device in the future evolved PLMN, or the like. This is not limited in this disclosure.

It should be noted that names of the network elements (for example, the SMF 107, the PCF 101, the RAN 111, the UPF 108, and the NSSF 106) included in FIG. 1 are merely names, and the names do not constitute any limitation on the functions of the network elements. In the 5G network and another future network, the foregoing network elements may alternatively have other names. This is not further limited in embodiments of this disclosure. For example, in a sixth generation (6G) network, some or all of the foregoing network elements may still use terms in 5G, or may have other names. A general description is provided herein. Details are not described again below.

It should be noted that the network elements in FIG. 1 do not necessarily exist simultaneously, and required network elements may be determined based on a requirement. A connection relationship between the network elements in FIG. 1 is not uniquely determined, and may be adjusted based on a requirement.

To facilitate understanding of embodiments of this disclosure, terms in this disclosure are first briefly described.
1. Network Slice:

The network slice is an end-to-end logical dedicated network that provides a specific network capability. Through flexible allocation of network resources and on-demand networking, a plurality of logical subnets having different features and isolated from each other may be virtualized on a same set of physical infrastructures to provide a service for a user in a targeted manner. The logical subnets are referred to as network slices. The network slice may be used by an operator, and provide mutually isolated network services having customizable functions for different vertical industries, different customers, and different services based on service level agreements (SLAs) signed by the customers. Different network slices may be identified and differentiated by using single network slice selection assistance information (S-NSSAI).

It should be noted that network functions such as the NSSF 106, the NRF 105, the NWDAF 104, the UDM 103, the UDR 102, and the AMF 109 in FIG. 1 may be shared by a plurality of network slices, the SMF 107 and the UPF 108 may belong to a specific network slice, and the RAN 111 may also be shared by a plurality of network slices.
2. Qos Parameter:

The QoS parameter includes parameters such as a 5G QoS identifier (5QI), an ARP, a flow bit rate (FBR), and an aggregate bit rate (ABR). The 5QI is used to identify a feature of service data. The FBR is valid for guaranteed bit rate service data, and includes a guaranteed FBR (GFBR) and a maximum FBR (MFBR). The ABR is valid for non-guaranteed bit rate service data, and includes a session aggregate maximum bit rate (session-AMBR) and a UE aggregate maximum bit rate (UE-AMBR).
3. Arp Parameter:

The ARP parameter is priority information of service data specified when a service data request is established or the service data request is modified, and includes a priority level (ARP-PL) parameter, a pre-emption capability (ARP-PE_C) parameter, and a pre-emption vulnerability (ARP-PE_V) parameter. ARP-PL represents a priority level of the service data in a case in which a resource is insufficient, and may be an integer. Different values represent different priority levels. For example, A smaller value indicates a higher priority level. ARP-PE_C is used to indicate whether a resource for other service data with a low priority level can be pre-empted when the resource is insufficient. The ARP-PE_V parameter is used to indicate whether a resource occupied by the service data is allowed, when the resource is insufficient, to be released and pre-empted by service data with a high priority level.

In a conventional technology, a capacity of a network slice is limited. If a piece of current service data is to access the network slice, a resource in the network slice or a resource in a network slice other than the network slice may be pre-empted for the service data. However, a user may purchase a network slice with a fixed resource size from an operator. If a resource occupied by service data that has accessed the network slice has reached an upper limit of a resource in the purchased network slice, and if a resource in another network slice continues to be pre-empted for the service data, the pre-empted resource is more than the resource in the network slice actually purchased by the user. Consequently, resource planning of the network slice is not equivalent to a tariff, and feasibility of planning the resource in the network slice is affected.

Communication methods provided in embodiments of this disclosure are described below by using an example in which a first network device is the PCF 101 and a second network device is the RAN 111. However, embodiments of this disclosure are not limited thereto. For ease of description, a number of a network element is omitted below. For example, a "PCF" represents the "PCF 101", and a "RAN" represents the "RAN 111".

Figure 2:
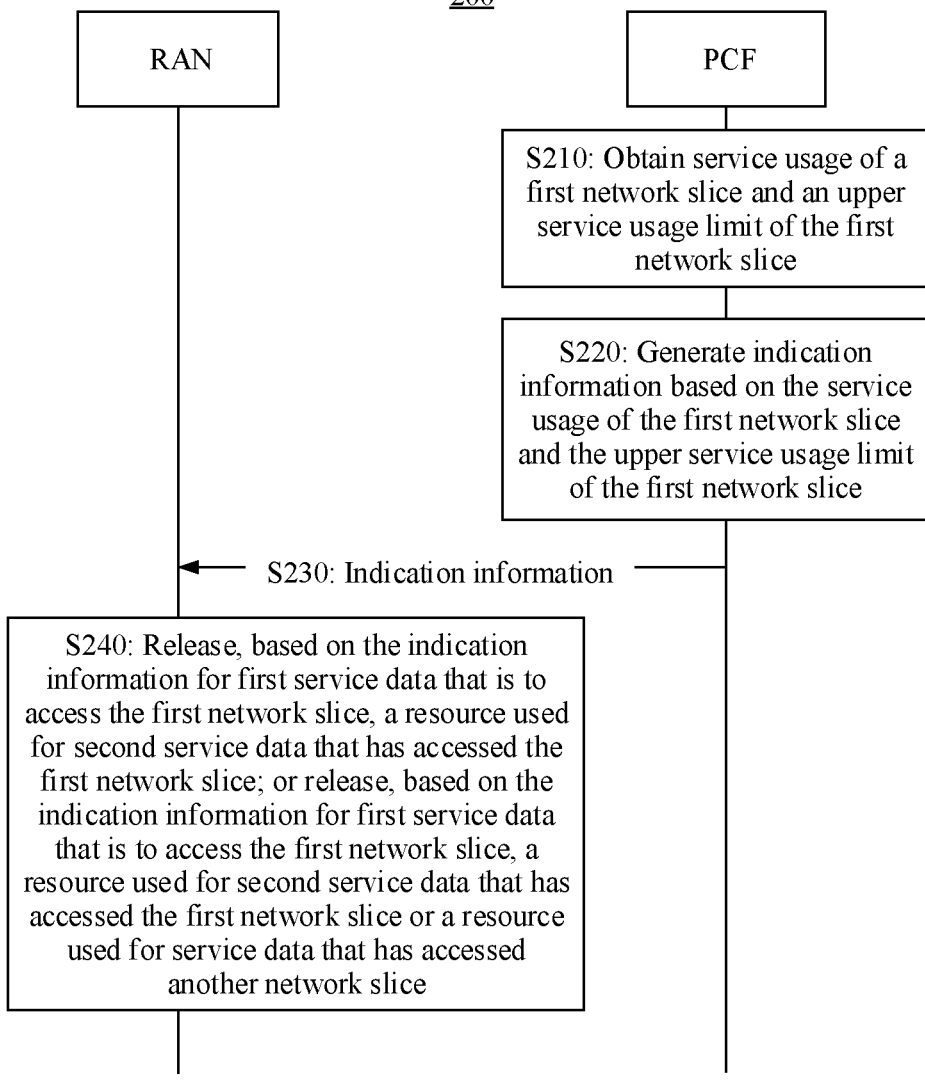
FIG. 2 is a schematic diagram of a communication method according to an embodiment of this disclosure.

A communication method 200 mentioned in an embodiment of this disclosure is described below with reference to FIG. 2.

S210: The PCF obtains service usage of a first network slice and an upper service usage limit of the first network slice.

Optionally, the PCF may determine the service usage of the first network slice and the upper service usage limit of the first network slice. Optionally, the PCF may obtain the service usage of the first network slice and the upper service usage limit of the first network slice from another network element. For example, the PCF obtains the upper service usage limit of the first network slice from a UDR/UDM, or the PCF obtains, by using a UDR/UDM, the upper service usage limit that is of the first network slice and that is sent by an operation administration and maintenance (OAM). For another example, the PCF may obtain the service usage of the first network slice from the UDR.

Optionally, the service usage of the first network slice may be a quantity of sessions that have accessed the first network slice, a traffic bandwidth occupied by service data that has accessed the first network slice, or a density of the sessions that have accessed the first network slice. A service usage threshold of the first network slice may include the upper service usage limit of the first network slice.

Further, when the service usage of the first network slice is the quantity of sessions that have accessed the first network slice, the upper service usage limit of the first network slice is a maximum quantity of sessions allowed to access the first network slice, when the service usage of the first network slice is the traffic bandwidth occupied by the service data that has accessed the first network slice, the upper service usage limit of the first network slice is a maximum bandwidth of traffic allowed to access the first network slice, or when the service usage of the first network slice is the density of the sessions that have accessed the first network slice, the upper service usage limit of the first network slice is a maximum session density allowed for the first network slice.

As shown in FIG. 1, a service area of the first network slice may include one or more RANs. Each RAN has a coverage area that may be one or more cells. In addition, the service area of the first network slice may alternatively include a service area of a UPF, especially some UPFs deployed at a mobile edge computing (MEC) location. A size of the service area of the UPF is one or more areas covered by a gNB. The service area of the first network slice may include at least one cell and/or at least one UPF service area. A ratio of sessions that have accessed the service area of the first network slice to an area of the service area of the first network slice may be understood as the density of the sessions that have accessed the first network slice. Correspondingly, the service usage threshold of the first network slice is a maximum allowed value of the ratio of the sessions that have accessed the first network slice to the area of the service area of the first network slice.

S220: The PCF generates indication information based on the service usage of the first network slice and the upper service usage limit of the first network slice.

S220 is described in four cases below.

Case 1: If the service usage of the first network slice is greater than or equal to the upper service usage limit of the first network slice, the indication information indicates the RAN to release, for first service data that is to access the first network slice, a resource for the service data that has accessed the first network slice. In other words, the indication information indicates to forbid first service data that is to access the first network slice from pre-empting a resource for a data service that has accessed another network slice.

Case 2: If the service usage of the first network slice is greater than or equal to the upper service usage limit of the first network slice, the indication information indicates that the service usage of the first network slice is greater than or equal to the upper service usage limit of the first network slice.

Case 3: If the service usage of the first network slice is less than the upper service usage limit of the first network slice, the indication information indicates that, when a resource is insufficient, the RAN may release, for first service data that is to access the first network slice, a resource for the service data that has accessed the first network slice or a resource for service data that has accessed another network slice, that is, not forbid the first service data that is to access the first network slice from pre-empting the resource for the data service that has accessed the other network slice. In other words, the first service data that is to access the first network slice may pre-empt the resource for the data service that has accessed the other network slice, or may pre-empt the resource for the service data that has accessed the first network slice.

It should be noted that, when the indication information indicates that the service usage of the first network slice is equal to the upper service usage limit of the first network slice, S220 may be implemented based on case 1, or may be implemented based on case 3.

Case 4: If the service usage of the first network slice is less than the upper service usage limit of the first network slice, the indication information indicates that the service usage of the first network slice is less than the upper service usage limit of the first network slice.

S230: The PCF sends the indication information to the RAN, and the RAN receives the indication information sent by the PCF.

Optionally, S230 may include that the PCF directly sends the indication information to the RAN, and the RAN directly receives the indication information sent by the PCF. Optionally, S230 may include that the PCF may send the indication information to the RAN by using another network element, and the RAN receives, by using the other network element, the indication information sent by the PCF. For example, the PCF may send the indication information to the RAN by using an SMF and/or an AMF, and the RAN receives, by using the SMF and/or the AMF, the indication information sent by the PCF.

S240: The RAN releases, based on the indication information for the first service data that is to access the first network slice, a resource for second service data that has accessed the first network slice, or the RAN releases, based on the indication information for the first service data that is to access the first network slice, a resource for second service data that has accessed the first network slice or the resource for the service data that has accessed the other network slice.

S240 is described in four cases below.

Case 1: In case 1 in S220, S240 includes that the RAN may directly determine, based on the indication information, to release, for the first service data that is to access the first network slice, the resource for the second service data that has accessed the first network slice. In other words, the RAN may determine, based on the indication information, to forbid the first service data that is to access the first network slice from pre-empting the resource for the data service that has accessed the other network slice.

Case 2: In case 2 in S220, S240 includes that the RAN may determine, based on the indication information, that the service usage of the first network slice has reached the upper service usage limit of the first network slice. Therefore, the RAN may release, for the first service data that is to access the first network slice, the resource for the second service data that has accessed the first network slice.

Case 3: In case 3 in S220, S240 includes that the RAN may directly determine, based on the indication information, to release, for the first service data that is to access the first network slice, the resource for the service data that has accessed the first network slice or the resource for the service data that has accessed the other network slice. In other words, the RAN determines, based on the indication information, to not forbid the first service data that is to access the first network slice from pre-empting the resource for the data service that has accessed the other network slice.

Case 4: In case 4 in S220, S240 includes that the RAN may determine, based on the indication information, that the service usage of the first network slice does not reach the upper service usage limit of the first network slice, and the RAN may determine, based on the indication information, to release, for the first service data that is to access the first network slice, the resource for the service data that has accessed the first network slice or the resource for the service data that has accessed the other network slice. In this way, when the service usage of the first network slice does not reach the upper service usage limit of the first network slice, the RAN may release, for the first service data that is to access the first network slice currently, a resource for service data has accessed any network slice.

In an optional embodiment, S240 includes that the RAN determines, based on the indication information received in S230, to pre-empt, for the first service data that is to access the first network slice, the resource for the service data in the first network slice or pre-empt, for the first service data that is to access the first network slice, the resource for the service data that has accessed the any network slice. If the RAN determines that a current available resource of the RAN is insufficient, for example, the current available resource is less than or equal to a preset value, the RAN needs to determine, based on a QoS parameter of the first service data that is to access the first network slice and the service data that has accessed the first network slice or the other network slice, to release, for the first service data that is to access the first network slice, a resource for which piece of service data that has accessed the first network slice or the other network slice. For example, if service data that is to access the first network slice and the service data that has accessed the first network slice or the other network slice are PDU sessions, the resource for which piece of service data that has accessed the first network slice or the other network slice is released for the first service data that is to access the first network slice may be determined based on ARP-PE-C and ARP-PL in a subscribed default QoS parameter or a to-be-authorized default QoS parameter of a newly established PDU session and ARP-PE-V and ARP-PL in an authorized default QoS parameter of an established PDU session. For another example, if service data that is to access the first network slice and the service data that has accessed the first network slice or the other network slice are QoS flows, the resource for which piece of service data that has accessed the first network slice or the other network slice is released for the first service data that is to access the first network slice may be determined based on ARP-PE-C and ARP-PL in an authorized QoS parameter of a QoS flow that is being established or modified and ARP-PE-V and ARP-PL in an authorized QoS parameter of an established QoS flow. Discussion is performed in different cases below.

(a) If a priority level of the first service data that is to access the first network slice is lower than or equal to a priority level of any piece of service data that has accessed the first network slice or lower than a priority level of any piece of service data that has accessed the other network slice, for example, an ARP-PL value of the first service data that is to access the first network slice is greater than an ARP-PL value of the any piece of service data that has accessed the first network slice or greater than an ARP-PL value of the any piece of service data of that has accessed the other network slice (where a smaller ARP-PL value indicates a higher priority level), the RAN determines to forbid releasing, for the first service data that is to access the first network slice, a resource for any piece of service data. If ARP-PE_C of the first service data that is to access the first network slice is set to "pre-empt unallowed", the RAN determines to forbid releasing, for the first service data that is to access the first network slice, a resource for any piece of service data. The first service data that is to access the first network slice is terminated because the RAN cannot allocate a resource.

(b) If a priority level of the first service data that is to access the first network slice is higher than a priority level of the second service data that has accessed the first network slice or higher than a priority level of second service data that has accessed the other network slice, for example, an ARP-PL value of the second service data is greater than an ARP-PL value of the first service data that is to access the first network slice (where a smaller ARP-PL value indicates a higher priority level), ARP-PE_C of the first service data is set to "pre-empt allowed", and ARP-PE_V of the second service data is set to "pre-empted allowed", the RAN determines to release, for the first service data that is to access the first network slice, the resource for the second service data that has accessed the first network slice or a resource for the second service data that has accessed the other network slice.

Therefore, in the method 200, the PCF may determine the indication information based on the service usage of the first network slice and the upper service usage limit of the first network slice. In this way, the RAN may determine, based on the indication information, whether to release, for the first service data that is to access the first network slice, the resource for the second service data that has accessed the first network slice or whether to release, for the first service data that is to access the first network slice, a resource for second service data in the any network slice, so that the RAN determines a to-be-released resource for the first service data that is to access the first network slice, to better control a resource in the first network slice. In addition, while high-priority-level or important data services access the first network slice as much as possible, it is guaranteed that the resource in the first network slice does not exceed an upper limit.

Figure 3:
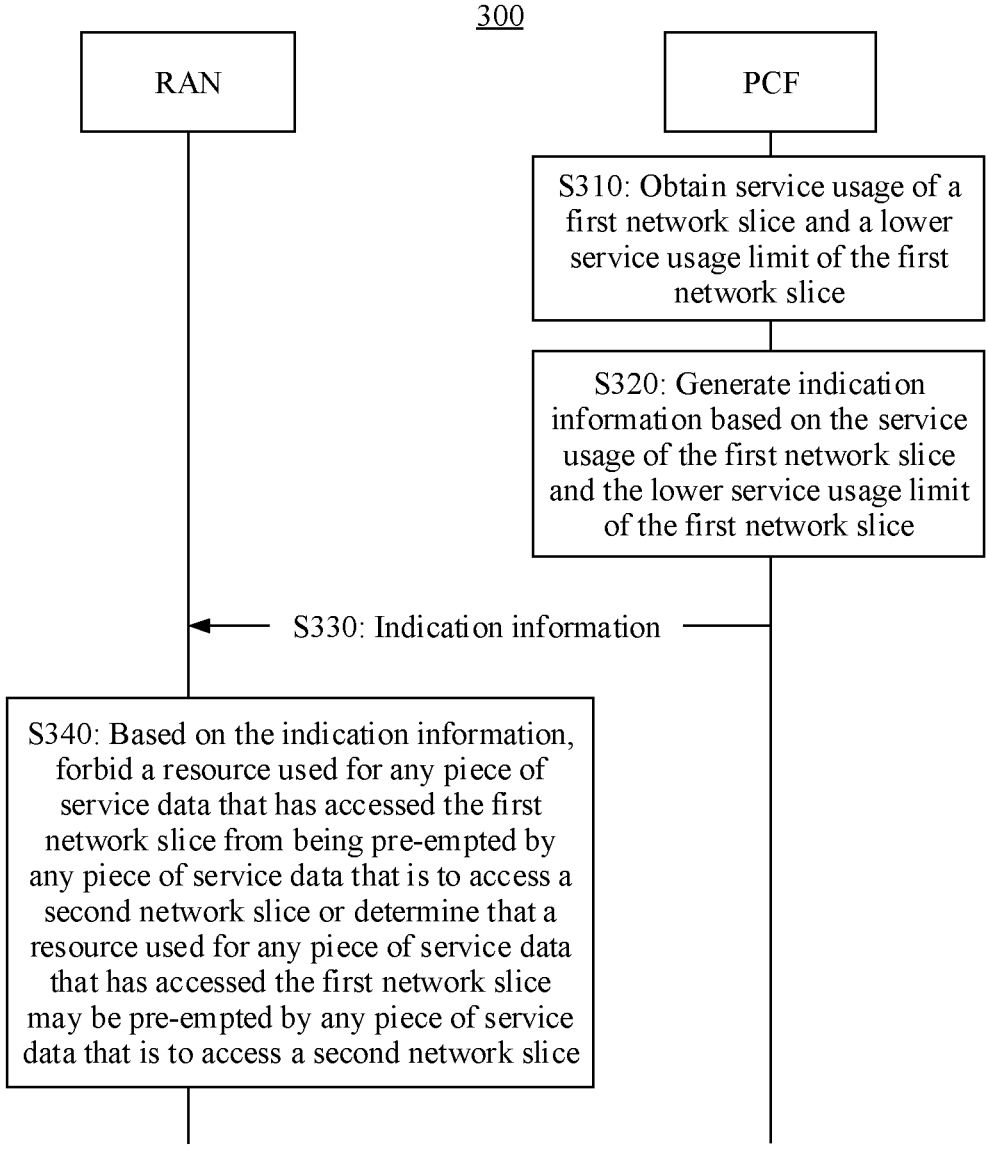
FIG. 3 is a schematic diagram of a communication method according to an embodiment of this disclosure.

A communication method 300 mentioned in an embodiment of this disclosure is described below with reference to FIG. 3.

S310: The PCF obtains service usage of a first network slice and a lower service usage limit of the first network slice.

Optionally, the PCF may determine the service usage of the first network slice and the lower service usage limit of the first network slice. Optionally, the PCF may obtain the service usage of the first network slice and the lower service usage limit of the first network slice from another network element. For example, the PCF obtains the lower service usage limit of the first network slice from a UDR/UDM, or the PCF obtains, by using a UDR/UDM, the lower service usage limit that is of the first network slice and that is sent by an OAM. For another example, the PCF may obtain the service usage of the first network slice from the UDR.

Optionally, the service usage of the first network slice may be a quantity of sessions that have accessed the first network slice, a traffic bandwidth occupied by service data that has accessed the first network slice, or a density of the sessions that have accessed the first network slice. A service usage threshold of the first network slice may include the lower service usage limit of the first network slice.

Further, when the service usage of the first network slice is the quantity of sessions that have accessed the first network slice, the lower service usage limit of the first network slice is a minimum quantity of sessions guaranteed to access the first network slice, when the service usage of the first network slice is the traffic bandwidth occupied by the service data that has accessed the first network slice, the lower service usage limit of the first network slice is a minimum bandwidth of traffic guaranteed to access the first network slice, or when the service usage of the first network slice is the density of the sessions that have accessed the first network slice, the lower service usage limit of the first network slice is a minimum session density guaranteed for the first network slice.

S320: The PCF generates indication information based on the service usage of the first network slice and the lower service usage limit of the first network slice.

S320 is described in four cases below.

Case 1: If the service usage of the first network slice is less than or equal to the lower service usage limit of the first network slice, the indication information indicates that the resource for the service data that has accessed the first network slice is not pre-empted by service data that is to access a second network slice.

Case 2: If the service usage of the first network slice is less than or equal to the lower service usage limit of the first network slice, the indication information indicates that the service usage of the first network slice is less than or equal to the lower service usage limit of the first network slice.

Case 3: If the service usage of the first network slice is greater than the lower service usage limit of the first network slice, the indication information indicates that the resource for the service data that has accessed the first network slice may be pre-empted by service data that is to access a second network slice.

Similarly, when the service usage of the first network slice is equal to the lower service usage limit of the first network slice, S320 may be implemented by using case 1, or may be implemented by using case 3.

Case 4: If the service usage of the first network slice is greater than the lower service usage limit of the first network slice, the indication information indicates that the service usage of the first network slice is greater than the lower service usage limit of the first network slice.

S330: The PCF sends the indication information to the RAN, and the RAN receives the indication information sent by the PCF.

Optionally, S330 may include that the PCF directly sends the indication information to the RAN, and the RAN directly receives the indication information sent by the PCF. Optionally, S330 may include that the PCF may send the indication information to the RAN by using another network element, and the RAN receives, by using the other network element, the indication information sent by the PCF. For example, the PCF may send the indication information to the RAN by using an SMF and/or an AMF, and the RAN receives, by using the SMF and/or the AMF, the indication information sent by the PCF.

S340: Based on the indication information, the RAN forbids the resource for the service data that has accessed the first network slice from being pre-empted by the service data that is to access the second network slice or determines that the resource for the service data that has accessed the first network slice may be pre-empted by the service data that is to access the second network slice.

S340 is described in two cases below.

Case 1: In case 1 in S320, S340 includes that the RAN may directly determine, based on the indication information, to forbid the resource for the service data that has accessed the first network slice from being pre-empted by the service data that is to access the second network slice.

Case 2: In case 2 in S320, S340 includes that the RAN may determine, based on the indication information, that the service usage of the first network slice does not reach the lower service usage limit of the first network slice. To ensure a minimum guaranteed amount of the service usage of the first network slice, the RAN forbids a resource for any piece of service data that has accessed the first network slice from being pre-empted by the service data that is to access the second network slice.

Case 3: In case 3 in S320, S340 includes that the RAN may directly determine, based on the indication information, that a resource for any piece of service data that has accessed the first network slice may be pre-empted by the service data that is to access the second network slice.

Case 4: In Case 4 in S320, S340 includes that the RAN may determine, based on the indication information, that the service usage of the first network slice has reached the lower service usage limit of the first network slice, and the RAN may determine, based on the indication information, that the resource for the service data that has accessed the first network slice may be pre-empted by the service data that is to access the second network slice.

In case 1 and case 2 in S340, if the RAN may determine, based on the indication information, to forbid the resource for the service data that has accessed the first network slice from being pre-empted by the service data that is to access the second network slice, the RAN sets a pre-emption vulnerability parameter in an ARP parameter of each piece of service data that has accessed the first network slice to "pre-empted unallowed", or the RAN marks the first network slice as "pre-empted unallowed". That is, the resource for the any piece of service data that has accessed the first network slice is not allowed to be pre-empted or released.

Therefore, in the method 300, the PCF may determine the indication information based on the service usage of the first network slice and the lower service usage limit of the first network slice. In this way, the RAN may determine, based on the indication information, minimum service usage guaranteed for the first network slice, so that the RAN can control a resource in the first network slice.

Figure 4:
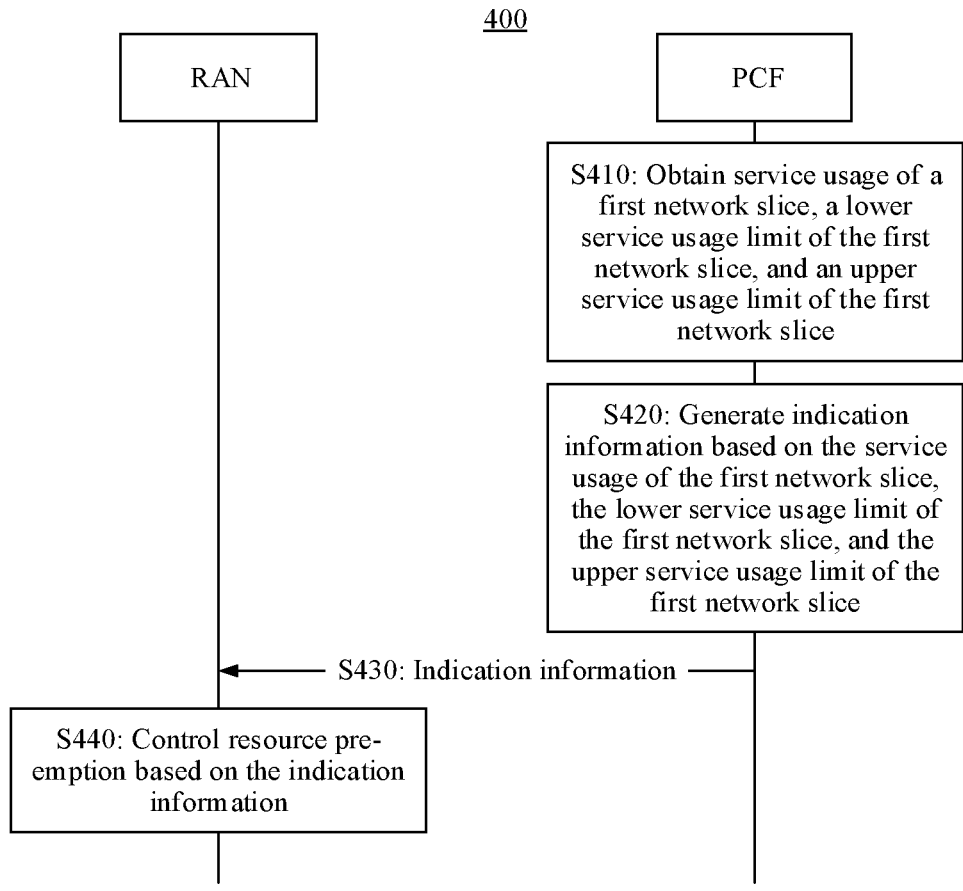
FIG. 4 is a schematic diagram of a communication method according to an embodiment of this disclosure.
Figure 5:
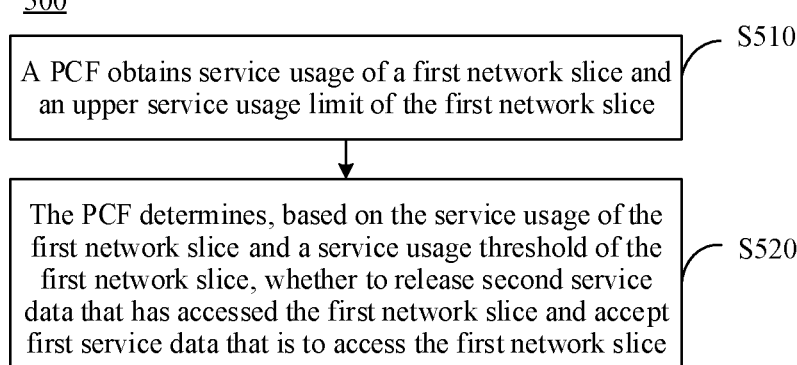
FIG. 5 is a schematic diagram of a communication method according to an embodiment of this disclosure.

A communication method 400 mentioned in an embodiment of this disclosure is described below with reference to FIG. 4.

S410: The PCF obtains service usage of a first network slice, a lower service usage limit of the first network slice, and an upper service usage limit of the first network slice.

Optionally, the PCF may determine the service usage of the first network slice, the lower service usage limit of the first network slice, and the upper service usage limit of the first network slice. Optionally, the PCF may obtain the service usage of the first network slice, the lower service usage limit of the first network slice, and the upper service usage limit of the first network slice from another network element. For example, the PCF obtains the upper service usage limit of the first network slice and the lower service usage limit of the first network slice from a UDR/UDM. For another example, the PCF may obtain the service usage of the first network slice from the UDR.

Optionally, the service usage of the first network slice may be a quantity of sessions that have accessed the first network slice, a traffic bandwidth occupied by service data that has accessed the first network slice, or a density of the sessions that have accessed the first network slice. A service usage threshold of the first network slice may include the lower service usage limit of the first network slice and the upper service usage limit of the first network slice.

Further, when the service usage of the first network slice is the quantity of sessions that have accessed the first network slice, the upper service usage limit of the first network slice is a maximum quantity of sessions allowed to access the first network slice, and the lower service usage limit of the first network slice is a minimum quantity of sessions guaranteed to access the first network slice. When the service usage of the first network slice is the traffic bandwidth occupied by the service data that has accessed the first network slice, the lower service usage limit of the first network slice is a minimum bandwidth of traffic guaranteed to access the first network slice, and the upper service usage limit of the first network slice is a maximum bandwidth of traffic allowed to access the first network slice. When the service usage of the first network slice is the density of the sessions that have accessed the first network slice, the lower service usage limit of the first network slice is a minimum session density guaranteed for the first network slice, and the upper service usage limit of the first network slice is a maximum session density allowed for the first network slice.

S420: The PCF generates indication information based on the service usage of the first network slice, the lower service usage limit of the first network slice, and the upper service usage limit of the first network slice.

S420 is described in six cases below.

Case 1: If the service usage of the first network slice is less than or equal to the lower service usage limit of the first network slice, the indication information indicates that a resource for the service data that has accessed the first network slice is not pre-empted by service data that is to access a second network slice.

Case 2: If the service usage of the first network slice is less than or equal to the lower service usage limit of the first network slice, the indication information indicates that the service usage of the first network slice is less than or equal to the lower service usage limit of the first network slice.

Case 3: If the service usage of the first network slice is greater than the lower service usage limit of the first network slice and less than or equal to the upper service usage limit of the first network slice, the indication information indicates the RAN to release, for first service data that is to access the first network slice, a resource for the service data that has accessed the first network slice or a resource for service data that has accessed another network slice.

Case 4: If the service usage of the first network slice is greater than the lower service usage limit of the first network slice and less than the upper service usage limit of the first network slice, the indication information indicates that the service usage of the first network slice is greater than the lower service usage limit of the first network slice and less than the upper service usage limit of the first network slice.

Case 5: If the service usage of the first network slice is greater than or equal to the upper service usage limit of the first network slice, the indication information indicates the RAN to release, for first service data that is to access the first network slice, a resource for the service data that has accessed the first network slice, or the indication information indicates to forbid first service data that is to access the first network slice from pre-empting a resource for a data service that has accessed another network slice.

Similarly, if the service usage of the first network slice is equal to the upper service usage limit of the first network slice, S420 may correspond to case 1, may correspond to case 3, or may correspond to case 5.

Case 6: If the service usage of the first network slice is greater than or equal to the upper service usage limit of the first network slice, the indication information indicates that the service usage of the first network slice is greater than or equal to the upper service usage limit of the first network slice.

S430: The PCF sends the indication information to the RAN, and the RAN receives the indication information sent by the PCF.

Optionally, S430 may include that the PCF directly sends the indication information to the RAN, and the RAN directly receives the indication information sent by the PCF. Optionally, S430 may include that the PCF may send the indication information to the RAN by using another network element, and the RAN receives, by using the other network element, the indication information sent by the PCF. For example, the PCF may send the indication information to the RAN by using an SMF and/or an AMF, and the RAN receives, by using the SMF and/or the AMF, the indication information sent by the PCF.

S440: The RAN controls resource pre-emption based on the indication information.

S440 is described in six cases below.

Case 1: In case 1 in S420, S440 includes that the RAN may directly determine, based on the indication information, to forbid a resource for any piece of service data that has accessed the first network slice from being pre-empted by any piece of service data that is to access the second network slice.

Case 2: In case 2 in S420, S440 includes that the RAN may determine, based on the indication information, that the service usage of the first network slice does not reach the lower service usage limit of the first network slice. To ensure a minimum guaranteed amount of the service usage of the first network slice, the RAN forbids a resource for any piece of service data that has accessed the first network slice from being pre-empted by any piece of service data that is to access the second network slice.

Case 3: In Case 3 in S420, S440 includes that the RAN may directly determine, based on the indication information, to release, for the first service data that is to access the first network slice, the resource for the service data that has accessed the first network slice or the resource for the service data that has accessed the other network slice. In other words, the RAN may determine, based on the indication information, to allow the first service in the first network slice to pre-empt the resource for the service data that has accessed the other network slice and allow the resource for the service data that has accessed the first network slice to be pre-empted by service data that is to access the other network slice.

Case 4: In case 4 in S420, S440 includes that the RAN may determine, based on the indication information, that the service usage of the first network slice does not reach the upper service usage limit of the first network slice but has reached the lower service usage limit of the first network slice, and the RAN may determine, based on the indication information, to release, for first service data that is to access the first network slice, a resource for service data that has accessed the first network slice or a resource for service data that has accessed another network slice. In other words, the RAN may determine, based on the indication information, to allow the first service in the first network slice to pre-empt the resource for the service data that has accessed the other network slice and allow the resource for the service data that has accessed the first network slice to be pre-empted by service data that is to access the other network slice.

Case 5: In case 5 in S420, S440 includes that the RAN may directly determine, based on the indication information, to release, for the first service data that is to access the first network slice, a resource for second service data that has accessed the first network slice. In other words, the RAN may determine, based on the indication information, to forbid the first service data that is to access the first network slice from pre-empting the resource for the service data that has accessed the other network slice.

Case 6: In case 6 in S420, S440 includes that the RAN may determine, based on the indication information, that the service usage of the first network slice has reached the upper service usage limit of the first network slice. Therefore, the RAN may need to release, for first service data that is to access the first network slice, a resource for second service data that has accessed the first network slice. In other words, the RAN may determine, based on the indication information, to forbid the first service data that is to access the first network slice from pre-empting a resource for service data that has accessed another network slice.

In case 1 and case 2 in S440, if the RAN may determine, based on the indication information, to forbid the resource for the service data that has accessed the first network slice from being pre-empted by the service data that is to access the second network slice, the RAN sets a pre-emption vulnerability parameter in an ARP parameter of each piece of service data that has accessed the first network slice to "pre-empted unallowed", or the RAN marks the first network slice as "pre-empted unallowed". That is, the resource for the any piece of service data that has accessed the first network slice is not allowed to be released.

In case 5 and case 6 in S440, the service usage of the first network slice reaches the upper limit. Even if a resource of the RAN is sufficient, the RAN needs to determine to pre-empt, for the first service data that is to access the first network slice, a resource for service data in the first network slice. For a specific piece of service data in the first network slice, where a resource for the specific piece of service data is to be pre-empted, refer to the descriptions in the method 200. To avoid repetition, details are not described herein.

In Case 3 to Case 6 in S440, when a current available resource of the RAN is insufficient (that is, the current available resource is less than a preset threshold, or the current available resource is less than the resource required for the first service data that is to access the first network slice), the RAN needs to determine to pre-empt, for the first service data that is to access the first network slice, a resource for service data in the first network slice or pre-empt, for the first service data that is to access the first network slice, a resource for service data that has accessed any network slice. For a specific piece of service data in the first network slice or the other network slice, where a resource for the specific piece of service data is to be pre-empted, refer to the descriptions in the method 200. To avoid repetition, details are not described herein.

Therefore, in the method 400, the PCF may determine the indication information based on the service usage of the first network slice, the lower service usage limit of the first network slice, and the upper service usage limit of the first network slice. In this way, the RAN can determine the minimum guaranteed service usage of the first network slice and maximum allowed service usage of the first network slice based on the indication information. When the service usage of the first network slice reaches or exceeds the upper service usage limit of the first network slice, regardless of whether the resource of the RAN is sufficient, the RAN releases, for the first service data that is to access the first network slice, the resource for the service data that has accessed the first network slice, and cannot pre-empt, for the first service data that is to access the first network slice, a resource in the network slice other than the first network slice, so that it can be ensured that a pre-empted resource does not exceed an upper limit of a resource in the first network slice. When the service usage of the first network slice is greater than the lower service usage limit of the first network slice but does not reach or exceed the upper service usage limit of the first network slice, the RAN may release, for the first service data that is to access the first network slice, a resource for service data that has accessed any network slice whose service usage exceeds the lower service usage limit.

In the method 200, the method 300, and the method 400, the PCF generates the indication information, and sends the indication information to the RAN, and the RAN controls the resource pre-emption based on the indication information. In a method 500 described below, the PCF controls whether to release a resource for second service data that has accessed a first network slice and accept a resource for first service data that is to access the first network slice.

S510: The PCF obtains service usage of the first network slice and an upper service usage limit of the first network slice.

Optionally, the PCF may determine the service usage of the first network slice and the upper service usage limit of the first network slice. Optionally, the PCF may obtain the service usage of the first network slice and the upper service usage limit of the first network slice from another network element. For example, the PCF obtains the upper service usage limit of the first network slice from a UDR/UDM, or the PCF obtains, by using a UDR/UDM, the upper service usage limit that is of the first network slice and that is sent by an OAM. For another example, the PCF may obtain the service usage of the first network slice from the UDR.

Further, for descriptions of the service usage of the first network slice and the upper service usage limit of the first network slice, refer to the descriptions in the method 200.

S520: The PCF determines, based on the service usage of the first network slice and a service usage threshold of the first network slice, whether to release the resource for the second service data that has accessed the first network slice and accept the resource for the first service data that is to access the first network slice.

S520 may be discussed in two cases.

Case 1: S520 includes that if the service usage of the first network slice is greater than or equal to the upper service usage limit of the first network slice, the PCF determines to release service data that has accessed the first network slice and accept the resource for the first service data that is to access the first network slice.

In Case 1, if the PCF determines to release the service data that has accessed the first network slice and accept the resource for the first service data that is to access the first network slice, the PCF needs to determine a specific piece of to-be-released service data that has accessed the first network slice. The specific piece of to-be-released service data that has accessed the first network slice may be determined in at least one of the following manners.

(a) The PCF determines, based on a QoS parameter of the service data that has accessed the first network slice and a QoS parameter of the first service data that is to access the first network slice, to release the resource for the second service data in the service data that has accessed the first network slice and accept the resource for the first service data that is to access the first network slice. Further, a priority level (namely, an ARP-PE-PL parameter) of the service data that has accessed the first network slice is determined based on an authorized default QoS (authorized default QoS) parameter of the service data that has accessed the first network slice, and is compared with a priority level (namely, an ARP-PE-PL parameter) in a subscribed default QoS parameter or an authorized default QoS parameter of the first service data. If a priority level of the second service data that has accessed the first network slice is lower than a priority level of the first service data, and pre-emption vulnerability in a QoS parameter of the second service data is "pre-empt allowed", the PCF determines to release the resource for the second service data that has accessed the first network slice and accept the resource for the first service data that is to access the first network slice. Alternatively, when pre-emption vulnerability in the QoS parameter of the service data that has accessed the first network slice is "pre-empt allowed", if pre-emption vulnerability in a QoS parameter of the second service data that has accessed the first network slice is "pre-empt allowed", and a priority level in the QoS parameter of the second service data is lower than a priority level in the QoS parameter of the first service data, the PCF determines to release the resource for the second service data that has accessed the first network slice and accept the resource for the first service data that is to access the first network slice.

(b) The PCF determines, based on a DNN of the service data that has accessed the first network slice and a DNN of the first service data that is to access the first network slice, to release the resource for the second service data in the service data that has accessed the first network slice and accept the resource for the first service data that is to access the first network slice. Further, the PCF determines a destination network of the first service data based on the DNN of the first service data that is to access the first network slice, determines, based on the DNN of the service data that has accessed the first network slice, a destination network of the service data that has accessed the first network slice, determines, in the service data that has accessed the first network slice and based on importance of the destination network of the first service data and importance of the destination network of the service data that has accessed the first network slice, the second service data whose importance of a destination network is lower than the importance of the destination network of the first service data, releases the resource for the second service data, and accepts the resource for the first service data. For example, the DNN of the first service data that is to access the first network slice indicates that the first service data is attempting to access a destination network related to enterprise production, and a DNN of the second service data that has accessed the first network slice indicates that the destination network to which the second service data is connected is used for an enterprise mailbox. The PCF may determine that importance of the first service data is higher than importance of the second service data, and the PCF determines to release the resource for the second service data and accept the resource for the first service data.

(c) The PCF determines, based on a session type of the service data that has accessed the first network slice and a session type of the first service data that is to access the first network slice, to release the resource for the second service data in the service data that has accessed the first network slice and accept the resource for the first service data that is to access the first network slice. Further, the PCF determines a destination network of the first service data based on the session type of the first service data that is to access the first network slice, determines, based on the session type of the service data that has accessed the first network slice, a destination network of the service data that has accessed the first network slice, determines, in the service data that has accessed the first network slice and based on importance of the destination network of the first service data and importance of the destination network of the service data that has accessed the first network slice, the second service data whose importance of a destination network is lower than the importance of the destination network of the first service data, releases the resource for the second service data, and accepts the resource for the first service data. For example, the session type of the first service data that is to access the first network slice is an Ethernet type, and indicates that the first service data is attempting to access a local area network related to enterprise production, and a session type of the second service data that has accessed the first network slice is an IP version 4 (IPv4) or IP version 6 (IPv6) type, and indicates that a destination network to which the second service data is connected is the Internet. The PCF may determine that importance of the first service data is higher than importance of the second service data. Therefore, the PCF determines to release the resource for the second service data and accept the resource for the first service data.

(d) The PCF determines, based on a service data flow type of the service data that has accessed the first network slice and a service data flow type of the first service data that is to access the first network slice, to release the resource for the second service data in the service data that has accessed the first network slice and accept the resource for the first service data that is to access the first network slice. Further, importance of the service data flow type of the service data that has accessed the first network slice is compared with importance of the service data flow type of the first service data that is to access the first network slice. The PCF determines, in the service data that has accessed the first network slice, the second service data whose importance of a service data flow type is lower than the importance of the service data flow type of the first service data, releases the resource for the second service data, and accepts the resource for the first service data. For example, a 5QI of the first service data that is to access the first network slice indicates that the first service data is a real-time communication service, and a 5QI of the second service data that has accessed the first network slice indicates that the second service data is an Internet connection service. The PCF may determine that importance of the first service data is higher than importance of the second service data, and the PCF determines to release the resource for the second service data and accept the resource for the first service data.

(e) The PCF determines, based on an access network type of the service data that has accessed the first network slice and an access network type of the first service data that is to access the first network slice, to release the resource for the second service data in the service data that has accessed the first network slice and accept the resource for the first service data that is to access the first network slice. Further, importance of a service type corresponding to the access network type of the service data that has accessed the first network slice is compared with importance of a service type corresponding to the access network type of the first service data that is to access the first network slice. The PCF determines, in the service data that has accessed the first network slice, the second service data whose importance of a service type corresponding to an access network type is lower than the importance of the service type corresponding to the access network type of the first service data, releases the resource for the second service data, and accepts the resource for the first service data. For example, the first service data is to access the first network slice over a wireless local network at an enterprise premise, which indicates that the first service data is a service related to enterprise production, and the second service data has accessed the first network slice by using a mobile network base station, which indicates that the second service data is an Internet connection service. The PCF may determine that importance of the first service data is higher than importance of the second service data, and the PCF determines to release the resource for the second service data and accept the resource for the first service data.

(f) The PCF determines, based on a location of a terminal device to which the service data that has accessed the first network slice belongs and a location of a terminal device to which the first service data that is to access the first network slice belongs, to release the resource for the second service data in the service data that has accessed the first network slice and accept the resource for the first service data that is to access the first network slice. Further, importance of a service type corresponding to the terminal device to which the service data that has accessed the first network slice belongs is compared with importance of a service type corresponding to the terminal device to which the first service data that is to access the first network slice belongs. The PCF determines, in the service data that has accessed the first network slice, the second service data that belongs to a terminal device corresponding to a service type with importance lower than the importance of the service type corresponding to the terminal device to which the first service data belongs, releases the resource for the second service data, and accepts the resource for the first service data. For example, the terminal device to which the first service data that is to access the first network slice belongs performs access by using a wireless base station at an enterprise premise, which indicates that the first service data is a service related to enterprise production, and the terminal device to which the second service data that has accessed the first network slice belongs performs access by using a wireless base station outside the premise, which indicates that the second service data is a service related to email or instant messaging office. The PCF may determine that importance of the first service data is higher than importance of the second service data, and the PCF determines to release the resource for the second service data and accept the resource for the first service data.

Case 2: S520 includes that if the service usage of the first network slice is less than the upper service usage limit of the first network slice, the PCF determines to accept the resource for the first service data that is to access the first network slice. Optionally, the PCF does not need to release a resource for any piece of service data in the first network slice.

Therefore, in the method 500, the PCF may determine, based on the service usage of the first network slice and the upper service usage limit of the first network slice, to release the resource for the second service data that has accessed the first network slice and accept the resource for the first service data that is to access the first network slice. The PCF may control service data that is to access the first network slice. In addition, while high-priority-level or important data services access the first network slice as much as possible, it is ensured that service usage of the first network slice does not exceed the upper limit.

In this embodiment of this disclosure, service data that has accessed a network slice or that is to access the network slice may be a PDU session or a QoS flow. If the service data that has accessed the network slice or that is to access the network slice is the PDU session, one PDU session may include one or more QoS flows.

The following describes communication methods in embodiments of this disclosure with reference to FIG. 6A to FIG. 14C.

Figure 6A:
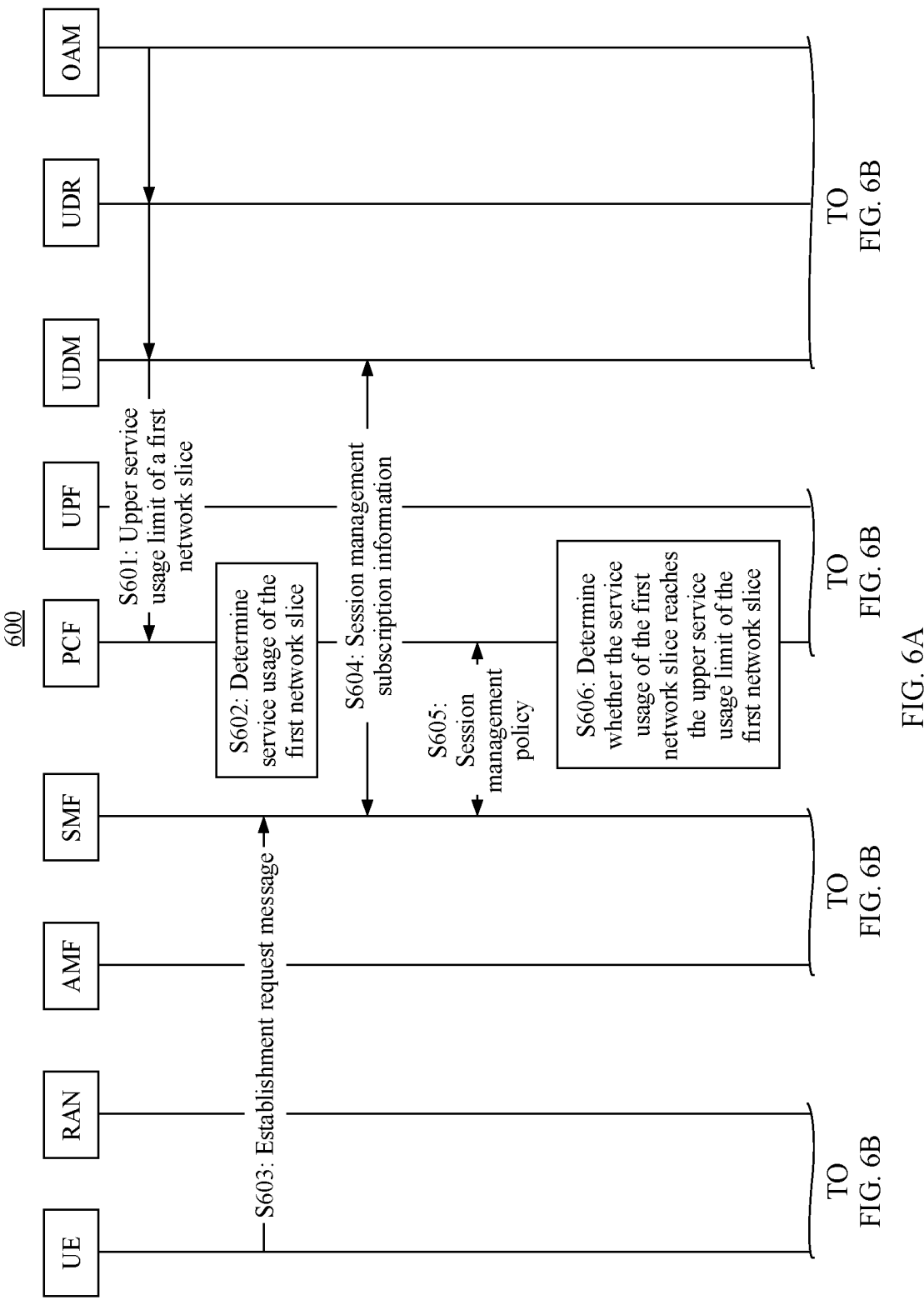
FIG. 6A and FIG. 6B are schematic diagrams of a communication method according to an embodiment of this disclosure.
Figure 6B:
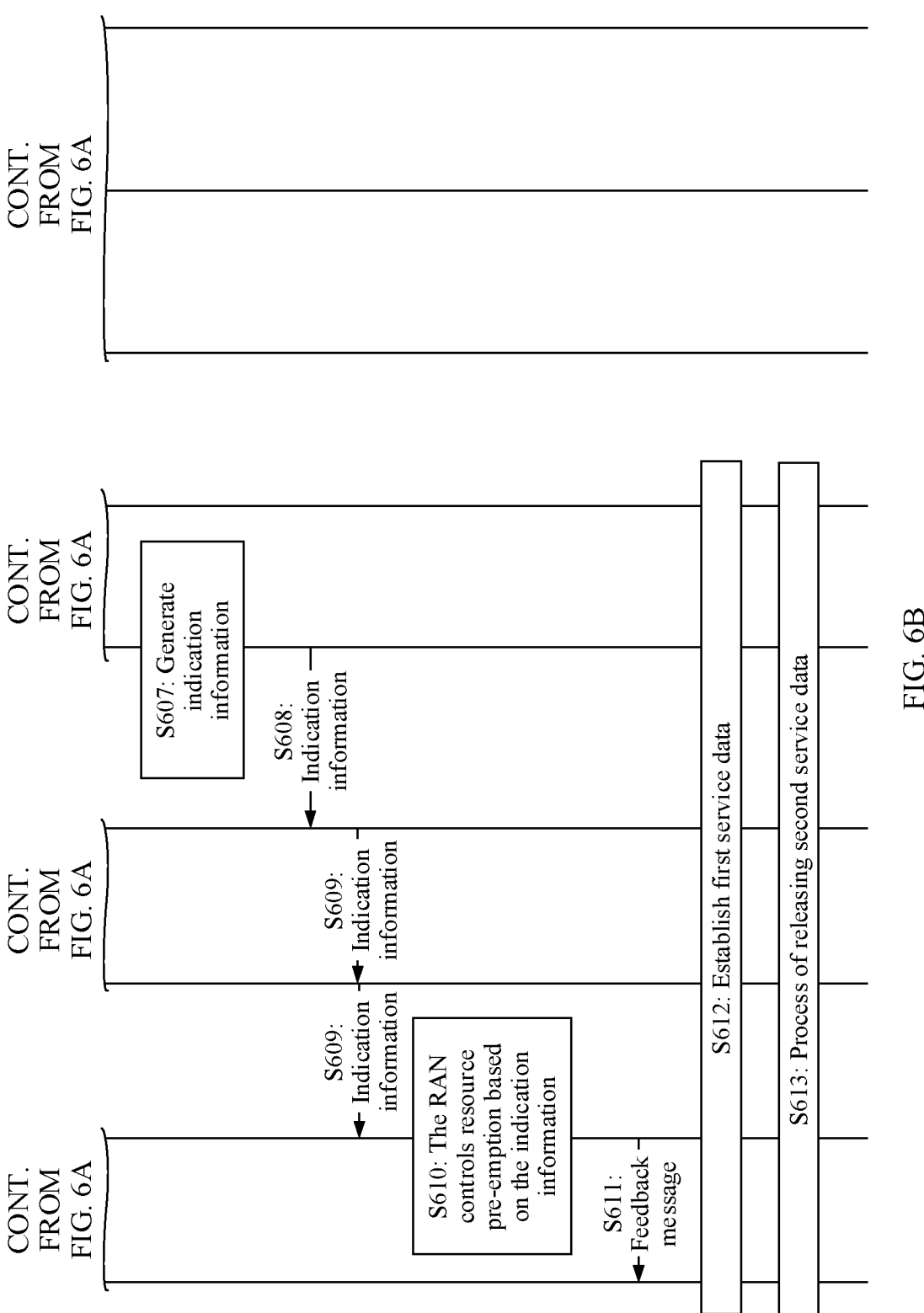

As shown in FIG. 6A and FIG. 6B, a method 600 corresponds to the foregoing method 200. The method 600 includes the following steps.

S601: An OAM determines an upper service usage limit of a first network slice, and sends the upper service usage limit of the first network slice to the PCF by using a UDR/UDM, and the PCF stores the upper service usage limit of the first network slice.

Optionally, the UDR/UDM may also store the upper service usage limit of the first network slice.

S602: The PCF determines service usage of the first network slice.

If the first network slice corresponds to only one PCF, S602 includes that if the PCF establishes or releases service data in the first network slice, the PCF updates service usage that is of the first network slice and that is stored by the PCF.

If the first network slice corresponds to a plurality of PCFs, S602 includes the following. After establishing or releasing service data in the first network slice, each PCF sends a data volume of the service data established or released in the first network slice to the UDR/UDM. The UDR/UDM determines the service usage of the first network slice based on the data volume that is of the established or released service data and that is sent by the PCF corresponding to the first network slice. For example, the UDR/UDM stores service usage of the first network slice, and the UDR/UDM dynamically adjusts the service usage of the first network slice based on the data volume of the established or released service data when the UDR/UDM receives the data volume that is of the established or released service data and that is sent by the PCF, and sends service usage obtained through adjustment to the PCF.

It should be noted that a sequence relationship between S601 and S602 is not limited, and S601 may be before or after S602.

S603: UE sends, to an AMF by using the RAN, a message for requesting to establish first service data, where the first establishment request message includes first S-NSSAI, and the AMF stores a result (namely, a correspondence between S-NSSAI and a network slice) of network slice selection performed by the NSSF when the UE registers with a network. The AMF determines, based on the first S-NSSAI, the first network slice corresponding to the first service data, selects an SMF corresponding to the first network slice, and sends the establishment request message to the SMF, where the establishment request message includes the first S-NS-SAI.

It should be noted that a sequence of step S603 and steps S601 and S602 is not limited. To be specific, S603 is initiated when the UE needs to establish service data, and is not limited by that the PCF obtains the service usage of the first network slice and the upper service usage limit of the first network slice.

S604: After receiving the establishment request message, the SMF requests session management subscription information of the first network slice from the UDM based on the first S-NSSAI, and the UDM returns the session management subscription information to the SMF, where the session management subscription information includes a 5QI and an ARP parameter of the first service data.

Further, the establishment request message that is of the first service data and that is sent by the UE to the AMF by using the RAN and the establishment request message that is sent by the AMF to the SMF in S603 may include parameters such as the S-NSSAI, a DNN, and a session type of the first service data. In S604, when requesting the session management subscription information of the first network slice from the UDM, the SMF may also send at least one of the parameters such as the S-NSSAI, the DNN, and the session type of the first service data to the UDM, and the UDM may search, based on the at least one of the parameters such as the 5-NSSAI, the DNN, and the session type, for a network slice corresponding to the UE and a subscribed default QoS parameter of a data network, where the default QoS parameter includes the 5QI and the ARP. In this way, the session management subscription information returned by the UDM to the SMF may include the default QoS parameter.

Optionally, the session management subscription information may further include at least one of parameters such as a subscribed session-AMBR, an allowed session type, and a default session type.

S605: The SMF requests a session management policy of the first network slice from the PCF by using a request message, where the request message carries at least one of the first S-NSSAI, the DNN, and the subscribed default QoS parameter (the 5QI and the ARP parameter). The PCF returns an authorized session management policy.

Optionally, the PCF may modify the subscribed default 5QI and ARP parameter based on a local configuration of an operator, and send a modification result as an authorized default QoS parameter to the SMF via the session management policy. In other words, in this case, the session management policy includes a 5QI and an ARP parameter obtained through modification.

S606: The PCF determines whether the service usage of the first network slice reaches the upper service usage limit of the first network slice.

If the first network slice corresponds to only the PCF, S606 includes that the PCF determines, based on the service usage that is of the first network slice and that is stored by the PCF and the upper service usage limit that is of the first network slice and that is obtained in S601, whether the service usage of the first network slice reaches the upper service usage limit of the first network slice. If the first network slice corresponds to the plurality of PCFs, S606 includes that the PCFs may determine, based on the service usage that is of the first network slice and that is obtained from the UDR/UDM and the upper service usage limit that is of the first network slice and that is obtained in S601, whether the service usage of the first network slice reaches the upper service usage limit of the first network slice.

If the first network slice corresponds to the plurality of PCFs, S606 includes that the UDR/UDM determines a difference, which may also be referred to as a quota, between the upper service usage limit of the first network slice and the service usage of the first network slice based on the service usage of the first network slice and the upper service usage limit of the first network slice, and sends the difference to the PCFs. The PCFs determines, based on the difference, whether the service usage of the first network slice reaches the upper service usage limit of the first network slice. Further, if the difference is greater than 0, it indicates that the service usage of the first network slice does not reach the upper service usage limit of the first network slice, or if the difference is less than 0, it indicates that the service usage of the first network slice reaches the upper service usage limit of the first network slice.

Optionally, S606 may be triggered by S605.

Optionally, the first network slice corresponds to the plurality of PCFs, and the UDR/UDM may allocate an available quota of the first network slice to each PCF. When a quota of a PCF is to be used up, S606 may be triggered.

Optionally, S606 may alternatively be triggered by the PCF by periodically performing a check. For example, S606 is triggered because duration of a timer is exceeded.

S607: Generate indication information based on a determining result in S606.

Further, for a manner of generating the indication information, refer to the descriptions of S220.

S608: The PCF sends the indication information to the SMF.

Optionally, if the indication information is shown in Case 1 in S220, when a resource of a UPF is insufficient or the service usage of the first network slice reaches the upper service usage limit of the first network slice, the SMF may also pre-empt the resource of the UPF for the first service data based on the indication information.

S609: The SMF sends the indication information to the AMF, and the AMF sends the indication information to the RAN.

S610: The RAN controls resource pre-emption based on the indication information. For details, refer to the descriptions of S240.

Optionally, in S610, the RAN may directly control the resource pre-emption based on the indication information.

Optionally, in S610, the RAN may control the resource pre-emption based on the indication information when a resource is insufficient.

Optionally, in S610, the RAN may control the resource pre-emption based on the indication information when a resource is sufficient.

If the indication information indicates the RAN to release, for the first service data that is to access the first network slice, a resource for service data that has accessed the first network slice, or if the indication information indicates that the service usage of the first network slice is greater than or equal to the upper service usage limit of the first network slice (case 1 and case 2 in S220), the RAN determines, in the service data that has accessed the first network slice, second service data whose priority level is lower than a priority level of the first service data (where ARP-PL of the second service data is greater than ARP-PL of the first service data) and whose ARP-PE_V is "pre-empt allowed" (where for example, ARP-PE_V is ENABLE), and releases, for the first service data, a resource for the second service data. If no service data that has accessed the first network slice has a priority level that is lower than that of the first service data and has ARP-PE_V that is "pre-empt allowed" (where for example, ARP-PE_V is ENABLE), the RAN rejects establishment of the first service data.

S611: If in S610, the RAN releases, for the first service data that is to access the first network slice, the resource for the second service data that has accessed the first network slice, the RAN sends a feedback message of the establishment request message to the UE, where the feedback message of the establishment request message is used to indicate that the establishment of the first service data is accepted.

If in S610, the RAN rejects the establishment of the first service data, the RAN sends a feedback message of the establishment request message to the UE, where the feedback message of the establishment request message is used to indicate that the establishment of the first service data is rejected.

For example, if the first service data is a PDU session, the feedback message of the establishment request message is an access network (AN)-specific resource setup message, and carries PDU session establishment accept information.

S612: If in S610, the RAN releases, for the first service data that is to access the first network slice, the resource for the second service data that has accessed the first network slice, the UE, the RAN, the AMF, the SMF, the UPF, and the PCF complete a subsequent process of establishing the first service data.

S613: If in S610, the RAN releases, for the first service data that is to access the first network slice, the resource for the second service data that has accessed the first network slice, the UE, the RAN, the AMF, the SMF, the UPF, and the PCF complete a process of releasing the resource for the second service data.

It should be noted that a sequence of S612 and S613 is not limited.

Figure 7A:
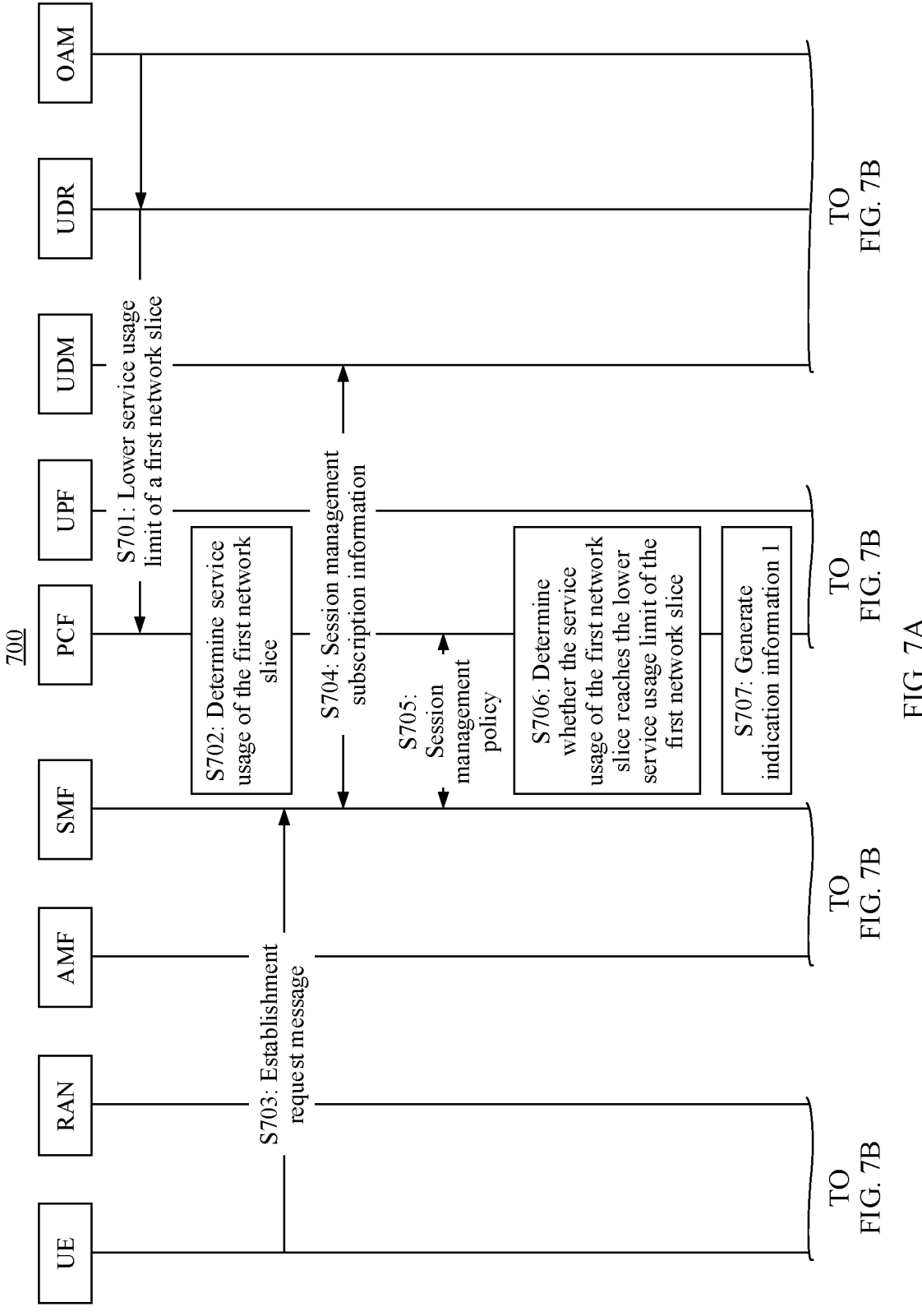
FIG. 7A, FIG. 7B, and FIG. 7C are schematic diagrams of a communication method according to an embodiment of this disclosure.
Figure 7B:
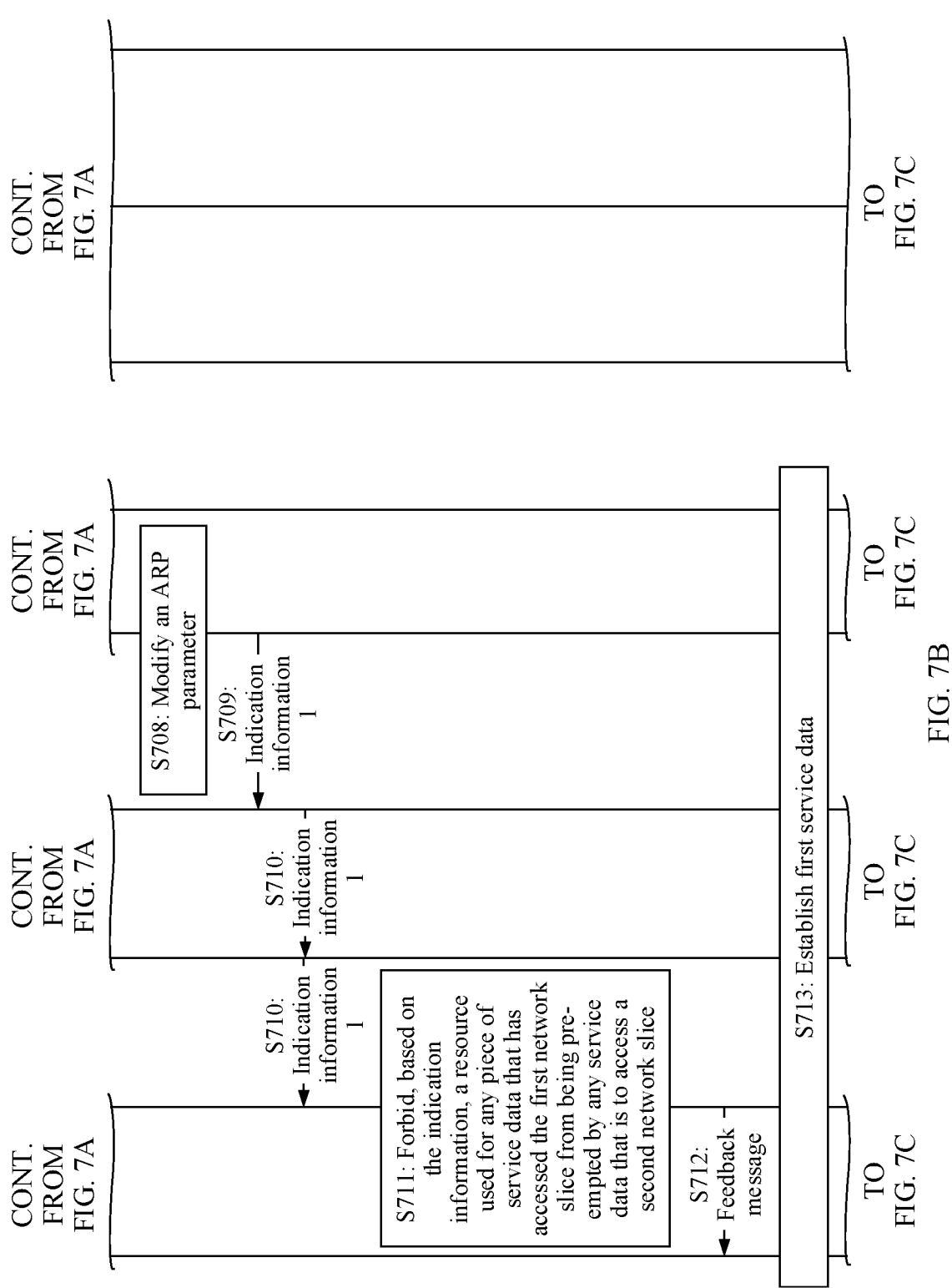
Figure 7C:
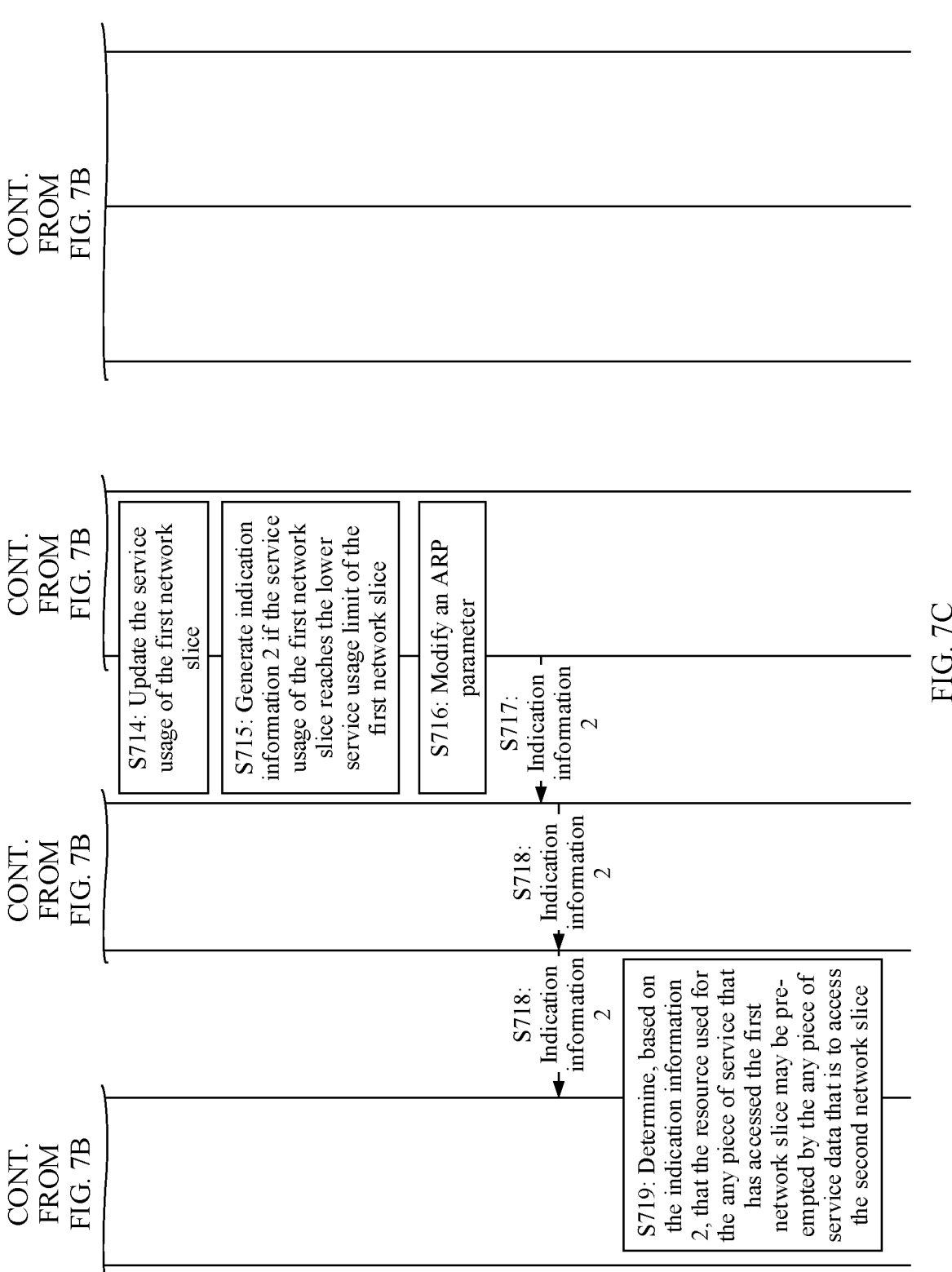

As shown in FIG. 7A, FIG. 7B, and FIG. 7C, a method 700 corresponds to the foregoing method 300. The method 700 includes the following steps.

S701: An OAM determines a lower service usage limit of a first network slice, and sends an upper service usage limit of the first network slice to the PCF by using a UDR, and the PCF stores the lower service usage limit of the first network slice.

Optionally, the UDR/a UDM may also store the lower service usage limit of the first network slice.

S702: The PCF determines service usage of the first network slice.

Further, for a manner of determining the usage of the first network slice by the PCF in S702, refer to the descriptions of S602.

It should be noted that a sequence relationship between S701 and S702 is not limited, and S701 may be before or after S702.

S703 to S705 are the same as S603 to S605.

S706: The PCF determines whether service usage of the first network slice reaches the lower service usage limit of the first network slice.

If the first network slice corresponds to only one PCF, S706 includes that the PCF determines, based on service usage that is of the first network slice and that is stored by the PCF and the lower service usage limit that is of the first network slice and that is obtained in S701, whether the service usage of the first network slice reaches the lower service usage limit of the first network slice. If the first network slice corresponds to a plurality of PCFs, S706 includes that the PCFs may determine, based on the service usage that is of the first network slice and that is obtained from the UDR and the lower service usage limit that is of the first network slice and that is obtained in S701, whether the service usage of the first network slice reaches the lower service usage limit of the first network slice.

Optionally, S706 may be triggered by S705. Optionally, S706 may alternatively be triggered by the PCF by periodically performing a check. For example, S706 is triggered because duration of a timer is exceeded.

S707: Generate indication information 1 based on a determining result in S706.

Further, for a manner of generating the indication information 1, refer to the descriptions of case 1 and case 2 in S320.

S708: If the indication information 1 indicates that a resource for any piece of service data that has accessed the first network slice is not pre-empted by any piece of service data that is to access a second network slice, or if the indication information 1 indicates that service usage of the first network slice is less than or equal to the lower service usage limit of the first network slice, the PCF sets ARP-PE_V in the ARP parameter that is of the first service data and that is obtained in S705 to "pre-empted unallowed" (where for example, ARP-PE_V is set to DISABLED), or the first network device sets ARP-PE_V in an ARP parameter of each piece of service data that has accessed the first network slice to "pre-empted unallowed" (where for example, ARP-PE_V is set to DISABLED).

S709: The PCF sends the indication information 1 to the SMF.

Optionally, if the indication information 1 is shown in Case 1 in S320, when a resource of a UPF is insufficient or the service usage of the first network slice reaches the upper service usage limit of the first network slice, the SMF may pre-empt the resource of UPF for the first service data based on the indication information 1.

It should be noted that a sequence of S708 and S707 is not limited.

S710: The SMF sends the indication information 1 to the AMF, and the AMF sends the indication information to the RAN.

S711: The RAN forbids, based on the indication information 1, the resource for the any piece of service data that has accessed the first network slice from being pre-empted by the any piece of service data that is to access the second network slice.

For details of S711, refer to the descriptions of case 1 or case 2 in S340.

S712: If the indication information indicates that the resource for the any piece of service data that has accessed the first network slice is not pre-empted by the any piece of service data that is to access the second network slice, or if the indication information indicates that the service usage of the first network slice is less than or equal to the lower service usage limit of the first network slice (corresponding to case 1 and case 2 in S320), the RAN sets ARP-PE_V in the ARP parameter of each piece of service data that has accessed the first network slice to "pre-empted unallowed" (where for example, ARP-PE_V is set to DISABLED).

S713: If the RAN sends a feedback message of the establishment request message to the UE after S711, where the feedback message of the establishment request message is used to indicate that establishment of the first service data is accepted.

For example, if the first service data is a PDU session, the feedback message of the establishment request message is an AN-specific resource setup message, and carries PDU session establishment accept information.

S714: The PCF updates the service usage of the first network slice for the newly established first service data.

If the first network slice corresponds to only the PCF, S714 includes the following. After the PCF establishes the first service data in the first network slice, the PCF updates the service usage that is of the first network slice and that is stored by the PCF.

If the first network slice corresponds to the plurality of PCFs, S714 includes the following. After establishing the first service data in the first network slice, the PCFs each send a data volume of the first service data established in the first network slice to the UDR. The UDR determines service usage of the first network slice based on a data volume that is of established or released service data and that is sent by each PCF corresponding to the first network slice, and sends the updated service usage of the first network slice to the PCF.

S715: The PCF determines whether the service usage of the first network slice reaches the lower service usage limit of the first network slice. If the service usage of the first network slice reaches the lower service usage limit of the first network slice, generated indication information 2 is shown in case 3 or case 4 in S320.

S716: If the indication information 2 indicates that the resource for the any piece of service data that has accessed the first network slice may be pre-empted by the any piece of service data that is to access the second network slice, or if the indication information 2 indicates that the service usage of the first network slice is greater than the lower service usage limit of the first network slice, the PCF modifies ARP-PE_V that is in the ARP parameter and that is modified in S712 to "pre-empted allowed" (where for example, ARP-PE_V is set to ENABLED), or the first network device sets ARP-PE_V in ARP parameters of all or some of service data that has accessed the first network slice to "pre-empted allowed" (where for example, ARP-PE_V is set to DISABLED).

S717: The PCF sends the indication information 2 to the SMF.

S718: The SMF sends the indication information 2 to the AMF, and the AMF sends the indication information to the RAN.

S719: The RAN determines, based on the indication information 2, that the resource for the any piece of service that has accessed the first network slice may be pre-empted by the any piece of service data that is to access the second network slice.

Figure 8A:
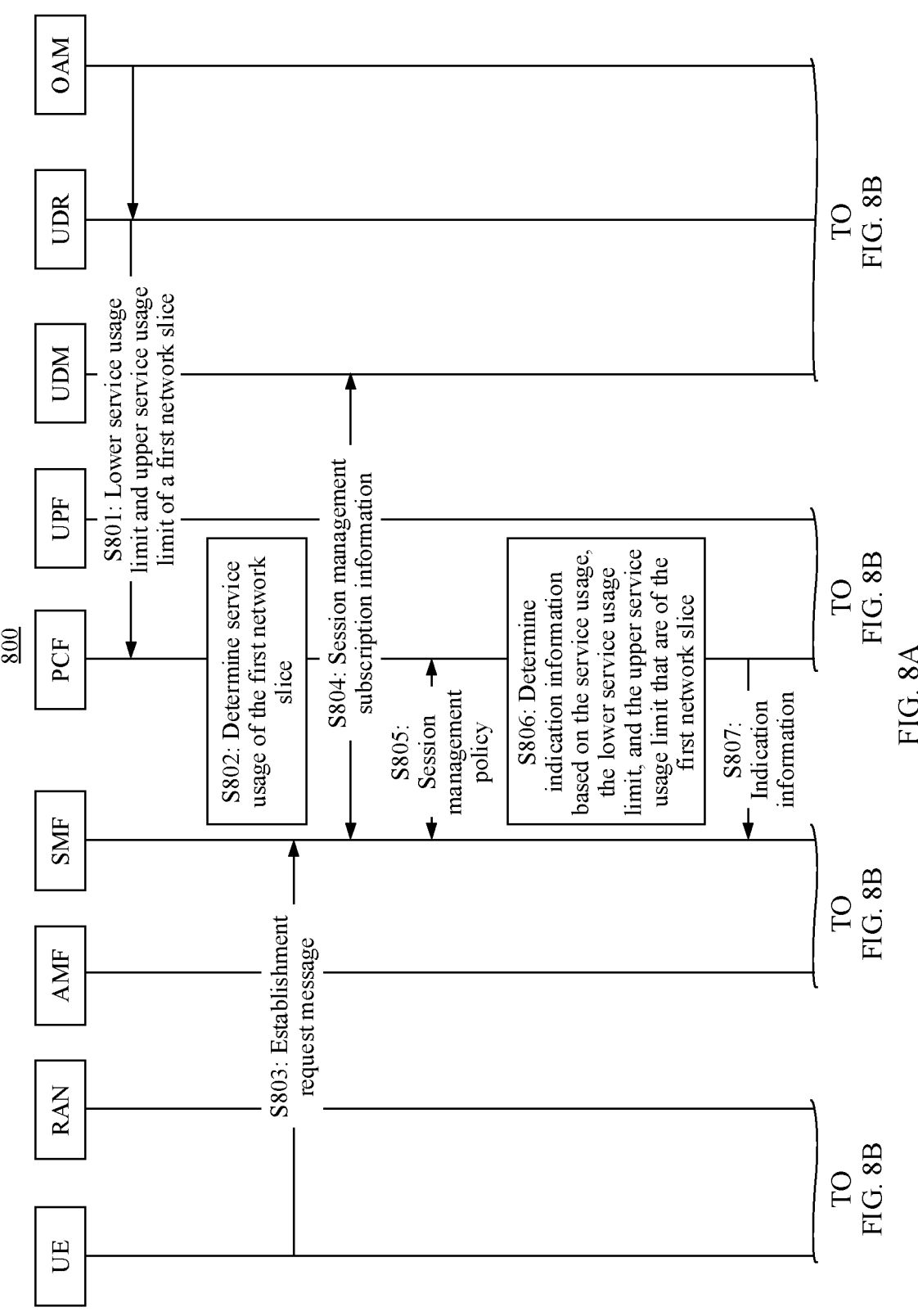
FIG. 8A and FIG. 8B are schematic diagrams of a communication method according to an embodiment of this disclosure.
Figure 8B:
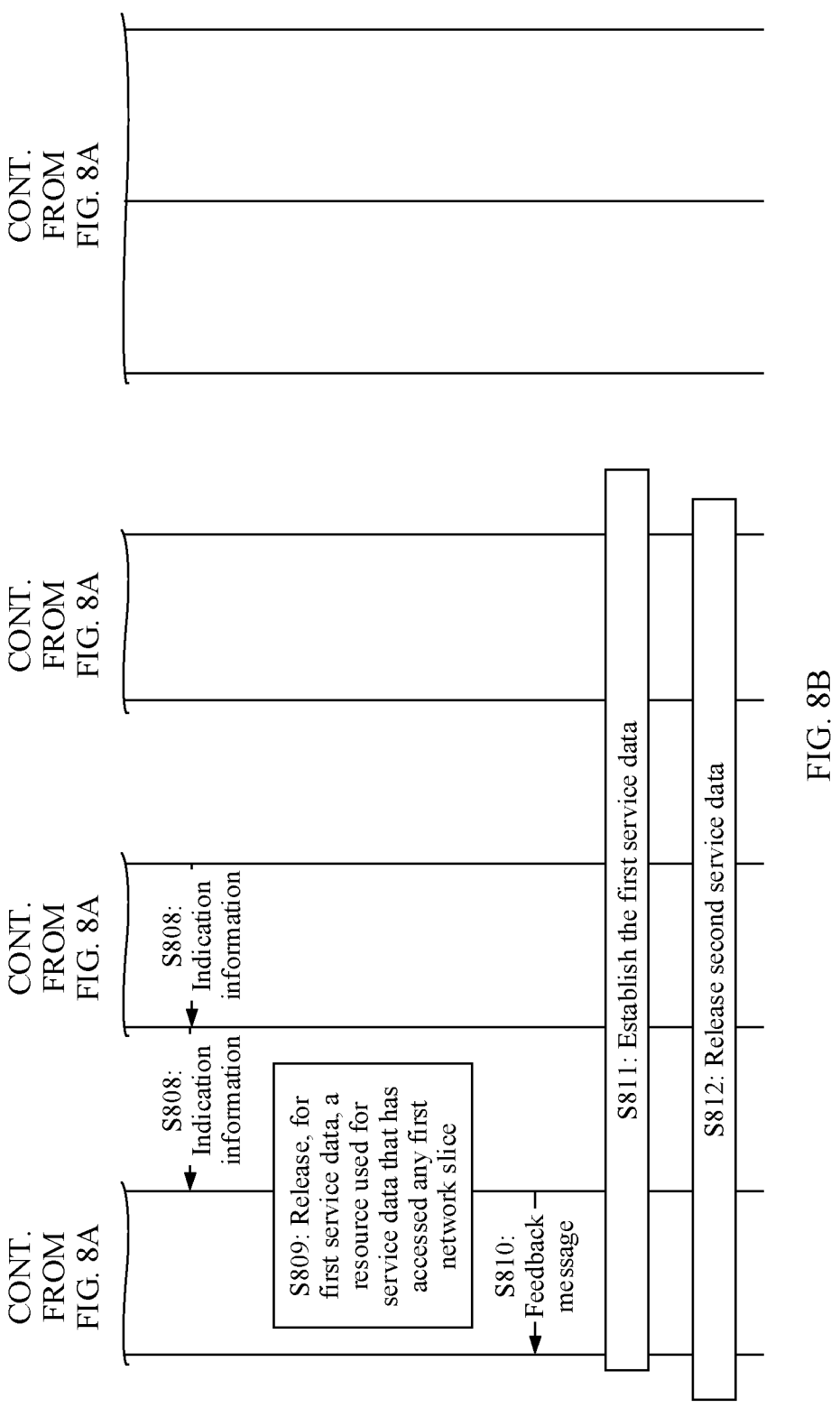

As shown in FIG. 8A and FIG. 8B, a method 800 corresponds to the foregoing method 400. The method 800 includes the following steps.

S801: An OAM determines an upper service usage limit of a first network slice and a lower service usage limit of the first network slice, and sends the upper service usage limit of the first network slice and the lower service usage limit of the first network slice to the PCF by using a UDR/UDM, and the PCF stores the upper service usage limit of the first network slice and the lower service usage limit of the first network slice.

Optionally, the UDR/UDM may also store the upper service usage limit of the first network slice and the lower service usage limit of the first network slice.

S802: The PCF determines service usage of the first network slice.

Further, for a manner of determining the usage of the first network slice by the PCF in S802, refer to the descriptions of S602.

It should be noted that a sequence relationship between S801 and S802 is not limited, and S801 may be before or after S802.

S803 to S805 are the same as S603 to S605.

S806: The PCF determines indication information based on the upper service usage limit of the first network slice, the lower service usage limit of the first network slice, and the service usage of the first network slice.

If the first network slice corresponds to only one PCF, S806 includes that the PCF determines, based on the service usage that is of the first network slice and that is stored by the PCF and the upper service usage limit that is of the first network slice and that is obtained in S601, whether the service usage of the first network slice reaches the upper service usage limit of the first network slice. If the first network slice corresponds to a plurality of PCFs, S806 includes that the PCFs may determine the indication information based on the service usage that is of the first network slice and that is obtained from the UDR/UDM, and the upper service usage limit of the first network slice and the lower service usage limit of the first network slice that are obtained in S801.

Further, for a method for determining the indication information in S806, refer to the descriptions of S420.

Optionally, S806 may be triggered by S805.

Optionally, the first network slice corresponds to the plurality of PCFs, and the UDR may allocate an available quota of the first network slice to each PCF. When a quota of the first network slice to each PCF. When a quota of a PCF is to be used up, S806 may be triggered.

Optionally, S806 may alternatively be triggered by the PCF by periodically performing a check. For example, S806 is triggered because duration of a timer is exceeded.

S807: The PCF sends the indication information to the SMF.

S808: The SMF sends the indication information to the AMF, and the AMF sends the indication information to the RAN.

If the indication information is shown in case 5 and case 6 in S420, for a manner of controlling resource pre-emption by the RAN, refer to the descriptions of S610 to S613 in the method 600. If the indication information is shown in case 1 and case 2 in S420, for a manner of controlling resource pre-emption by the RAN, refer to the descriptions of S708 to S713 in the method 700.

If the indication information is shown in case 3 and case 4 in S420, the RAN performs S809.

S809: The RAN releases, for the first service data that is to access the first network slice, a resource for service data that has accessed the first network slice or a resource for service data that has accessed another network slice.

Further, it may be determined to release a resource for second service data that has accessed the first network slice or a resource for second service data that has accessed the other network slice. Further, for how to determine the second service data, refer to the descriptions in the method 200.

S810: After S809, the RAN sends a feedback message of the establishment request message to the UE, where the feedback message of the establishment request message is used to indicate that establishment of the first service data is accepted.

For example, if the first service data is a PDU session, the feedback message of the establishment request message is an AN-specific resource setup message, and carries PDU session establishment accept information.

S811: The UE, the RAN, the AMF, the SMF, a UPF, and the PCF complete a subsequent process of establishing the first service data.

S812: The UE, the RAN, the AMF, the SMF, the UPF, and the PCF complete a process of releasing the resource for the second service data.

It should be noted that a sequence of S811 and S812 is not limited.

In another optional embodiment, in S806, if the service usage of the first network slice is less than or equal to the lower service usage limit of the first network slice, it may be considered that the first network slice is in a "protected state", and correspondingly, the indication information may indicate the "protected state", if the service usage of the first network slice is greater than the lower service usage limit of the first network slice and less than or equal to the upper service usage limit of the first network slice, it may be considered that the first network slice is in a "normal state", and correspondingly, the indication information may indicate the "normal state", or if the service usage of the first network slice is greater than or equal to the upper service usage limit of the first network slice, it may be considered that the first network slice is in a "restricted state", and correspondingly, the indication information may indicate the "restricted state". If the indication information indicates the "protected state", the "normal state", or the "restricted state", the RAN may pre-empt a resource based on the indication information, where a pre-emption policy is as described in the method 600 to the method 800.

In another optional embodiment, in the method 800, the lower service usage limit of the first network slice is replaced with a lower resource utilization limit of the first network slice, and the upper service usage limit of the first network slice is replaced with an upper resource utilization limit of the first network slice.

Figure 9A:
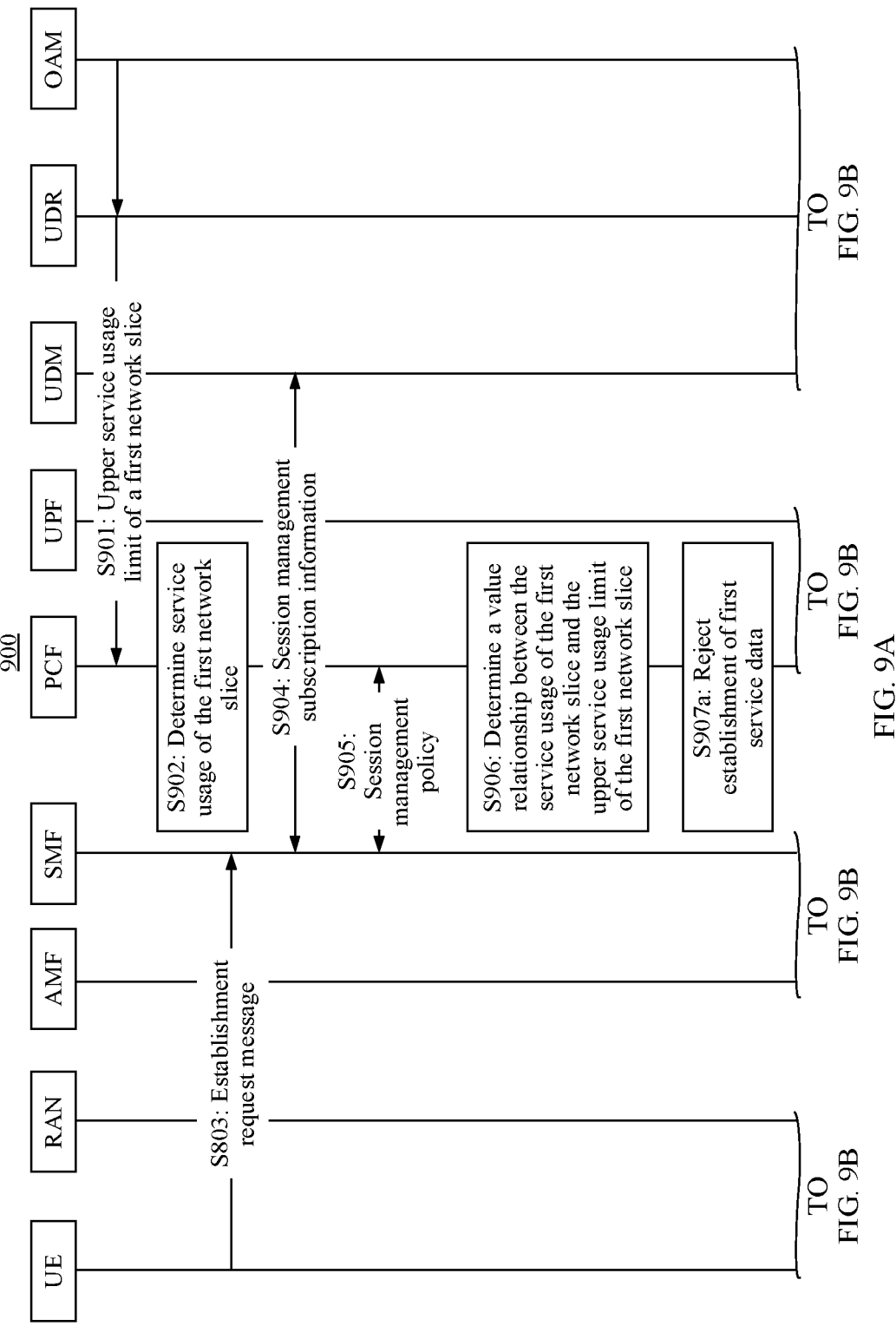
FIG. 9A and FIG. 9B are schematic diagrams of a communication method according to an embodiment of this disclosure.
Figure 9B:
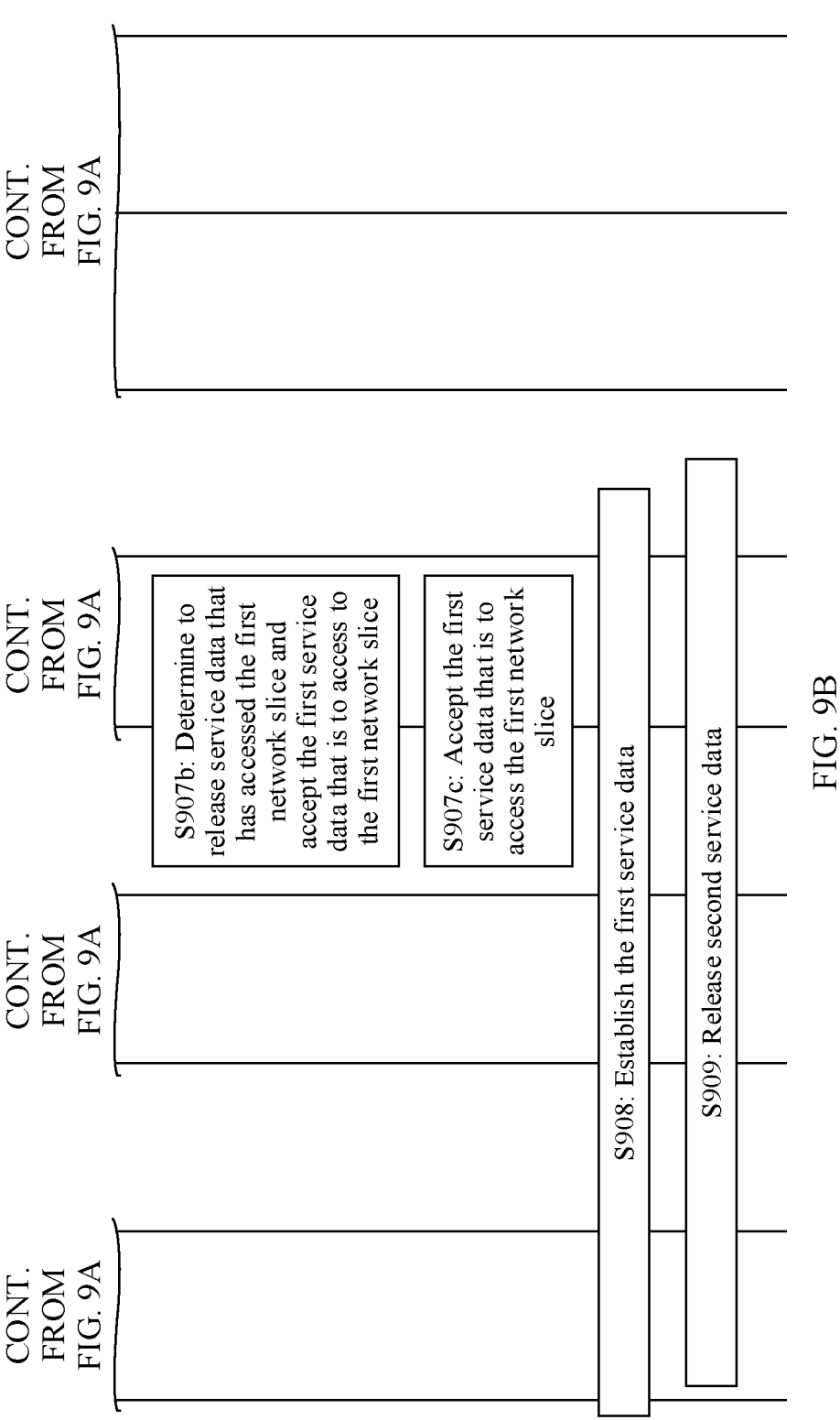

As shown in FIG. 9A and FIG. 9B, a method 900 corresponds to the foregoing method 500. The method 900 includes the following steps.

S901: An OAM determines an upper service usage limit of a first network slice, and sends the upper service usage limit of the first network slice to the PCF by using a UDR, and the PCF stores the upper service usage limit of the first network slice.

Optionally, the UDR may also store the upper service usage limit of the first network slice.

S902: The PCF determines service usage of the first network slice.

Further, for a manner of determining the usage of the first network slice by the PCF in S902, refer to the descriptions of S602.

It should be noted that a sequence relationship between S901 and S902 is not limited, and S901 may be before or after S902.

S903 to S905 are the same as S603 to S605.

S906: Determine a value relationship between the service usage of the first network slice and the upper service usage limit of the first network slice.

Optionally, S906 may be triggered by S905.

Optionally, S906 may alternatively be triggered by the PCF by periodically performing a check. For example, S906 is triggered because duration of a timer is exceeded.

If the service usage of the first network slice is greater than or equal to the upper service usage limit of the first network slice, the PCF determines to restrict pre-empting, performed by the first service data, of a resource for service data that accesses a network slice identified by other S-NS-SAI. Further, there are two cases: S907a and S907b.

S907a: If the service usage of the first network slice is greater than or equal to the upper service usage limit of the first network slice, the PCF may reject establishment of the first service data based on parameters such as the 5QI or the ARP in the subscribed default QoS parameter or the authorized default QoS parameter of the first service data, the DNN of the first service data, a service type of the first service data, an access network type of the first service data, and a location of a terminal device to which the first service data belongs.

For example, if ARP-PL in the ARP parameter of the first service data in S905 is lower than a specific priority level, or if no ARP-PE-C parameter is set in the ARP parameter of the first service data in S905, the PCF rejects the establishment of the first service data. The procedure ends.

S907b: If the service usage of the first network slice is greater than or equal to the upper service usage limit of the first network slice, the PCF may determine, based on a 5QI or an ARP in a QoS parameter of service data that has accessed the first network slice and a 5QI or an ARP in a QoS parameter of the first service data that is to access the first network slice, to release a resource for second service data in the service data that has accessed the first network slice and accept the resource for the first service data that is to access the first network slice.

For example, if ARP-PL in the ARP parameter of the first service data in S905 is higher than a specific priority level, and an ARP-PE-C parameter in the ARP parameter of the first service data in S905 is set to have a pre-emption capability (where for example, the ARP-PE-C parameter is set to ENABLE), the PCF determines that service data that has accessed the first network slice needs to be released and the first service data that is to access the first network slice needs to be accepted.

Further, the PCF determines, in at least one manner in (a) to (f) in the method 500, to a specific piece of to-be-released service data that has accessed the first network slice. Details are not described herein.

Further, the specific priority level in S907a and S907b may be a preset priority level, for example, may be a priority level preset by an operator.

The ARP parameter in S907a and S907b is the parameter in S905. Optionally, the ARP parameter in S907a and S907b may be an ARP parameter generated by the PCF based on the ARP parameter in S905 and a policy and charging control rule (PCC rule). Further, the PCF may directly authorize a subscribed QoS parameter (namely, the ARP parameter in S905) as a default QoS parameter of a PDU session. Alternatively, the PCF authorizes an appropriate QoS parameter for a new QoS flow detected by the SMF based on a service data flow (SDF) template in the PCC rule, where the QoS parameter includes a 5QI, an ARP, and the like.

S907c: If the service usage of the first network slice is less than the upper service usage limit of the first network slice, the PCF determines to accept the resource for the first service data that is to access the first network slice, and does not need to release any piece of service data that has accessed the first network slice.

S908: After S907b and S907c, the UE, the RAN, the AMF, the SMF, a UPF, and the PCF complete a subsequent process of establishing the first service data.

S909: After S907b, the UE, the RAN, the AMF, the SMF, the UPF, and the PCF complete a process of releasing the resource for the second service data.

It should be noted that a sequence of S908 and S909 is not limited.

Figure 10A:
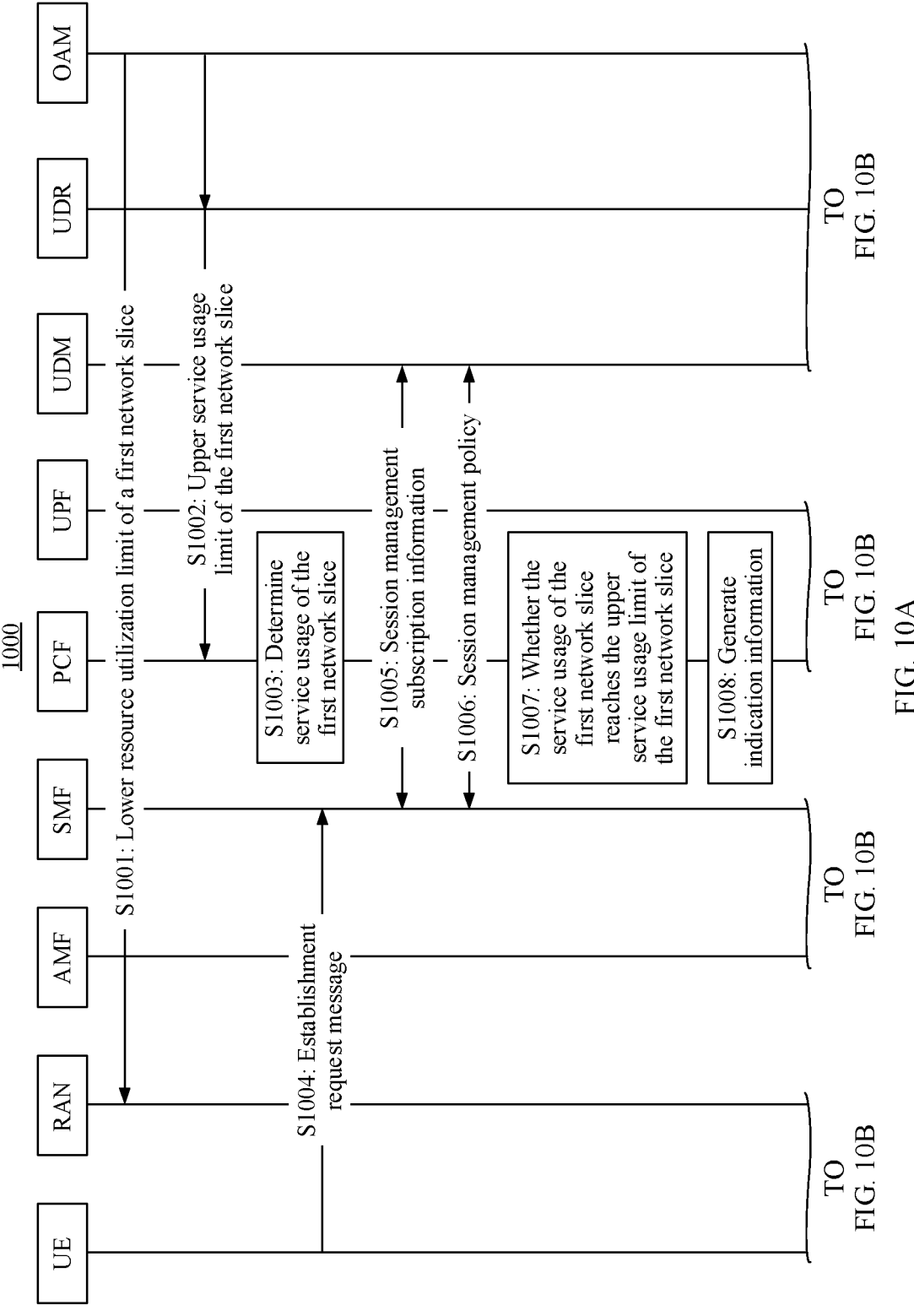
FIG. 10A and FIG. 10B are schematic diagrams of a communication method according to an embodiment of this disclosure.
Figure 10B:
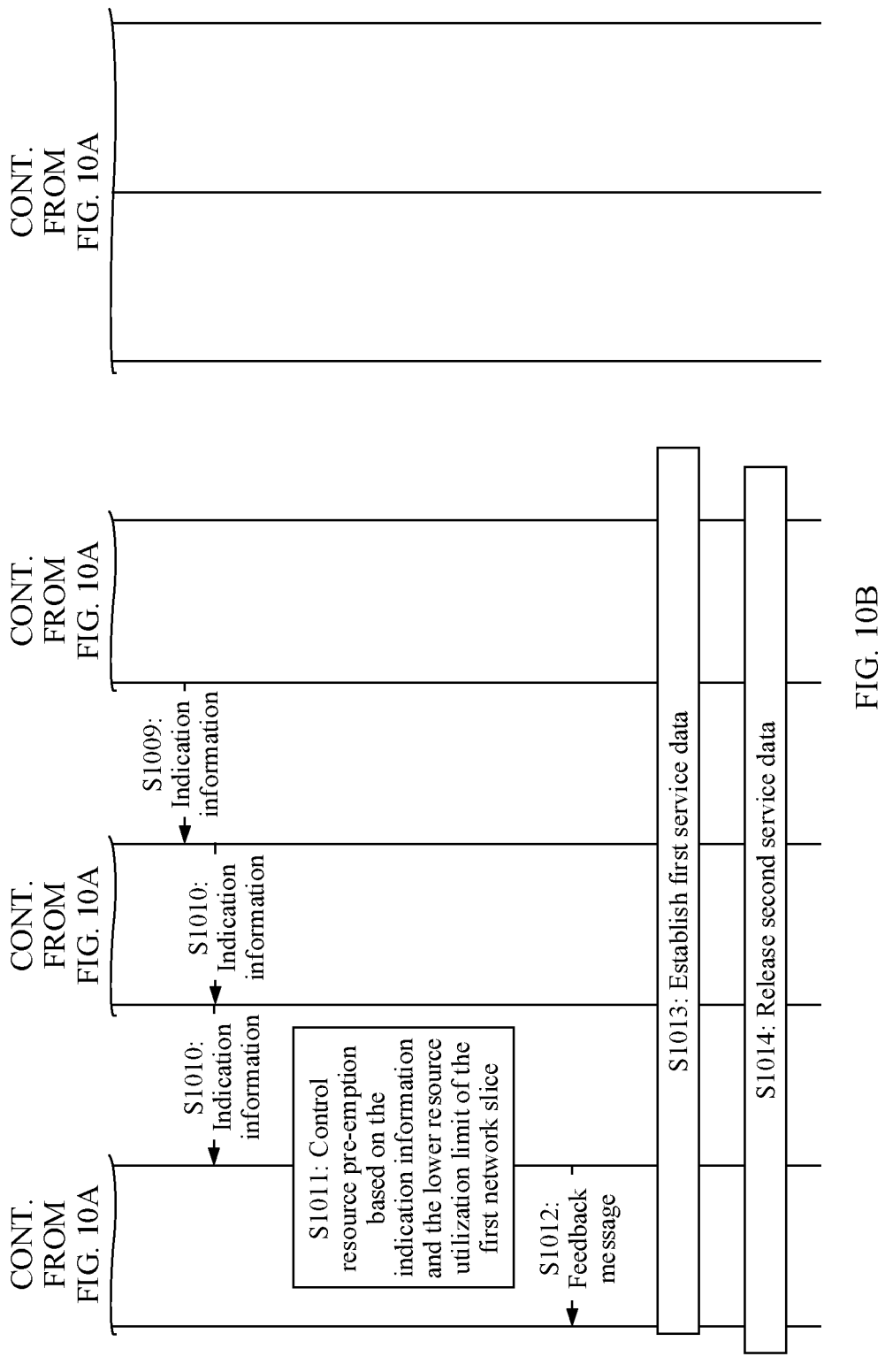

As shown in FIG. 10A and FIG. 10B, a method 1000 includes the following steps.

S1001: An OAM determines a lower resource utilization limit of a first network slice, and configures the lower resource utilization limit of the first network slice for the RAN.

It may be understood that only one network slice is used as an example for description in the method 1000. The OAM may determine lower resource utilization limits of a plurality of network slices, and send the lower resource utilization limits of the plurality of network slices to the RAN.

S1002: The OAM determines an upper service usage limit of the first network slice, and sends the upper service usage limit of the first network slice to the PCF by using a UDR, and the PCF stores the upper service usage limit of the first network slice.

Optionally, the UDR may also store the upper service usage limit of the first network slice.

S1003: The PCF determines service usage of the first network slice.

Further, for a manner of determining the usage of the first network slice by the PCF in S1003, refer to the descriptions of S602.

It should be noted that a sequence relationship between S1001, S1002, and S1003 is not limited.

S1004 to S1006 are the same as S603 to S605.

S1007: The PCF determines whether the service usage of the first network slice reaches the upper service usage limit of the first network slice. For details, refer to the descriptions of S606.

Optionally, S1007 may be triggered by S1006.

Optionally, S1007 may alternatively be triggered by the PCF by periodically performing a check. For example, S606 is triggered because duration of a timer is exceeded.

Optionally, the first network slice corresponds to a plurality of PCFs, and the UDR/a UDM may allocate an available quota of the first network slice to each PCF. When a quota of a PCF is to be used up, S1007 may be triggered.

S1008: Generate indication information based on a determining result in S1007.

Further, for a manner of generating the indication information, refer to the descriptions of S220.

S1009: The PCF sends the indication information to the SMF.

S1010: The SMF sends the indication information to the AMF, and the AMF sends the indication information to the RAN.

S1011: The RAN controls resource pre-emption based on the indication information and the lower resource utilization limit of the first network slice in S1001.

If the indication information indicates that the service usage of the first network slice is greater than or equal to the upper service usage limit of the first network slice, or if the indication information indicates to release, for the first service data that is to access the first network slice, a resource for service data that has accessed the first network slice (case 1 and case 2 in S220), the RAN determines, in the service data that has accessed the first network slice, second service data whose priority level is lower than a priority level of the first service data (where ARP-PL of the second service data is greater than ARP-PL of the first service data) and whose ARP-PE_V is "pre-empt allowed" (where for example, ARP-PE_V is ENABLE), and releases, for the first service data, a resource for the second service data. If no service data that has accessed the first network slice has a priority level that is lower than that of the first service data and has ARP-PE_V that is "pre-empt allowed" (where for example, ARP-PE_V is ENABLE), the RAN rejects establishment of the first service data.

If the indication information indicates that the service usage of the first network slice is less than the upper service usage limit of the first network slice, and the RAN determines that current resource utilization of the first network slice of the RAN is greater than the lower resource utilization limit in S1001, the RAN releases, for the first service data that is to access the first network slice, a resource for service data that has accessed the first network slice or a resource for service data that has accessed another network slice. For details, refer to the descriptions of S809.

If the RAN determines that current resource utilization of the first network slice of the RAN is less than or equal to the lower resource utilization limit in S1001, the RAN forbids a resource for any piece of service data that has accessed the first network slice from being pre-empted by any piece of service data that is to access the second network slice. Optionally, the RAN sets ARP-PE_V in an ARP parameter of each piece of service data that has accessed the first network slice to "pre-empted unallowed" (where for example, ARP-PE_V is set to DISABLED).

It may be understood that the resource utilization of the first network slice of the RAN may be a ratio of a resource that is of the RAN and that is occupied by service data that has accessed the first network slice by using the RAN to a total resource of the RAN.

S1012: If the RAN determines to accept the resource for the first service data that is to access the first network slice in S1011, the RAN sends a feedback message of the establishment request message to the UE, where the feedback message of the establishment request message is used to indicate that the establishment of the first service data is accepted.

S1013: If the RAN determines to accept the resource for the first service data that is to access the first network slice in S1011, the UE, the RAN, the AMF, the SMF, a UPF, and the PCF complete a subsequent process of establishing the first service data.

S1014: If the RAN releases, for the first service data that is to access the first network slice, a resource for second service data that has accessed the first network slice or another network slice in S1011, the UE, the RAN, the AMF, the SMF, the UPF, and the PCF complete a process of releasing the resource for the second service data.

In an optional embodiment, an upper resource utilization limit of the first network slice may be further sent to the RAN in S1001. In S1011, the RAN may control resource pre-emption based on the lower resource utilization limit of the first network slice in S1001 and the upper resource utilization limit of the first network slice. In this case, the indication information is not required in the method 1000, and steps related to the indication information may be omitted. Details are discussed in the following cases.

If the current resource utilization of the first network slice of the RAN is greater than the upper resource utilization limit of the first network slice, and the RAN determines to release, for the first service data that is to access the first network slice, the resource for the service data that has accessed the first network slice, the RAN determines, in the service data that has accessed the first network slice, the second service data whose priority level is lower than the priority level of the first service data (where ARP-PL of the second service data is greater than the ARP-PL of the first service data) and whose ARP-PE_V is "pre-empt allowed" (where for example, ARP-PE V is ENABLE), and releases, for the first service data, the resource for the second service data. If no service data that has accessed the first network slice has the priority level that is lower than that of the first service data and has ARP-PE_V that is "pre-empt allowed" (where for example, ARP-PE_V is ENABLE), the RAN rejects the establishment of the first service data.

If the current resource utilization of the first network slice of the RAN is less than or equal to the upper resource utilization limit of the first network slice and greater than the lower resource utilization limit in S1001, the RAN releases, for the first service data that is to access the first network slice, the resource for the service data that has accessed the first network slice or the resource for the service data that has accessed the other network slice. For details, refer to the descriptions of S809.

If the RAN determines that the current resource utilization of the first network slice of the RAN is less than or equal to the lower resource utilization limit of the first network slice, the RAN forbids the resource for the any piece of service data that has accessed the first network slice from being pre-empted by the any piece of service data that is to access the second network slice. Optionally, the RAN sets ARP-PE_V in the ARP parameter of each piece of service data that has accessed the first network slice to "pre-empted unallowed" (where for example, ARP-PE_V is set to DISABLED).

Figure 11A:
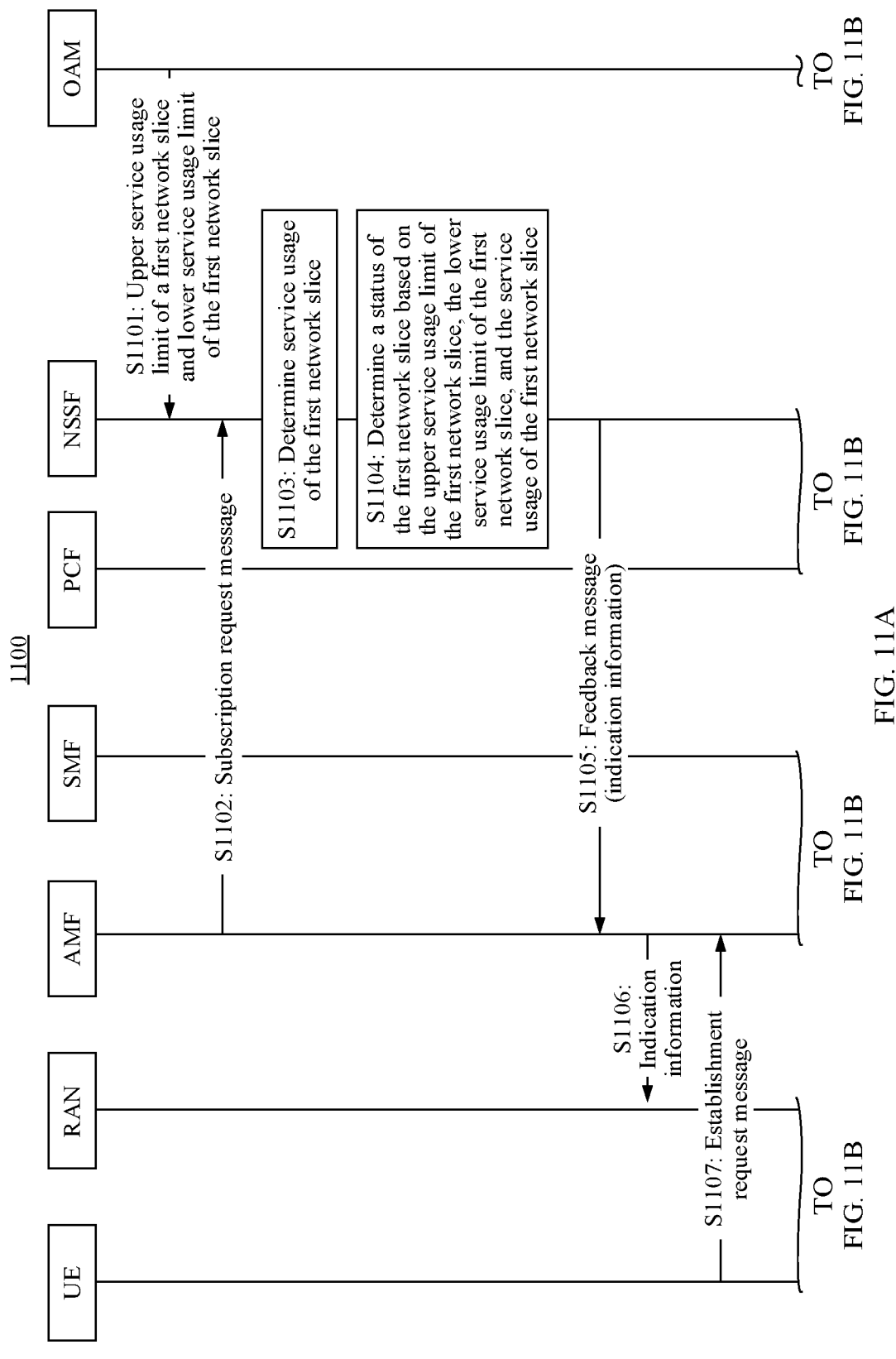
FIG. 11A and FIG. 11B are schematic diagrams of a communication method according to an embodiment of this disclosure.
Figure 11B:
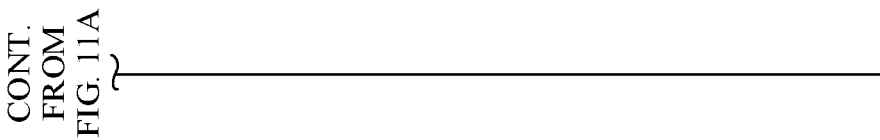
Figure 11B:
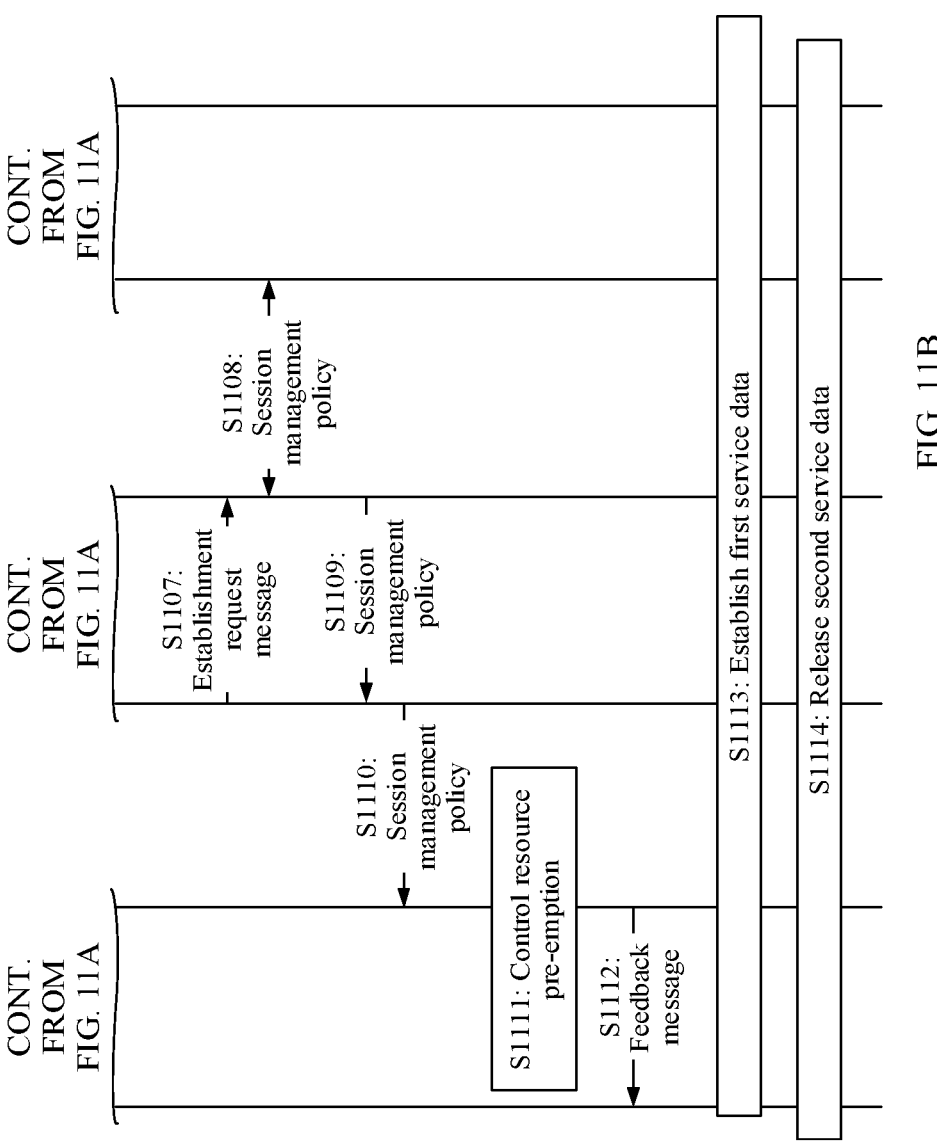

As shown in FIG. 11A and FIG. 11B, a method 1100 includes the following steps.

S1101: An OAM determines an upper service usage limit of a first network slice and a lower service usage limit of the first network slice, and sends the upper service usage limit of the first network slice and the lower service usage limit of the first network slice to an NSSF, and the NSSF stores the upper service usage limit of the first network slice and the lower service usage limit of the first network slice.

S1102: An AMF selected from an AMF set or a default AMF of the RAN sends a subscription request message to the NSSF, and the NSSF receives the subscription request message, where the subscription request message is used to subscribe to a status of a network slice.

Further, after establishing a connection to the RAN or receiving the subscription request message from the RAN, the AMF sends the subscription request message to the NSSF.

It should be noted that a sequence of S1101 and S1102 is not limited.

S1103: The NSSF obtains, from a plurality of AMFs of the first network slice, amounts of service data that has been established in the first network slice, and uses a summation result as service usage of the first network slice.

It should be noted that a sequence of S1103 and S1102 is not limited.

S1104: The NSSF determines a status of the first network slice based on the upper service usage limit of the first network slice and the lower service usage limit of the first network slice that are in S1101 and the service usage of the first network slice in S1103.

If the service usage of the first network slice is less than or equal to the lower service usage limit of the first network slice, the NSSF determines that the status of the first network slice is a "protected state".

If the service usage of the first network slice is greater than the lower service usage limit of the first network slice and less than or equal to the upper service usage limit of the first network slice, the NSSF determines that the status of the first network slice is a "normal state".

If the service usage of the first network slice is greater than or equal to the upper service usage limit of the first network slice, the NSSF determines that the status of the first network slice is a "restricted state".

S1105: The NSSF sends a feedback message of the subscription request message to the AMF, where the feedback message includes indication information indicating the status of the first network slice.

Optionally, if the status of the first network slice in S1104 changes, in an alternative manner of S1105, the indication information may indicate a status that is of the first network slice and that is obtained through change.

S1106: The AMF sends the status of the first network slice to the RAN, for example, may alternatively send the status of the first network slice to the RAN by using the indication information.

S1107: A terminal device sends a message for requesting to establish the first service data to the AMF by using the RAN, where the first establishment request message includes first S-NSSAI. The AMF determines, based on the first S-NSSAI, the first network slice corresponding to the first service data, selects an SMF corresponding to the first network slice, and sends the establishment request message to the SMF, where the establishment request message still includes the first S-NSSAI.

S1108: The SMF sends the first S-NSSAI to the PCF, the PCF determines a session management policy of the first network slice based on the first S-NSSAI, and the PCF returns the session management policy of the first network slice.

Optionally, the session management policy includes a 5QI and an ARP parameter of the first service data.

S1109: The SMF sends the session management policy to the AMF.

For example, the session management policy may be sent to the AMF by using N1N2 message transfer (Namf_Communication_N1N2MessageTransfer).

S1110: The AMF sends the session management policy to the RAN.

For example, the AMF sends the session management policy to the RAN by using an N2 PDU session request.

S1111: If an available resource of the RAN is insufficient, the RAN controls resource pre-emption based on the status of the first network slice in S1106.

If the status of the first network slice is the "restricted state", the RAN determines, in service data that has accessed the first network slice, second service data whose priority level is lower than a priority level of the first service data (where ARP-PL of the second service data is greater than ARP-PL of the first service data) and whose ARP-PE_V is "pre-empt allowed" (where for example, ARP-PE_V is ENABLE), and releases, for the first service data, a resource for the second service data. If no service data that has accessed the first network slice has a priority level that is lower than that of the first service data and has ARP-PE_V that is "pre-empt allowed" (where for example, ARP-PE_V is ENABLE), the RAN rejects establishment of the first service data.

If the status of the first network slice is the "protected state", the RAN sets ARP-PE_V in an ARP parameter of each piece of service data that has accessed the first network slice to "pre-empted unallowed" (where for example, ARP-PE_V is set to DISABLED).

If the status of the first network slice is the "normal state", the RAN releases, for the first service data that is to access the first network slice, a resource for service data that has accessed the first network slice or a resource for service data that has accessed another network slice.

S1112: If the RAN releases, for the first service data that is to access the first network slice, the resource for the second service data that has accessed the first network slice or the resource for the service data that has accessed the other network slice in S1111, the RAN sends a feedback message of the establishment request message to the UE, where the feedback message of the establishment request message is used to indicate that the establishment of the first service data is accepted.

S1113: If the RAN releases, for the first service data that is to access the first network slice, the resource for the second service data that has accessed the first network slice or a resource for second service data that has accessed the other network slice in S1111, the UE, the RAN, the AMF, the SMF, a UPF, and the PCF complete a subsequent process of establishing the first service data.

S1114: If the RAN releases, for the first service data that is to access the first network slice, the resource for the second service data that has accessed the first network slice in S1111, the UE, the RAN, the AMF, the SMF, the UPF, and the PCF complete a process of releasing the resource for the second service data.

Figure 12A:
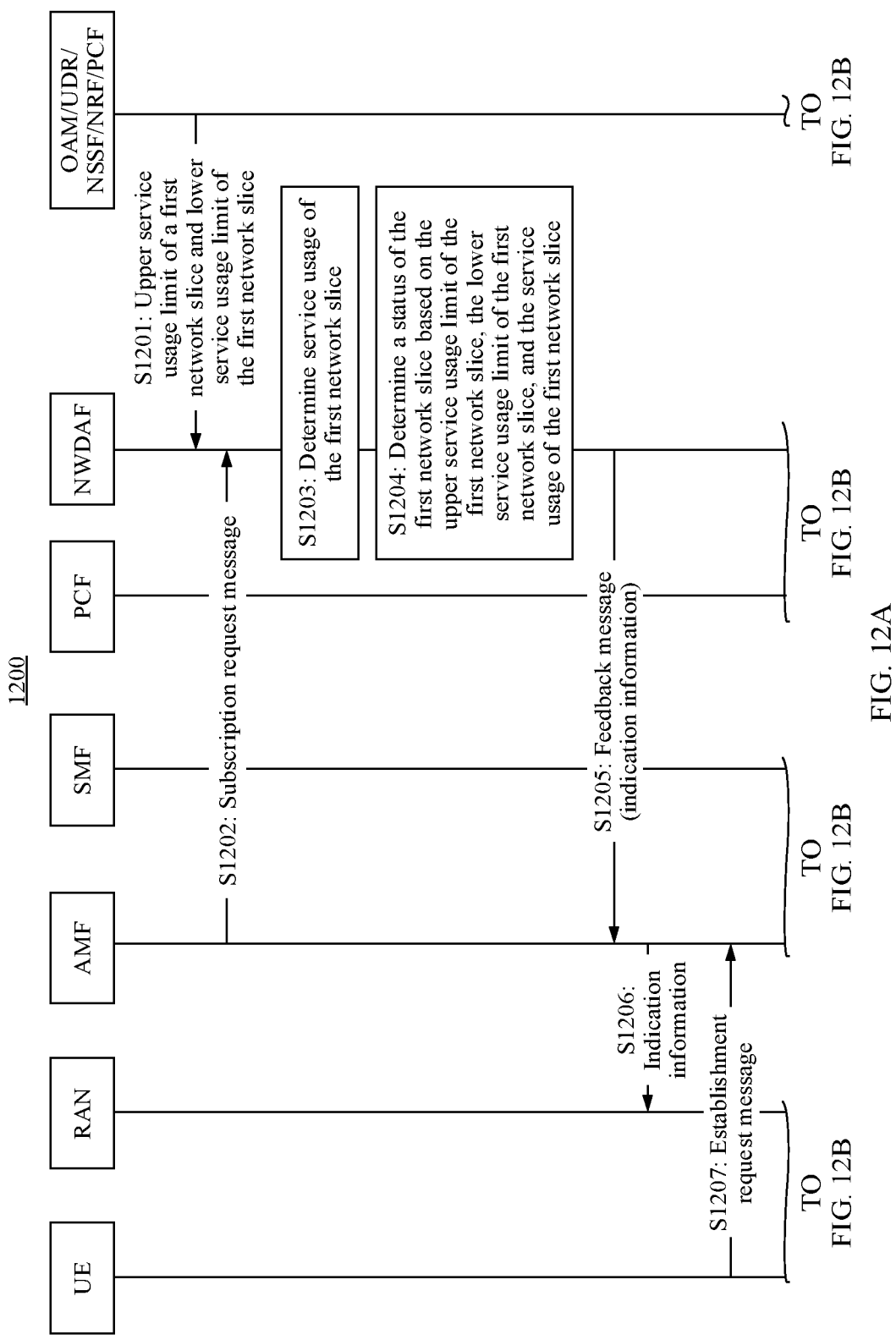
FIG. 12A and FIG. 12B are schematic diagrams of a communication method according to an embodiment of this disclosure.
Figures 12A, 12B:
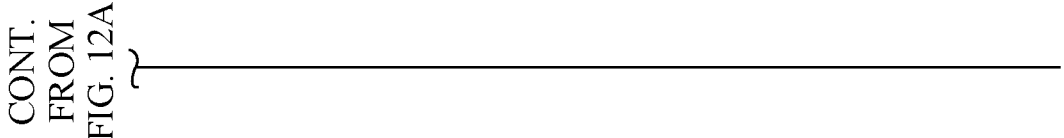

As shown in FIG. 12A and FIG. 12B, a method 1200 includes the following steps.

S1201: An OAM/a UDR/an NSSF/an NRF/a PCF determines an upper service usage limit of a first network slice and a lower service usage limit of the first network slice, and sends the upper service usage limit of the first network slice and the lower service usage limit of the first network slice to an NWDAF, and the NWDAF stores the upper service usage limit of the first network slice and the lower service usage limit of the first network slice.

S1202: An AMF selected from an AMF set or a default AMF of the RAN sends a subscription request message to the NWDAF, and the NWDAF receives the subscription request message, where the subscription request message is used to subscribe to a status of a network slice.

Further, after establishing a connection to the RAN or receiving a subscription request message from the RAN, the AMF sends the subscription request message to the NWDAF.

It should be noted that a sequence of S1201 and S1202 is not limited.

S1203: The NWDAF obtains, from a plurality of AMFs and/or SMFs of the first network slice, amounts of service data that has been established in the first network slice, and uses a summation result as service usage of the first network slice.

It should be noted that a sequence of S1203 and S1202 is not limited.

S1204: The NWDAF determines a status of the first network slice based on the upper service usage limit of the first network slice and the lower service usage limit of the first network slice that are in S1201 and the service usage of the first network slice in S1203.

If the service usage of the first network slice is less than or equal to the lower service usage limit of the first network slice, the NWDAF determines that the status of the first network slice is a "protected state".

If the service usage of the first network slice is greater than the lower service usage limit of the first network slice and less than or equal to the upper service usage limit of the first network slice, the NWDAF determines that the status of the first network slice is a "normal state".

If the service usage of the first network slice is greater than or equal to the upper service usage limit of the first network slice, the NWDAF determines that the status of the first network slice is a "restricted state".

S1205: The NWDAF sends a feedback message of the subscription request message to the AMF, where the feedback message includes indication information indicating the status of the first network slice.

Optionally, if the status of the first network slice in S1204 changes, in an alternative manner of S1205, the indication information may indicate a status that is of the first network slice and that is obtained through change.

S1206 to S1212 are the same as S1106 to S1112.

Figure 13A:
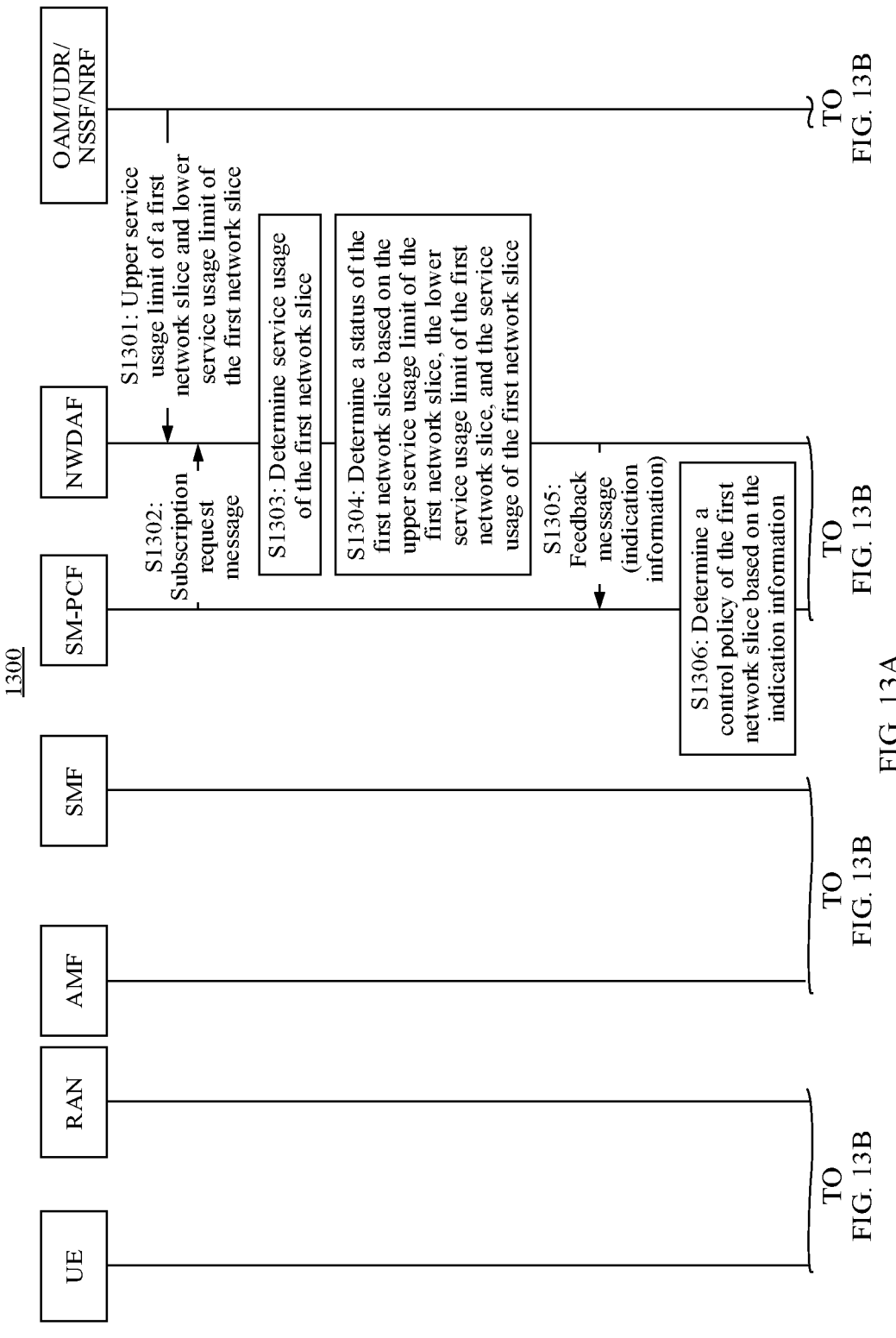

As shown in FIG. 13A and FIG. 13B, a method 1300 includes the following steps.

S1301: An OAM/a UDR/an NSSF/an NRF determines an upper service usage limit of a first network slice and a lower service usage limit of the first network slice, and sends the upper service usage limit of the first network slice and the lower service usage limit of the first network slice to an NWDAF, and the NWDAF stores the upper service usage limit of the first network slice and the lower service usage limit of the first network slice.

S1302: A session management PCF (SM-PCF) sends a subscription request message to the NWDAF, and the NWDAF receives the subscription request message, where the subscription request message is used to subscribe to a status of a network slice.

The SM-PCF is configured to perform policy control on session management, and the SM-PCF may be a part of the foregoing PCF.

Optionally, the SM-PCF may periodically send the subscription request message to the NWDAF. In addition, when receiving a correlation session management policy request sent by an SMF, the SM-PCF may alternatively be triggered to send, to the NWDAF, a request message used to request the status of the network slice.

It should be noted that a sequence of S1301 and S1302 is not limited.

S1303: The NWDAF obtains, from a plurality of AMFs and/or SMFs of the first network slice, amounts of service data that has been established in the first network slice, and uses a summation result as service usage of the first network slice.

It should be noted that a sequence of S1303 and S1302 is not limited.

S1304: The NWDAF determines a status of the first network slice based on the upper service usage limit of the first network slice and the lower service usage limit of the first network slice that are in S1301 and the service usage of the first network slice in S1303.

If the service usage of the first network slice is less than or equal to the lower service usage limit of the first network slice, the NWDAF determines that the status of the first network slice is a "protected state".

If the service usage of the first network slice is greater than the lower service usage limit of the first network slice and less than or equal to the upper service usage limit of the first network slice, the NWDAF determines that the status of the first network slice is a "normal state".

If the service usage of the first network slice is greater than or equal to the upper service usage limit of the first network slice, the NWDAF determines that the status of the first network slice is a "restricted state".

S1305: The NWDAF sends a feedback message of the subscription request message to the SM-PCF, where the feedback message includes indication information indicating the status of the first network slice.

Optionally, if the status of the first network slice in S1305 changes, in an alternative manner of S1305, the indication information may indicate a status that is of the first network slice and that is obtained through change.

S1306: The SM-PCF determines a control policy of the first network slice based on the indication information.

If the indication information indicates that the status of the first network slice is the "restricted state", the SM-PCF determines the control policy of the first network slice as follows. First service data that is to access the first network slice is forbidden from pre-empting a resource for service data that has accessed another network slice, and a resource for service data that has accessed the first network slice is allowed to be pre-empted by service data that is to access the other network slice.

If the indication information indicates that the status of the first network slice is the "normal state", the SM-PCF determines the control policy of the first network slice as follows. Service data that is to access the first network slice is allowed to pre-empt a resource for service data that has accessed another network slice, and a resource for service data that has accessed the first network slice is allowed to be pre-empted by service data that is to access the other network slice.

If the indication information indicates that the status of the first network slice is the "protected state", the SM-PCF determines the control policy of the first network slice as follows. A resource for service data that has accessed the first network slice is not allowed to be pre-empted by service data that is to access any network slice, and service data that is to access the first network slice is allowed to pre-empt a resource for service data that has accessed another network slice.

Optionally, the SM-PCF adjusts a priority level of the first network slice based on the indication information, and the control policy of the first network slice may indicate the priority level of the first network slice. Further, if the indication information indicates that the status of the first network slice is the "protected state", the SM-PCF may determine that the priority level of the first network slice is a highest priority level, for example, 0. If the indication information indicates that the status of the first network slice is the "normal state", the SM-PCF may determine that the priority level of the first network slice is a medium priority level, for example, 3. If the indication information indicates that the status of the first network slice is the "restricted state", the SM-PCF may determine that the priority level of the first network slice is a lowest priority level, for example, 5.

S1307: UE sends a message for requesting to establish the first service data to an AMF by using the RAN, where the first establishment request message includes first S-NSSAI. The AMF determines, based on the first S-NSSAI, the first network slice corresponding to the first service data, selects an SMF corresponding to the first network slice, and sends the establishment request message to the SMF, where establishment request message still includes the first S-NS-SAI. The first S-NSSAI is used to identify the first network slice.

For details of S1307, refer to S603.

S1308: After receiving the establishment request message, the SMF requests a session management policy from the SM-PCF based on the first S-NSSAI.

It should be noted that a sequence of steps S1307 and S1308 and step S1306 is not limited.

S1309: The SM-PCF sends the session management policy in S1308 and the control policy of the first network slice in S1306 to the SMF.

The session management policy may include a QoS parameter of the first service data.

S1310: The SMF sends the session management policy and the control policy of the first network slice to the AMF.

For example, the SMF may send the session management policy and the control policy of the first network slice to the AMF by using N1N2 message transfer (Namf_Communication_N1N2MessageTransfer).

S1311: The AMF sends the session management policy and the control policy of the first network slice to the RAN.

For example, the AMF sends the session management policy and the control policy of the first network slice to the RAN by using an N2 PDU session request.

S1312: The RAN controls resource pre-emption according to the control policy of the first network slice in S1310.

If the control policy of the first network slice is that the first service data that is to access the first network slice is forbidden from pre-empting the resource for the service data that has accessed the other network slice and the resource for the service data that has accessed the first network slice is allowed to be pre-empted by the service data that is to access the other network slice, the RAN pre-empts, for the first service data that is to access the first network slice, the resource for the service data that has accessed the first network slice, and the RAN determines, in the service data that has accessed the first network slice, second service data whose priority level is lower than a priority level of the first service data (where ARP-PL of the second service data is greater than ARP-PL of the first service data) and whose ARP-PE_V is "pre-empt allowed" (where for example, ARP-PE_V is ENABLE), and releases, for the first service data, a resource for the second service data.

If the control policy of the first network slice is that the service data that is to access the first network slice is allowed to pre-empt the resource for the service data that has accessed the other network slice and the resource for the service data that has accessed the first network slice is allowed to be pre-empted by the service data that is to access the other network slice, the RAN releases, for the first service data that is to access the first network slice, the resource for the service data that has accessed the first network slice or the resource for the service data that has accessed the other network slice.

If the control policy of the first network slice is that the resource for the service data that has accessed the first network slice is not allowed to be pre-empted by the service data that is to access the any network slice and the service data that is to access the first network slice is allowed to pre-empt the resource for the service data that has accessed the other network slice, optionally, the RAN sets ARP-PE_V in an ARP parameter of each piece of service data that has accessed the first network slice to "pre-empted unallowed" (where for example, ARP-PE_V is set to DISABLED).

Optionally, if the control policy of the first network slice in S1306 may indicate the priority level of the first network slice, the RAN may add the priority level of the first network slice to ARP-PI in the QoS parameter that is of the first service data and that is in the session management policy, to determine the priority level of the first service data. If there are a plurality of network slices, priority levels of the plurality of network slices may be added to ARP-PI in QoS parameters of service data that is to access the plurality of network slices, to obtain priority levels of the service data that is to access the plurality of network slices. In this way, the priority levels of the service data that is to access the plurality of network slices are compared to perform resource pre-emption.

S1313 to S1315 are the same as S1112 to S1114.

Figure 14A:
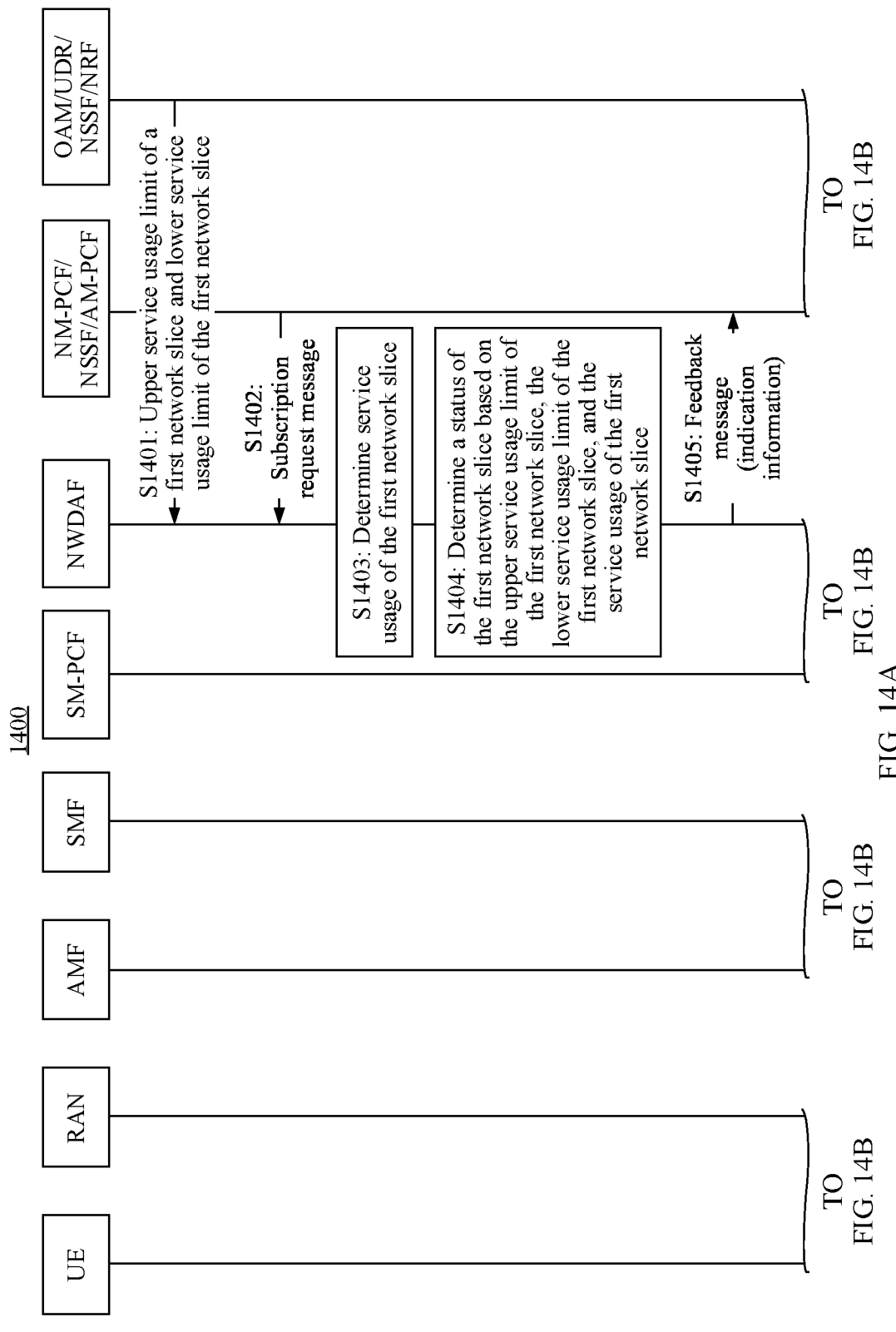
FIG. 14A, FIG. 14B, and FIG. 14C are schematic diagrams of a communication method according to an embodiment of this disclosure.
Figure 14B:
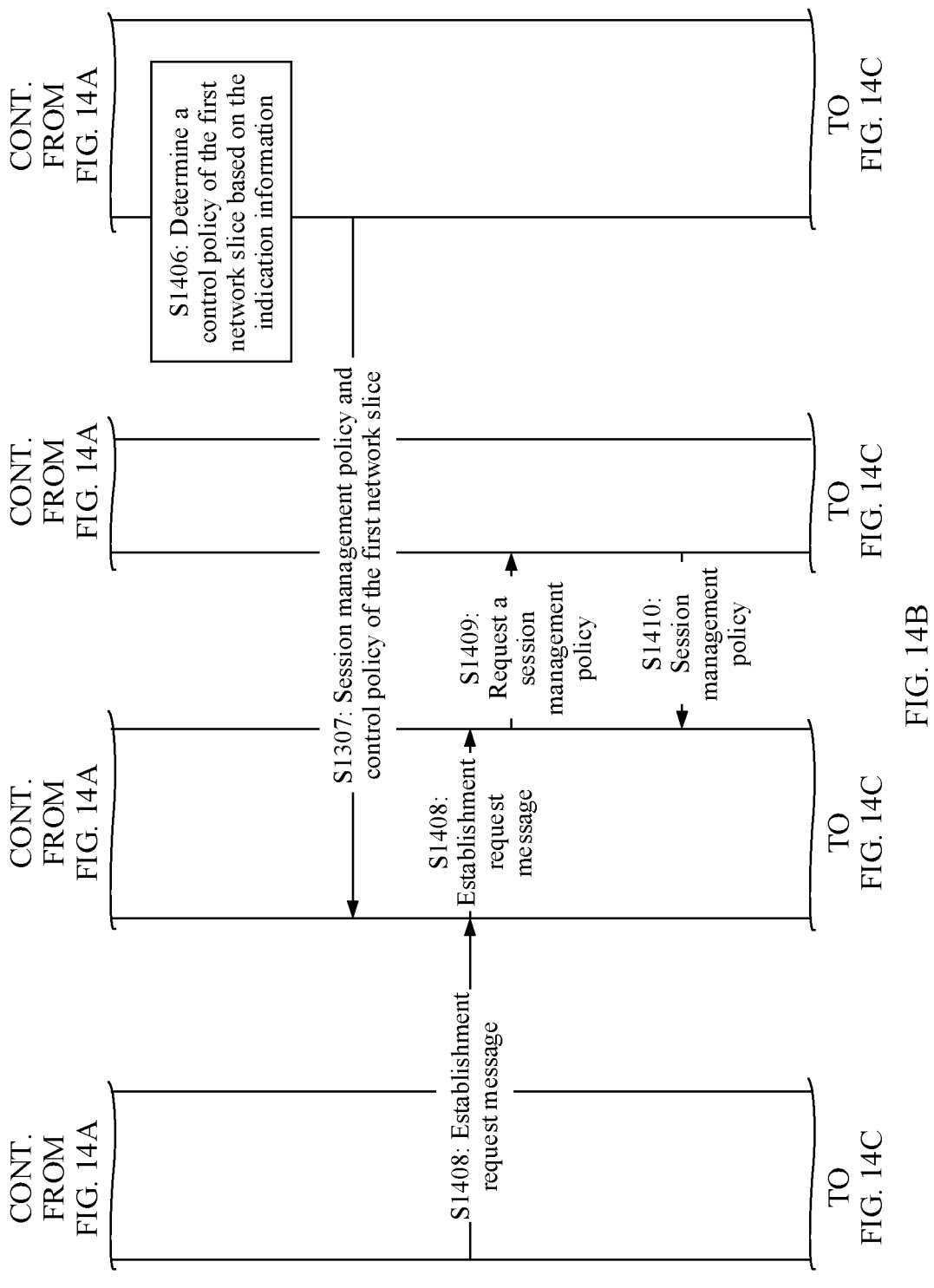
Figure 14C:
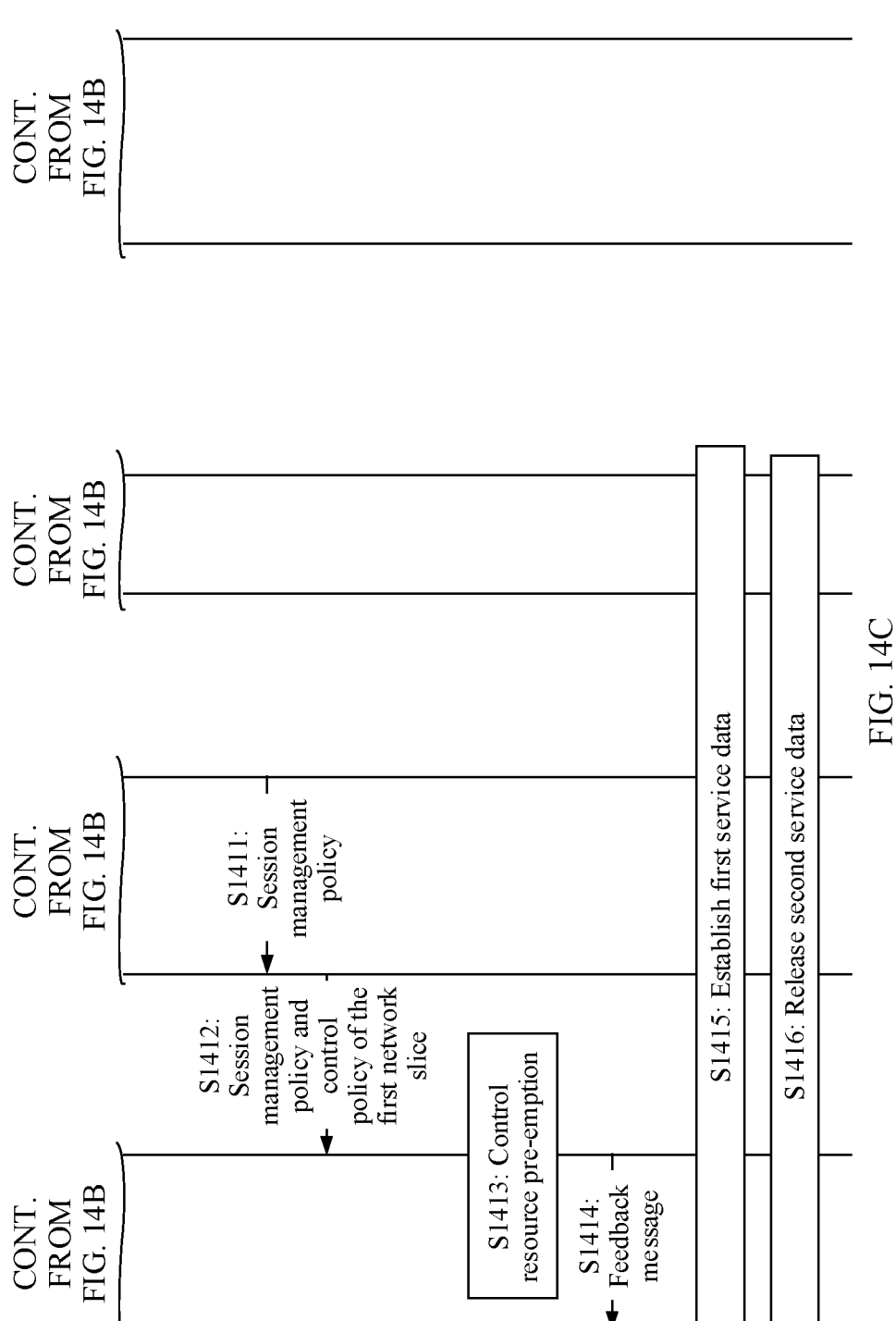

As shown in FIG. 14A, FIG. 14B, and FIG. 14C, a method 1400 includes the following steps.

S1401: An OAM/a UDR/an NSSF/an NRF determines an upper service usage limit of a first network slice and a lower service usage limit of the first network slice, and sends the upper service usage limit of the first network slice and the lower service usage limit of the first network slice to an NWDAF, and the NWDAF stores the upper service usage limit of the first network slice and the lower service usage limit of the first network slice.

S1402: A network slice management PCF (NM-PCF), the NSSF, or an access management PCF (AM-PCF) may send a subscription request message to the NWDAF, and the NWDAF receives the subscription request message, where the subscription request message is used to subscribe to a status of a network slice.

The AM-PCF is configured to perform policy control on UE registration management, and the AM-PCF may be a part of the foregoing PCF. The NM-PCF is configured to perform policy control on network slice management, and the NM-PCF may be a part of the PCF.

Further, the NM-PCF/AM-PCF/NSSF may periodically send the subscription request message to the NWDAF.

It should be noted that a sequence of S1401 and S1402 is not limited.

S1403: The NWDAF obtains, from a plurality of AMFs and/or SMFs of the first network slice, amounts of service data that has been established in the first network slice, and uses a summation result as service usage of the first network slice.

It should be noted that a sequence of S1403 and S1402 is not limited.

S1404: The NWDAF determines a status of the first network slice based on the upper service usage limit of the first network slice and the lower service usage limit of the first network slice that are in S1401 and the service usage of the first network slice in S1403.

If the service usage of the first network slice is less than or equal to the lower service usage limit of the first network slice, the NWDAF determines that the status of the first network slice is a "protected state".

If the service usage of the first network slice is greater than the lower service usage limit of the first network slice and less than or equal to the upper service usage limit of the first network slice, the NWDAF determines that the status of the first network slice is a "normal state".

If the service usage of the first network slice is greater than or equal to the upper service usage limit of the first network slice, the NWDAF determines that the status of the first network slice is a "restricted state".

S1405: The NWDAF sends a feedback message of the subscription request message to the NM-PCF, the NSSF, or the AM-PCF, where the feedback message includes indication information indicating the status of the first network slice.

Optionally, if the status of the first network slice in S1405 changes, in an alternative manner of S1405, the indication information may indicate a status that is of the first network slice and that is obtained through change.

S1406: The NM-PCF, the NSSF, or the AM-PCF determines a control policy of the first network slice based on the indication information.

If the indication information indicates that the status of the first network slice is the "restricted state", the NM-PCF, the NSSF, or the AM-PCF determines the control policy of the first network slice as follows. First service data that is to access the first network slice is forbidden from pre-empting a resource for service data that has accessed another network slice, and a resource for service data that has accessed the first network slice is allowed to be pre-empted by service data that is to access the other network slice.

If the indication information indicates that the status of the first network slice is the "normal state", the NM-PCF, the NSSF, or the AM-PCF determines the control policy of the first network slice as follows. Service data that is to access the first network slice is allowed to pre-empt a resource for service data that has accessed another network slice, and a resource for service data that has accessed the first network slice is allowed to be pre-empted by service data that is to access the other network slice.

If the indication information indicates that the status of the first network slice is the "protected state", the NM-PCF, the NSSF, or the AM-PCF determines the control policy of the first network slice as follows. A resource for service data that has accessed the first network slice is not allowed to be pre-empted by service data that is to access any network slice, and service data that is to access the first network slice is allowed to pre-empt a resource for service data that has accessed another network slice.

Optionally, the NM-PCF, the NSSF, or the AM-PCF adjusts a priority level of the first network slice based on the indication information. Further, if the indication information indicates that the status of the first network slice is the "protected state", the NM-PCF, the NSSF, or the AM-PCF may determine that the priority level of the first network slice is a highest priority level, for example, 0. If the indication information indicates that the status of the first network slice is the "normal state", the NM-PCF, the NSSF, or the AM-PCF may determine that the priority level of the first network slice is a medium priority level, for example, 3. If the indication information indicates that the status of the first network slice is the "restricted state", the NM-PCF, the NSSF, or the AM-PCF may determine that the priority level of the first network slice is a lowest priority level, for example, 5.

S1407: The NM-PCF, the NSSF, or the AM-PCF sends the control policy of the first network slice to an AMF, where the AMF may be an AMF with which the terminal registers, or may be a default AMF to which the RAN is connected.

S1408: The UE sends a message for requesting to establish the first service data to the AMF by using the RAN, where the first establishment request message includes first S-NSSAI. The AMF determines, based on the first S-NSSAI, the first network slice corresponding to the first service data, selects an SMF corresponding to the first network slice, and sends the establishment request message to the SMF, where the establishment request message still includes the first S-NSSAI. The first S-NSSAI is used to identify the first network slice.

For details of S1408, refer to S603.

S1409: After receiving the establishment request message, the SMF requests a session management policy from the SM-PCF based on the first S-NSSAI.

It should be noted that a sequence of steps S1408 and S1409 and step S1407 is not limited.

S1410: The SM-PCF sends the session management policy in S1308 to the SMF.

The session management policy may include a QoS parameter of the first service data.

S1411: The SMF sends the session management policy to the AMF.

For example, the SMF may send the session management policy and the control policy of the first network slice to the AMF by using N1N2 message transfer (Namf_Communication_N1N2MessageTransfer).

S1412: The AMF sends the session management policy in S1411 and the control policy of the first network slice in S1407 to the RAN For example, the AMF sends the session management policy and the control policy of the first network slice to the RAN by using an N2 PDU session request.

It should be noted that the AMF may simultaneously send the session management policy and the control policy of the first network slice to the RAN, or may separately send the session management policy and the control policy of the first network slice to the RAN.

S1413 to S1416 are the same as S1312 to S1315.

It should be noted that, in the foregoing method embodiment, sending, by the UE, the message for requesting to establish the first service data may be initiated as required without being affected.

It should also be noted that, in the foregoing method embodiments, the PCF or the RAN releases, for the first service data that is to access the first network slice, the second service data that has accessed the first network slice or the second service data that has accessed the other network slice. In this case, there are one or more pieces of second service data. In other words, after the PCF or the RAN releases the resource for the second service data that has accessed the first network slice or the second service data that has accessed the other network slice, the resource needs to satisfy a requirement for establishing the first data service.

The communication methods provided in embodiments of this disclosure are described above in detail with reference to FIG. 2 to FIG. 14C. Communication apparatuses provided in embodiments of this disclosure are described below in detail with reference to FIG. 15 and FIG. 16.

Figure 15:
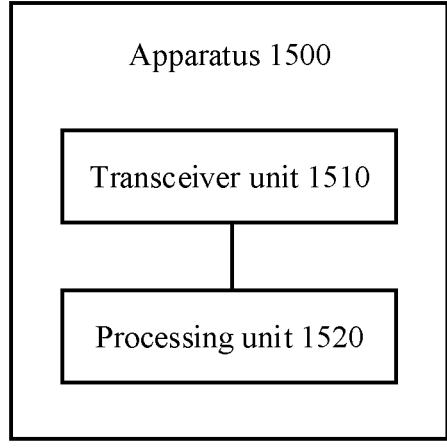
FIG. 15 is a schematic block diagram of a communication apparatus according to an embodiment of this disclosure.

FIG. 15 is a schematic block diagram of a communication apparatus according to an embodiment of this disclosure. As shown in FIG. 15, the apparatus 1500 may include a transceiver unit 1510 and a processing unit 1520.

In a possible design, the apparatus 1500 may correspond to the PCF or the first network device in the foregoing method embodiments, for example, may be a PCF or a chip disposed in the PCF. The apparatus 1500 is configured to perform the steps or the procedures corresponding to the PCF in the method 200 to the method 1400.

Further, the transceiver unit 1510 is configured to obtain service usage of a first network slice and a service usage threshold of the first network slice. The processing unit 1520 is configured to generate indication information based on the service usage of the first network slice and the service usage threshold of the first network slice. The transceiver unit 1510 is further configured to send the indication information to a second network device, where the indication information is used for controlling resource pre-emption at the second network device.

Optionally, the service usage threshold of the first network slice includes an upper service usage limit of the first network slice. If the service usage of the first network slice is greater than or equal to the upper service usage limit of the first network slice, the indication information indicates the second network device to release, for first service data that is to access the first network slice, a resource for service data that has accessed the first network slice, or the indication information indicates that allowed service usage of the first network slice is greater than or equal to the upper service usage limit of the first network slice.

Optionally, the upper service usage limit of the first network slice is at least one of a maximum quantity of sessions allowed to access the first network slice, a maximum bandwidth of traffic allowed to access the first network slice, or a maximum session density allowed for the first network slice.

Optionally, the service usage threshold of the first network slice includes a lower service usage limit of the first network slice.

If the service usage of the first network slice is less than or equal to the lower service usage limit of the first network slice, the indication information indicates that a resource for any piece of service data that has accessed the first network slice is not pre-empted by any piece of service data that is to access a second network slice, or the indication information indicates that the service usage of the first network slice is less than or equal to the lower service usage limit of the first network slice.

Optionally, the lower service usage limit of the first network slice is at least one of a minimum quantity of sessions guaranteed to access the first network slice, a minimum bandwidth of traffic guaranteed to access the first network slice, or a minimum session density guaranteed for the first network slice.

Optionally, if the service usage of the first network slice is less than or equal to the lower service usage limit of the first network slice, the processing unit is further configured to set a pre-emption vulnerability parameter in an ARP parameter of first service data to "pre-empted unallowed", or set a pre-emption vulnerability parameter in an ARP parameter of each piece of service data that has accessed the first network slice to "pre-empted unallowed".

Optionally, service data that is to access the first network slice or the service data that has accessed the first network slice is a QoS flow or a PDU session, or the service data that is to access the second network slice or service data that has accessed the second network slice is a QoS flow or a PDU session.

In a possible design, the apparatus 1500 may correspond to the RAN in the foregoing method embodiments, for example, may be a RAN or a chip disposed in the RAN. The apparatus 1500 is configured to perform the steps or the procedures corresponding to the RAN in the method 200 to the method 1400.

Further, the transceiver unit 1510 is configured to receive indication information from a first network device.

The processing unit 1520 is configured to release, based on the indication information for first service data that is to access a first network slice, a resource for second service data that has accessed the first network slice, or the processing unit 1520 is configured to forbid, based on the indication information, a resource for service data that has accessed a first network slice from being pre-empted by any piece of service data that is to access a second network slice.

Optionally, the processing unit 1520 is further configured to, if the indication information indicates to release, for the first service data that is to access the first network slice, the resource for the service data that has accessed the first network slice, or the indication information indicates that service usage of the first network slice is greater than or equal to an upper service usage limit of the first network slice, release, for the first service data that is to access the first network slice, the resource for the second service data that has accessed the first network slice.

Optionally, the processing unit 1520 is further configured to determine, based on the indication information, to forbid pre-empting, for the first service data that is to access the first network slice, a resource for service data that has accessed a network slice other than the first network slice, and determine, based on an authorized QoS parameter of the first service data and an authorized QoS parameter of the second service data, the second service data in the service data that has accessed the first network slice, where a priority level of the first service data is higher than a priority level of the second service data, a pre-emption capability parameter in an ARP parameter in the authorized QoS parameter of the first service data is set to "pre-empt allowed", and a pre-emption vulnerability parameter in an ARP parameter in the authorized QoS parameter of the second service data is set to "pre-empted allowed".

Optionally, the upper service usage limit of the first network slice is at least one of a maximum quantity of sessions allowed to access the first network slice, a maximum bandwidth of traffic allowed to access the first network slice, or a maximum session density allowed for the first network slice.

Optionally, the processing unit 1520 is further configured to, if the indication information indicates that the resource for any piece of service data that has accessed the first network slice is not pre-empted by the any piece of service data that is to access the second network slice or that service usage of the first network slice is less than or equal to a lower service usage limit of the first network slice, forbid the resource for the any piece of service data that has accessed the first network slice from being pre-empted by second service data that is to access the second network slice.

Optionally, the lower service usage limit of the first network slice is at least one of a minimum quantity of sessions guaranteed to access the first network slice, a minimum bandwidth of traffic guaranteed to access the first network slice, or a minimum session density guaranteed for the first network slice.

Optionally, if the processing unit 1520 is configured to forbid, based on the indication information, the resource for the service data that has accessed the first network slice from being pre-empted by the any piece of service data that is to access the second network slice, the processing unit 1520 is further configured to set a pre-emption vulnerability parameter in an ARP parameter of each piece of service data that has accessed the first network slice to "pre-empted unallowed".

Optionally, service data that is to access the first network slice or the service data that has accessed the first network slice is a QoS flow or a PDU session, or the service data that is to access the second network slice or service data that has accessed the second network slice is a QoS flow or a PDU session.

It should be understood that the apparatus 1500 herein is embodied in the form of functional units. The term "unit" herein may refer to an application-specific integrated circuit (ASIC), an electronic circuit, a processor (for example, a shared processor, a dedicated processor, or a group processor) configured to execute one or more software or firmware programs, a memory, a merged logic circuit, and/or another appropriate component that supports the described function. In an optional example, a person skilled in the art may understand that the apparatus 1500 may be further the PCF in the foregoing embodiments, and may be configured to perform the procedures and/or the steps corresponding to the PCF in the foregoing method embodiments. Alternatively, the apparatus 1500 may be further the RAN in the foregoing embodiments, and may be configured to perform the procedures and/or the steps corresponding to the RAN in the foregoing method embodiments. To avoid repetition, details are not described herein again.

The apparatus 1500 in each of the foregoing solutions has a function of implementing the corresponding steps performed by the PCF in the foregoing methods, or the apparatus 1500 in each of the foregoing solutions has a function of implementing the corresponding steps performed by the RAN in the foregoing methods. The function may be implemented by using hardware, or may be implemented by hardware executing corresponding software. The hardware or software includes one or more modules corresponding to the foregoing function. For example, a communication unit may be replaced with a transceiver (where for example, a sending unit in the communication unit may be replaced with a transmitter, and a receiving unit in the communication unit may be replaced with a receiver), and another unit such as a processing unit may be replaced with a processor, to separately perform receiving and sending operations and a related processing operation in the method embodiments.

In addition, the communication unit may alternatively be a transceiver circuit (where for example, the transceiver circuit may include a receiver circuit and a transmitter circuit), and the processing unit may be a processing circuit. In this embodiment of this disclosure, the apparatus in FIG. 12A and FIG. 12B may be the terminal device or the network device in the foregoing embodiment, or may be a chip or a chip system, for example, a system on chip (SoC). The communication unit may be an input/output circuit or a communication interface. The processing unit is a processor, a microprocessor, or an integrated circuit integrated on the chip. This is not limited herein.

Figure 16:
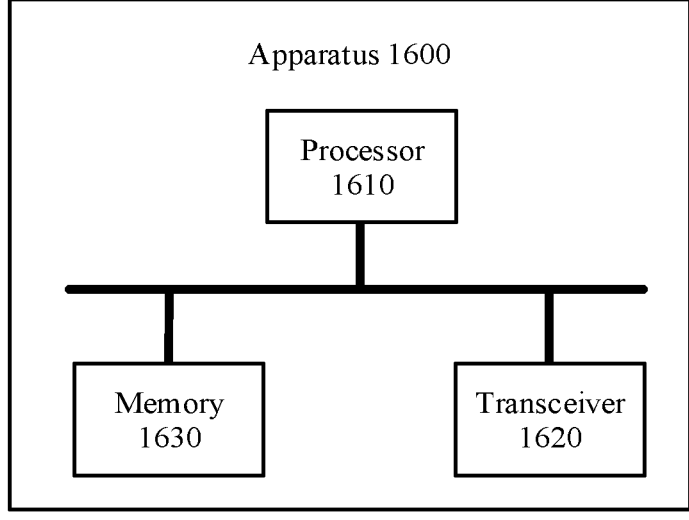
FIG. 16 is a schematic block diagram of a communication apparatus according to an embodiment of this disclosure.

FIG. 16 shows a communication apparatus 1600 according to an embodiment of this disclosure. The apparatus 1600 includes a processor 1610 and a transceiver 1620. The processor 1610 and the transceiver 1620 communicate with each other through an internal connection path, and the processor 1610 is configured to execute instructions, to control the transceiver 1620 to send a signal and/or receive a signal.

Optionally, the apparatus 1600 may further include a memory 1630. The memory 1630 communicates with the processor 1610 and the transceiver 1620 through an internal connection path. The memory 1630 is configured to store instructions, and the processor 1610 may execute the instructions stored in the memory 1630. In a possible implementation, the apparatus 1600 is configured to implement the procedures and the steps corresponding to the PCF in the foregoing method embodiments. In another possible implementation, the apparatus 1600 is configured to implement the procedures and the steps corresponding to the RAN in the foregoing method embodiments.

It should be understood that the apparatus 1600 may be further the PCF or the RAN in the foregoing embodiments, or may be a chip or a chip system. Correspondingly, the transceiver 1620 may be a transceiver circuit of the chip. This is not limited herein. Further, the apparatus 1600 may be configured to perform the steps and/or the procedures corresponding to the PCF or the RAN in the foregoing method embodiments. Optionally, the memory 1630 may include a ROM and a random-access memory (RAM), and provide instructions and data for the processor. A part of the memory may further include a non-volatile RAM. For example, the memory may further store information about a device type. The processor 1610 may be configured to execute the instructions stored in the memory. When the processor 1610 executes the instructions stored in the memory, the processor 1610 is configured to perform the steps and/or procedures of the method embodiments that correspond to the PCF or the RAN.

In an implementation process, steps in the foregoing methods can be completed by using a hardware integrated logical circuit in the processor or by using instructions in a form of software. The steps of the methods disclosed with reference to embodiments of this disclosure may be directly performed and completed by a hardware processor, or may be performed and completed by a combination of hardware and software modules in the processor. The software module may be located in a mature storage medium in the art, for example, a RAM, a flash memory, a ROM, a programmable ROM (PROM), an electrically erasable PROM (EEPROM), or a register. The storage medium is located in a memory. The processor reads information in the memory and completes the steps in the foregoing methods in combination with hardware of the processor. To avoid repetition, details are not described herein again.

It should be noted that, the processor in embodiments of this disclosure may be an integrated circuit chip, and has a signal processing capability. In an implementation process, steps in the foregoing method embodiments can be completed by using a hardware integrated logical circuit in the processor or by using instructions in a form of software. The processor may be a general purpose processor, a digital signal processor (DSP), an ASIC, a field-programmable gate array (FPGA) or another programmable logic device, a discrete gate or a transistor logic device, or a discrete hardware component. The processor may implement or perform the methods, the steps, and logical block diagrams that are disclosed in embodiments of this disclosure. The general-purpose processor may be a microprocessor, or the processor may be any conventional processor or the like. The steps of the methods disclosed with reference to embodiments of this disclosure may be directly performed and completed by a hardware decoding processor, or may be performed and completed by a combination of hardware and software modules in the decoding processor. The software module may be located in a mature storage medium in the art, for example, a RAM, a flash memory, a ROM, a PROM, an EEPROM, or a register. The storage medium is located in a memory. The processor reads information in the memory and completes the steps in the foregoing methods in combination with hardware of the processor.

It may be understood that the memory in embodiments of this disclosure may be a volatile memory or a non-volatile memory, or may include both the volatile memory and the non-volatile memory. The non-volatile memory may be a ROM, a PROM, an erasable PROM (EPROM), an EEPROM, or a flash memory. The volatile memory may be a RAM used as an external buffer. By way of example but not limitative description, many forms of RAMs are available, for example, a static RAM (SRAM), a dynamic RAM (DRAM), a synchronous DRAM (SDRAM), a double data rate (DDR) SDRAM, an enhanced SDRAM (ESDRAM), a SynchLink DRAM (SLDRAM), and a direct Rambus (DR) RAM. It should be noted that the memory in the systems and methods described in this specification aims to include but is not limited to these and any memory of another appropriate type.

According to the methods provided in embodiments of this disclosure, this disclosure further provides a computer program product. The computer program product includes computer program code. When the computer program code is run on a computer, the computer is enabled to perform the steps or the procedures performed by the PCF or the RAN in the embodiments shown in FIG. 2 to FIG. 14C.

According to the methods provided in embodiments of this disclosure, this disclosure further provides a computer-readable storage medium. The computer-readable storage medium stores program code. When the program code is run on a computer, the computer is enabled to perform the steps or procedures performed by the PCF or the RAN in the embodiments shown in FIG. 2 to FIG. 14C.

According to the methods provided in embodiments of this disclosure, this disclosure further provides a communication system. The communication system includes the foregoing one or more RANs and one or more PCFs, or includes at least two network elements in the embodiments shown in FIG. 2 to FIG. 14C.

The apparatus embodiments shown in FIG. 15 and FIG. 16 completely correspond to the method embodiments shown in FIG. 2 to FIG. 14C. A corresponding module or unit performs a corresponding step. For example, a communication unit (a transceiver) performs a receiving or sending step in the method embodiments, and a processing unit (a processor) performs a step other than the sending or receiving step. A function of a specific unit may be based on a corresponding method embodiment. There may be one or more processors.

In this disclosure, "indication" may include a direct indication and an indirect indication, or may include an explicit indication and an implicit indication. Information indicated by using a piece of information is referred to as to-be-indicated information. In a specific implementation process, the to-be-indicated information may be indicated in a plurality of manners, for example, but not limited to, a manner of directly indicating the to-be-indicated information. For example, the to-be-indicated information or an index of the to-be-indicated information is indicated. Alternatively, the to-be-indicated information may be indirectly indicated by indicating other information, and there is an association relationship between the other information and the to-be-indicated information. Alternatively, only a part of the to-be-indicated information may be indicated, and the other part of the to-be-indicated information is known or pre-agreed on. For example, specific information may alternatively be indicated by using an arrangement sequence of a plurality of pieces of information that is pre-agreed on (for example, stipulated in a protocol), to reduce indication overheads to some extent.

In embodiments of this disclosure, the terms and English abbreviations are all examples given for ease of description, and should not constitute any limitation on this disclosure. This disclosure does not exclude a possibility of defining another term that can implement a same or similar function in an existing protocol or a future protocol.

In embodiments of this disclosure, "first", "second", and various numerical numbers are merely used for distinguishing for ease of description, and are not used to limit the scope of embodiments of this disclosure. For example, different network slices are distinguished from each other, and different network devices are distinguished from each other.

Terms such as "component", "module", and "system" used in this specification are used to indicate a computer-related entity, hardware, firmware, a combination of hardware and software, software, or software being executed. For example, a component may be, but is not limited to, a process that is run on a processor, a processor, an object, an executable file, a thread of execution, a program, and/or a computer. As illustrated by using figures, both a computing device and an application that is run on the computing device may be components. One or more components may reside within a process and/or a thread of execution, and a component may be located on one computer and/or distributed between two or more computers. In addition, these components may be executed from various computer-readable storage media that store various data structures. The components may communicate by using a local and/or remote process and based on, for example, a signal having one or more data packets (for example, data from two components interacting with another component in a local system, in a distributed system, and/or across a network such as the Internet interacting with other systems by using the signal).

It should be understood that, in this specification, "at least one" means one or more, and "a plurality of" means two or more. The term "and/or" describes an association relationship between associated objects and represents that three relationships may exist. For example, A and/or B may represent the following three cases: only A exists, both A and B exist, and only B exists. A and B may be in a singular or plural form. A character "I" generally indicates an "or" relationship between the associated objects. "At least one of the following" or a similar expression thereof means any combination of these items, and includes a singular item or any combination of plural items. For example, at least one of a, b, and c may indicate a, b, c, a and b, a and c, b and c, or a, b, and c, where a, b, or c may be singular or plural.

A person of ordinary skill in the art may be aware that illustrative logical blocks and steps described with reference to embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatuses, and units, refer to a corresponding process in the foregoing method embodiments, and details are not described herein again.

In the several embodiments provided in this disclosure, it should be understood that the disclosed systems, apparatuses, and methods may be implemented in other manners. For example, the foregoing apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual coupling or direct coupling or communication connection may be implemented by using some interfaces. The indirect coupling or communication connection between the apparatuses or units may be implemented in electrical, mechanical, or another form.

The units described as separate parts may or may not be physically separate, and parts displayed as units may or may not be physical units, that is, may be located in one location, or may be distributed on a plurality of network units. Some or all of the units may be selected based on actual requirements to achieve the objectives of the solutions of embodiments.

In addition, functional units in embodiments of this disclosure may be integrated into one processing unit, each of the units may exist alone physically, or two or more units may be integrated into one unit.

In the foregoing embodiments, all or some of the functions of the functional units may be implemented by software, hardware, firmware, or any combination thereof. When the software is used to implement embodiments, embodiments may be implemented completely or partially in a form of a computer program product. The computer program product includes one or more computer instructions (programs). When the computer program instructions (programs) are loaded and executed on a computer, the procedures or functions according to embodiments of this disclosure are all or partially generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from one web site, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DIGITAL VERSATILE DISC (DVD)), a semiconductor medium (for example, a solid-state drive (SSD)), or the like.

When the functions are implemented in the form of a software functional unit and sold or used as an independent product, the functions may be stored in a computer-readable storage medium. Based on such an understanding, the technical solutions in this disclosure essentially, the part contributing to the other approaches, or some of the technical solutions may be implemented in a form of a software product. The computer software product is stored in a storage medium, and includes several instructions for instructing a computer device (which may be a personal computer, a server, a network device, or the like) to perform all or some of the steps of the methods in embodiments of this disclosure. The foregoing storage medium includes: any medium that can store program code, such as a Universal Serial Bus (USB) flash drive, a removable hard disk, a ROM, a RAM, a magnetic disk, or a compact disc (CD).

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A communication method implemented by a second network device, wherein the communication method comprises:

receiving, from a first network device, indication information;

releasing, based on indication information being a first indication and for first service data that is to access a first network slice, a first resource for second service data that has accessed the first network slice; and forbidding, based on indication information being a second indication, a second resource for third service data that has accessed the first network slice from being pre-empted by any piece of fourth service data that is to access a second network slice.

2. The communication method of claim 1, further comprising releasing, for the first service data, the first resource for the second service data when the indication information either instructs the second network device to release, for the first service data, the first resource for the second service data or indicates that a service usage of the first network slice is greater than or equal to an upper service usage limit of the first network slice.

3. The communication method of claim 2, further comprising:

determining, based on the indication information, to forbid pre-empting, for the first service data, a third resource for fifth service data that has accessed a third network slice other than the first network slice; and determining, based on a first authorized quality of service (QoS) parameter of the first service data and a second authorized QoS parameter of the second service data, the second service data, wherein a first priority level of the first service data is higher than a second priority level of the second service data, wherein a pre-emption capability parameter in a first allocation and retention priority (ARP) parameter in the first authorized QoS parameter is set to "pre-empt allowed," and wherein a pre-emption vulnerability parameter in a second ARP parameter in the second authorized QoS parameter is set to "pre-empted allowed".

4. The communication method of claim 2, wherein the upper service usage limit comprises at least one of a maximum quantity of sessions allowed to access the first network slice, a maximum bandwidth of traffic allowed to access the first network slice, or a maximum session density allowed for the first network slice.

5. The communication method of claim 1, further comprising further forbidding the second resource for any piece of the third service data when the indication information indicates, to the second network device, that the second resource for the any piece of the third service data that has accessed the first network slice is not pre-empted by the any piece of the fourth service data or that a service usage of the first network slice is less than or equal to a lower service usage limit of the first network slice.

6. The communication method of claim 5, wherein the lower service usage limit comprises at least one of a minimum quantity of sessions guaranteed to access the first network slice, a minimum bandwidth of traffic guaranteed to access the first network slice, or a minimum session density guaranteed for the first network slice.

7. The communication method of claim 1, further comprising:

identifying that the second network device has forbidden, based on the indication information, the second resource for any piece of the third service data; and setting, in response to identifying, a pre-emption vulnerability parameter in an allocation and retention priority (ARP) parameter of each piece of the second service data to "pre-empted unallowed".

8. The communication method of claim 1, wherein the first service data or the second service data is a first quality of service (QoS) flow or a first protocol data unit (PDU) session, or wherein the fourth service data or fifth service data that has accessed the second network slice is a second QoS flow or a second PDU session.

9. A communication apparatus comprising:

a transceiver configured to receive, from a first network device, indication information; and a processor coupled to the transceiver and configured to:

release, based on the indication information being a first indication and for first service data that is to access a first network slice, a first resource for second service data that has accessed the first network slice; and forbid, based on the indication information being a second indication, a second resource for third service data that has accessed the first network slice from being pre-empted by any piece of fourth service data that is to access a second network slice.

10. The communication apparatus of claim 9, wherein the processor is further configured to release, for the first service data, the first resource for the second service data when the indication information either instructs to release, for the first service data, the first resource for the second service data or indicates that a service usage of the first network slice is greater than or equal to an upper service usage limit of the first network slice.

11. The communication apparatus of claim 10, wherein the processor is further configured to:

determine, based on the indication information, to forbid pre-empting, for the first service data, a third resource for fifth service data that has accessed a third network slice other than the first network slice; and determine, based on a first authorized quality of service (QoS) parameter of the first service data and a second authorized QoS parameter of the second service data, the second service data, wherein a first priority level of the first service data is higher than a second priority level of the second service data, wherein a pre-emption capability parameter in a first allocation and retention priority (ARP) parameter in the first authorized QoS parameter of the first service data is set to "pre-empt allowed," and wherein a pre-emption vulnerability parameter in a second ARP parameter in the second authorized QoS parameter is set to "pre-empted allowed".

12. The communication apparatus of claim 10, wherein the upper service usage limit comprises at least one of a maximum quantity of sessions allowed to access the first network slice, a maximum bandwidth of traffic allowed to access the first network slice, or a maximum session density allowed for the first network slice.

13. The communication apparatus of claim 9, further comprising further forbidding the second resource for any piece of the third service data when the indication information indicates, to the second network device, that the second resource for the any piece of the third service data that has accessed the first network slice is not pre-empted by the any piece of the fourth service data or that a service usage of the first network slice is less than or equal to a lower service usage limit of the first network slice.

14. The communication apparatus of claim 13, wherein the lower service usage limit comprises at least one of a minimum quantity of sessions guaranteed to access the first network slice, a minimum bandwidth of traffic guaranteed to access the first network slice, or a minimum session density guaranteed for the first network slice.

15. The communication apparatus of claim 9, further comprising:

identifying that the second network device has forbidden, based on the indication information, the second resource for any piece of the third service data; and setting, in response to identifying, a pre-emption vulnerability parameter in an allocation and retention priority (ARP) parameter of each piece of the second service data to "pre-empted unallowed".

16. The communication apparatus of claim 9, wherein the first service data or the second service data is a first quality of service (QoS) flow or a first protocol data unit (PDU) session, or wherein the fourth service data or fifth service data that has accessed the second network slice is a second QoS flow or a second PDU session.

17. A non-transitory computer-readable medium containing instructions that when executed by a processor cause the processor to:

receive, from a first network device, indication information;

release, based on the indication information being a first indication and for first service data that is to access a first network slice, a first resource for second service data that has accessed the first network slice; and forbid, based on the indication information being a second indication, a second resource for third service data that has accessed the first network slice from being pre-empted by any piece of fourth service data that is to access a second network slice.

18. The non-transitory computer-readable medium of claim 17, wherein the instructions when executed by the processor further cause the processor to release, for the first service data, the first resource for the second service data when the indication information either instructs to release, for the first service data, the first resource for the second service data or indicates that a service usage of the first network slice is greater than or equal to an upper service usage limit of the first network slice.

19. The non-transitory computer-readable medium of claim 18, wherein the instructions when executed by the processor further cause the processor to:

determine, based on the indication information, to forbid pre-empting, for the first service data, a third resource for fifth service data that has accessed a third network slice other than the first network slice; and determine, based on a first authorized quality of service (QoS) parameter of the first service data and a second authorized QoS parameter of the second service data, the second service data, wherein a first priority level of the first service data is higher than a second priority level of the second service data, wherein a pre-emption capability parameter in a first allocation and retention priority (ARP) parameter in the first authorized QoS parameter of the first service data is set to "pre-empt allowed," and wherein a pre-emption vulnerability parameter in a second ARP parameter in the second authorized QoS parameter is set to "pre-empted allowed".

20. The non-transitory computer-readable medium of claim 18, wherein the upper service usage limit comprises at least one of a maximum quantity of sessions allowed to access the first network slice, a maximum bandwidth of traffic allowed to access the first network slice, or a maximum session density allowed for the first network slice.

\* \* \* \* \*